(12) United States Patent
Minefuji

(10) Patent No.: US 10,802,389 B2
(45) Date of Patent: Oct. 13, 2020

(54) PROJECTION SYSTEM AND PROJECTION-TYPE IMAGE DISPLAY APPARATUS

(71) Applicant: SEIKO EPSON CORPORATION, Tokyo (JP)

(72) Inventor: Nobutaka Minefuji, Omachi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/356,329

(22) Filed: Mar. 18, 2019

(65) Prior Publication Data
US 2019/0331901 A1    Oct. 31, 2019

(30) Foreign Application Priority Data
Mar. 19, 2018   (JP) ................. 2018-050567

(51) Int. Cl.
| | |
|---|---|
| *G03B 21/28* | (2006.01) |
| *G02B 27/18* | (2006.01) |
| *G02B 9/00* | (2006.01) |
| *G02B 27/00* | (2006.01) |
| *G02B 13/04* | (2006.01) |

(52) U.S. Cl.
CPC ............ *G03B 21/28* (2013.01); *G02B 9/00* (2013.01); *G02B 13/04* (2013.01); *G02B 27/00* (2013.01); *G02B 27/18* (2013.01)

(58) Field of Classification Search
CPC .......... G02B 13/04; G02B 27/18; G02B 9/00; G02B 27/00; G03B 21/28
See application file for complete search history.

(56) References Cited

U.S. PATENT DOCUMENTS

| | | | |
|---|---|---|---|
| 7,009,765 B2 | 3/2006 | Gohman | |
| 2002/0057500 A1* | 5/2002 | Sugawara | G02B 27/145 |
| | | | 359/634 |
| 2004/0032653 A1* | 2/2004 | Gohman | G02B 13/16 |
| | | | 359/434 |
| 2005/0036207 A1* | 2/2005 | Yamasaki | G02B 15/177 |
| | | | 359/676 |
| 2006/0193036 A1* | 8/2006 | Suzuki | G02B 13/0095 |
| | | | 359/364 |

(Continued)

FOREIGN PATENT DOCUMENTS

| | | |
|---|---|---|
| JP | 2006-235516 A | 9/2006 |
| JP | 2007-147970 A | 6/2007 |

(Continued)

*Primary Examiner* — Michelle M Iacoletti
*Assistant Examiner* — Magda Cruz
(74) *Attorney, Agent, or Firm* — Oliff PLC

(57) ABSTRACT

A first optical group that forms an intermediate image and a second optical group that enlarges and projects the intermediate image formed by the first optical group satisfy a variety of conditions. Therefore, first of all, in a case where a projection system is incorporated in a projector, an ultrawide field angle that allows enlargement and projection of an image at a half angle of view of 50° or greater is achieved. Further, an optical path deflection system including two optical path deflectors is disposed between the first optical group and the second optical group to allow the optical path to be folded with deterioration in performance of the projection system suppressed.

20 Claims, 28 Drawing Sheets

(56) References Cited

U.S. PATENT DOCUMENTS

| | | | |
|---|---|---|---|
| 2010/0245784 A1 | 9/2010 | Nishikawa | |
| 2015/0070778 A1* | 3/2015 | Amano | G03B 21/14 359/663 |
| 2015/0370048 A1* | 12/2015 | Takano | G02B 13/006 359/443 |
| 2016/0154224 A1* | 6/2016 | Imai | G02B 15/177 359/680 |
| 2016/0216497 A1 | 7/2016 | Minefuji | |
| 2016/0238822 A1 | 8/2016 | Minefuji | |
| 2016/0238825 A1 | 8/2016 | Minefuji | |
| 2016/0299415 A1 | 10/2016 | Minefuji | |
| 2016/0306268 A1 | 10/2016 | Minefuji | |
| 2016/0363746 A1 | 12/2016 | Minefuji | |
| 2017/0351070 A1* | 12/2017 | Shiokawa | G02B 15/22 |
| 2018/0164554 A1 | 6/2018 | Shiokawa et al. | |
| 2018/0173088 A1 | 6/2018 | Minefuji | |
| 2019/0285972 A1* | 9/2019 | Minefuji | G02B 13/16 |

FOREIGN PATENT DOCUMENTS

| | | |
|---|---|---|
| JP | 2010-237356 A | 10/2010 |
| JP | 2016-138962 A | 8/2016 |
| JP | 2016-151686 A | 8/2016 |
| JP | 2016-151687 A | 8/2016 |
| JP | 2016-151688 A | 8/2016 |
| JP | 2017-003846 A | 1/2017 |
| JP | 2017-187662 A | 10/2017 |
| JP | 2018-097046 A | 6/2018 |
| JP | 2018-138944 A | 9/2018 |
| JP | 2018-138945 A | 9/2018 |

\* cited by examiner

FIG. 9
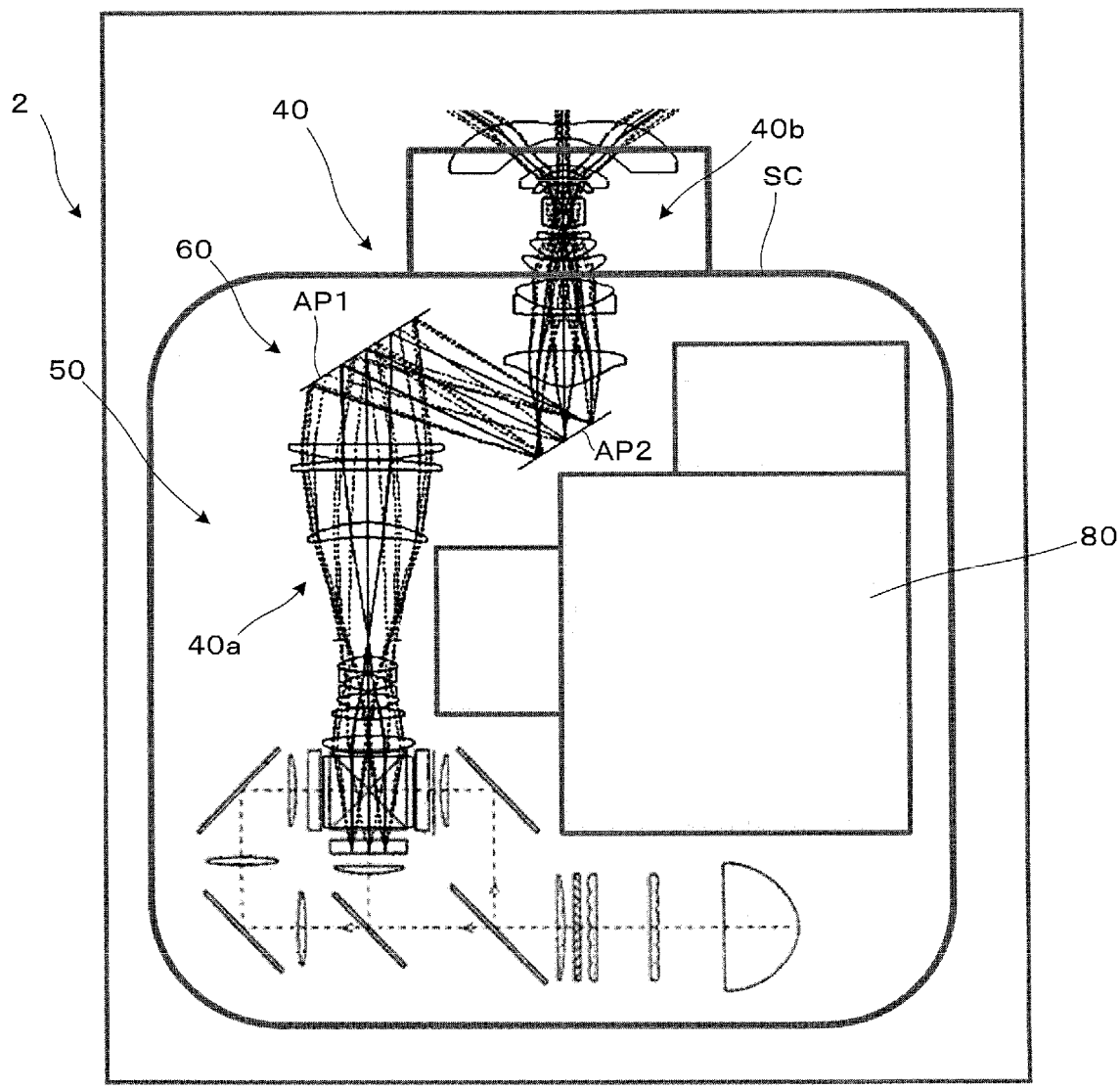
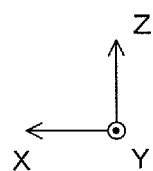

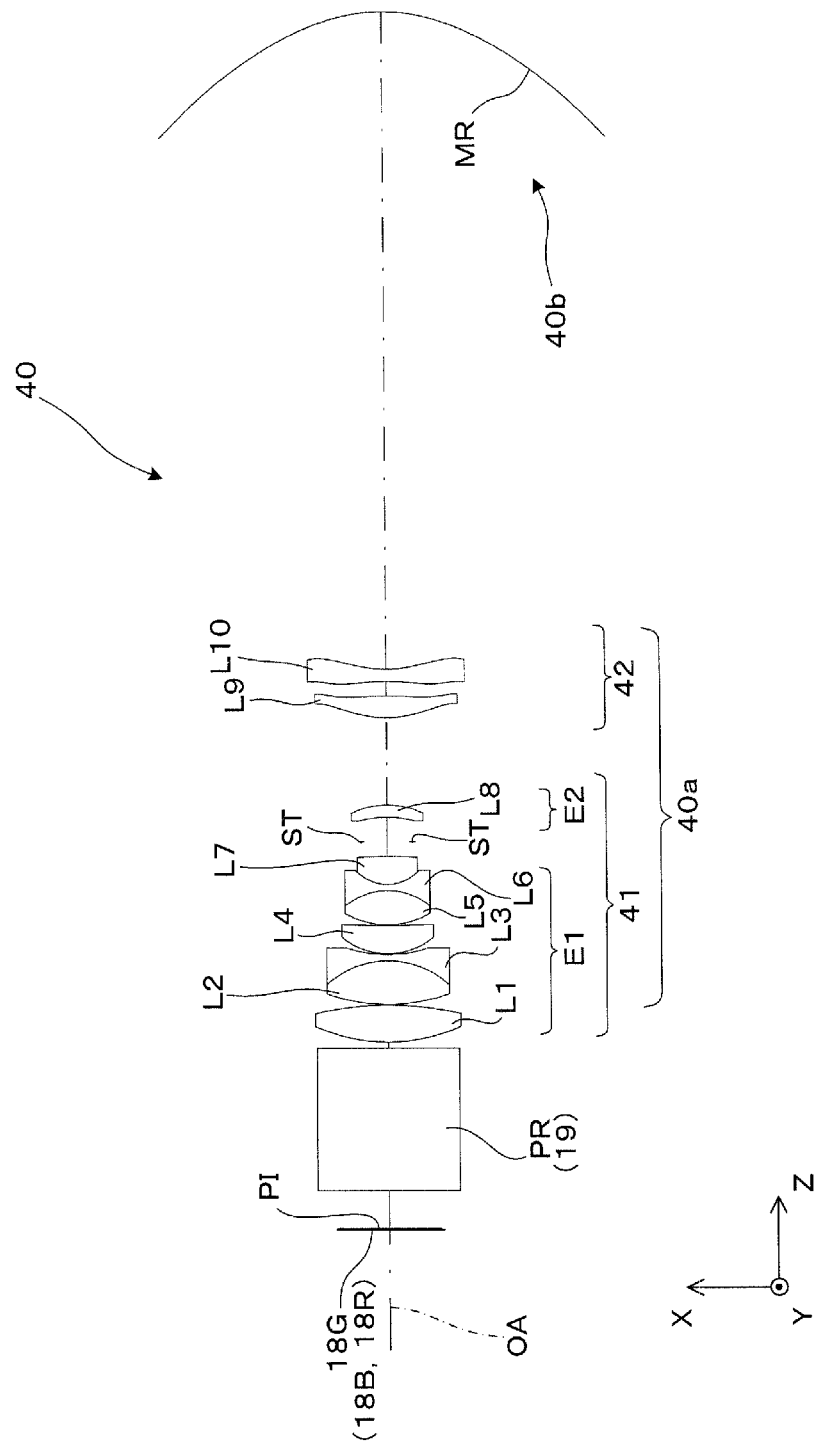

PROJECTION SYSTEM AND PROJECTION-TYPE IMAGE DISPLAY APPARATUS

BACKGROUND

1. Technical Field

The present invention relates to a projection system suitable to be incorporated in a projection-type image display apparatus that enlarges and projects an image on an image display device, such as a projector, and a projection-type image display apparatus using the projection system.

2. Related Art

In recent years, a projection system used in a projector and capable of providing a large screen in short-distance projection has been proposed, as described, for example, in JP-A-2007-147970.

In a case where the projection system is formed only of a refractive optical system, as in JP-A-2007-147970, however, providing a very wide field angle undesirably requires a very large lens particularly located on an enlargement side. In JP-A-2007-147970, the upper limit of the increased field angle is about a half angle of view of 60°. In contrast, for example, in JP-A-2006-235516, using a refractive optical system and a concave mirror allows an ultrawide half angle of view, for example, greater than or equal to 70°. In JP-A-2006-235516, however, generation of an intermediate image causes an increase in length of the overall projection system.

In another approach, JP-A-2010-237356, for example, describes that a projection system using a concave mirror deflects the optical path for reduction in size of the projection system. In the example described in JP-A-2010-237356, however, the size reduction is achieved by providing a first reflection surface in a relay lens system to deflect the optical path once in the relay lens system and further providing a second reflection surface in the primary image formation plane to deflect the optical path at the primary image formation plane. Providing reflection surfaces in a relay lens system as described above could cause deterioration in the performance of the projection system due, for example, to a shift and inclination of the optical axis between a front lens group and a rear lens group that form the relay system.

SUMMARY

A projection system according to an aspect of the invention is a projection system including a first optical group formed of a plurality of lenses and a second optical group formed of at least a single optical element with the first optical group and the second optical group sequentially arranged from a reduction side. The first optical group forms an intermediate image of an image display device disposed in a reduction-side conjugate position. The second optical group enlarges the intermediate image formed by the first optical group and projects the enlarged intermediate image with a half angle of view being greater than or equal to 50°. The projection system further includes an optical path defection system that is disposed between the first optical group and the second optical group and includes a first optical path deflector that deflects an optical axis of the first optical group and a second optical path deflector that further deflects the optical axis deflected by the first optical path deflector to cause the deflected optical axis to be oriented again in a direction in which the optical axis of the first optical group extends. The projection system satisfies conditional expressions $$0.1 < Fb1/Fb2 < 0.3 \quad (1), \text{ and}$$

$$0.8 < Fb2/TL < 2.0 \quad (2)$$

where Fb1 represents an air equivalent distance from the reduction-side conjugate position to a surface closest to a reduction side in the first optical group, Fb2 represents a distance from a surface closest to an enlargement side in the first optical group to an on-axis paraxial focal position where the intermediate image is formed, and TL represents an overall length of the first optical group.

In the projection system described above, the first optical group, which forms the intermediate image, and the second optical group, which enlarges and projects the intermediate image formed by the first optical group, satisfy the conditions described above. Therefore, first of all, in a case where the projection system is incorporated in a projection-type image display apparatus, such as projector, an ultrawide field angle that allows enlargement and projection of an image at a half angle of view of 50° or greater is achieved. Further, the optical path deflection system including the two optical path deflectors is disposed between the first optical group and the second optical group to allow a compact configuration in which the optical path is folded with deterioration in performance of the projection system suppressed.

A projection-type image display apparatus according to another aspect of the invention includes a light modulation device that modulates light from a light source to form an image light and the projection system described above that projects the image on the light modulation device. In this case, the projection-type image display apparatus, which includes the projection system described above, has a compact size with an ultrawide field angle that allows enlargement and projection of an image at a half angle of view of 50° or greater.

BRIEF DESCRIPTION OF THE DRAWINGS

The invention will be described with reference to the accompanying drawings, wherein like numbers reference like elements.

FIG. 9 is a plan view showing a projector in which a projection system according to a second embodiment or Example 4 is incorporated in an enclosure.

FIG. 13 shows the configuration of a projection system according to Example 1.

DESCRIPTION OF EXEMPLARY EMBODIMENTS

First Embodiment

A projection system according to a first embodiment of the invention and a projection-type image display apparatus incorporating the projection system will be described below in detail with reference to the drawings.

Figure 1:
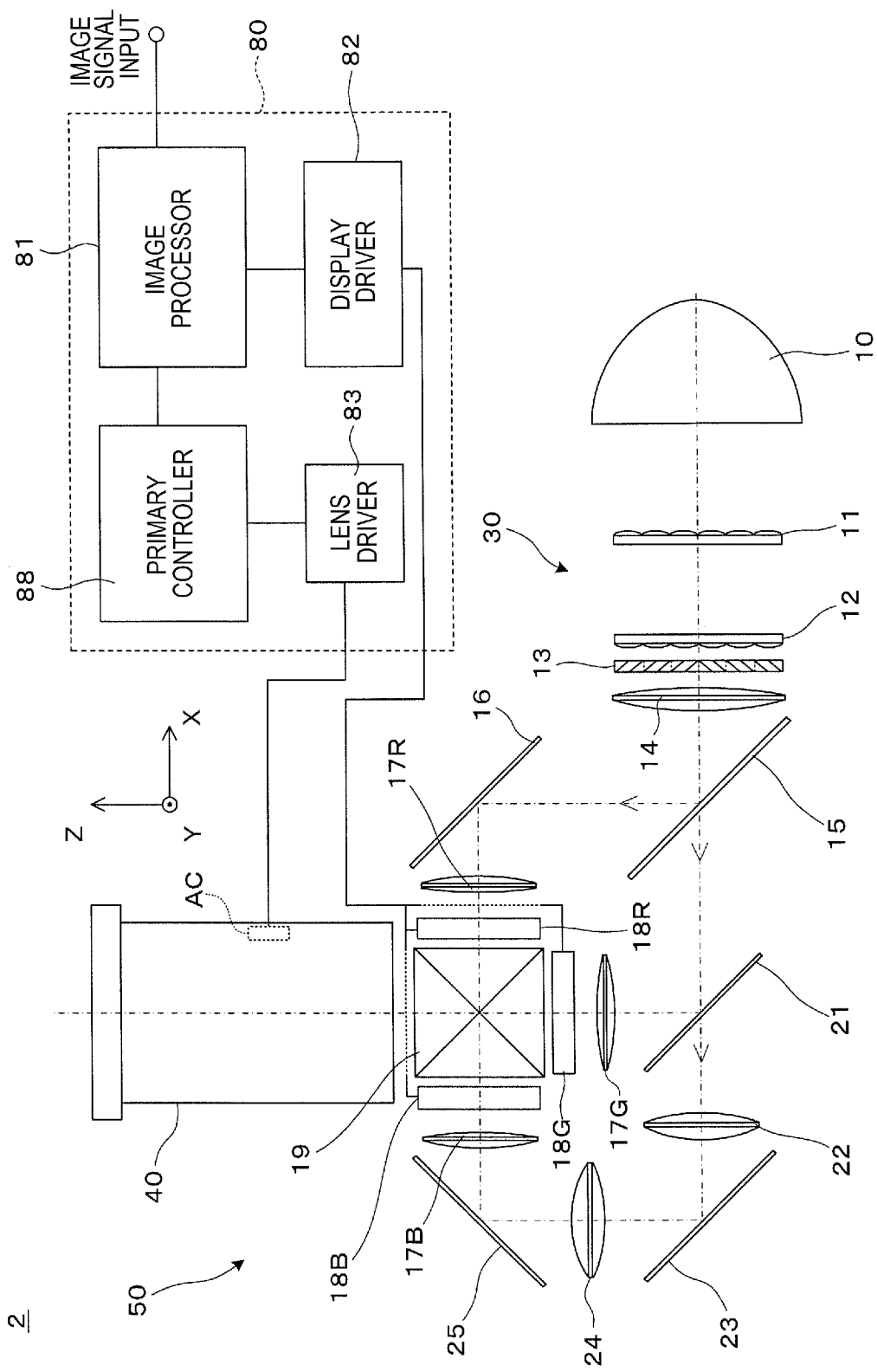
FIG. 1 shows a schematic configuration of a projector that incorporates a projection system according to a first embodiment.

A projector 2, which is a projection-type image display apparatus incorporating the projection system according to the first embodiment, includes an optical system section 50, which projects image light, and a circuit apparatus 80, which controls the action of the optical system section 50, as shown in FIG. 1.

In the optical system section 50, a light source 10 is, for example, an ultrahigh-pressure mercury lamp and emits light containing R light, G light, and B light. The light source 10 may instead be a discharge light source other than an ultrahigh-pressure mercury lamp or a solid-state light source, such as an LED and a laser. A first optical integration lens 11 and a second optical integration lens 12 each have a plurality of lens elements arranged in an array. The first optical integration lens 11 divides a light ray flux from the light source 10 into a plurality of light ray fluxes. The lens elements of the first optical integration lens 11 each focus the light ray flux from the light source 10 in the vicinity of the corresponding lens element of the second optical integration lens 12. The lens elements of the second optical integration lens 12, which cooperate with a superimposing lens 14, form images of the lens elements of the first optical integration lens 11 on liquid crystal panels 18R, 18G, and 18B. The configuration described above allows a display area of each of the liquid crystal panels 18R, 18G, and 18B to be entirely illuminated with the light from the light source 10 at roughly uniform brightness.

A polarization conversion element 13 converts the light from the second optical integration lens 12 into predetermined linearly polarized light. The superimposing lens 14 superimposes the images of the lens elements of the first optical integration lens 11 on one another on the display area of each of the liquid crystal panels 18R, 18G, and 18B via the second optical integration lens 12.

A first dichroic mirror 15 receives the R light, the G light, and the B light incident thereon from the superimposing lens 14, reflects the R light, and transmits the G light and the B light. The R light reflected off the first dichroic mirror 15 travels along a reflection mirror 16 and a field lens 17R and impinges on the liquid crystal panel 18R, which is a light modulation device. The liquid crystal panel 18R modulates the R light in accordance with an image signal to form an R image.

A second dichroic mirror 21 receives the G light and the B light having passed through the first dichroic mirror 15, reflects the G light, and transmits the B light. The G light reflected off the second dichroic mirror 21 passes through a field lens 17G and impinges on the liquid crystal panel 18G, which is a light modulation device. The liquid crystal panel 18G modulates the G light in accordance with an image signal to form a G image. The B light having passed through the second dichroic mirror 21 travels along relay lenses 22 and 24, reflection mirrors 23 and 25, and a field lens 17B and impinges on the liquid crystal panel 18B, which is a light modulation device. The liquid crystal panel 18B modulates the B light in accordance with an image signal to form a B image.

Across dichroic prism 19, which is a light combining prism, combines the light fluxes modulated by the liquid crystal panels 18R, 18G, and 18B with one another into image light and directs the image light to a projection system 40.

The projection system 40 is a zoom lens for projection that receives the image light formed of the image light fluxes modulated by the liquid crystal panels 18G, 18R, and 18B and combined with one another by the cross dichroic prism 19 and enlarges and projects the image light on a screen that is not shown.

The circuit apparatus 80 includes an image processor 81, to which an external image signal, such as a video signal, is inputted, a display driver 82, which drives the liquid crystal panels 18G, 18R, and 18B provided in the optical system section 50 based on an output from the image processor 81, a lens driver 83, which activates a drive mechanism (not shown) provided in the projection system 40 to adjust the state of the projection system 40, and a primary controller 88, which oversees and controls the actions of the circuit sections 81, 82, and 83 and other components.

The image processor 81 converts the inputted external image signal into image signals each containing grayscales and other factors on a color basis. The image processor 81 can also perform a variety of types of image processing, such as distortion correction and color correction, on the external image signal.

The display driver 82 can operate the liquid crystal panels 18G, 18R, and 18B based on the image signals outputted from the image processor 81 to allow the liquid crystal panels 18G, 18R, and 18B to form images corresponding to the image signals or images corresponding to the images having undergone the image processing.

The lens driver 83 operates under the control of the primary controller 88 and can cause an actuator AC to move part of optical elements that form the projection system 40 as appropriate along an optical axis OA to perform focusing in association with a change in magnification (focusing performed when magnification is changed) in the projection of an image on the screen via the projection system 40. The lens driver 83 can also change the vertical position of an image projected on the screen through tilt adjustment of moving the entire projection system 40 in an upward/downward direction perpendicular to the optical axis OA.

As described above, the projector 2 is a projection-type image display apparatus including the liquid crystal panels 18R, 18G, and 18B, which are each a light modulation device and each modulate the light from the light source 10 to form an image, and the projection system. 40, which projects the images on the liquid crystal panels 18R, 18G, and 18B, which are each a light modulation device.

The projection system 40 according to the present embodiment will be specifically described below with reference to FIGS. 2 to 6. The projection system 40 shown by way of example in FIG. 2 and other figures has the same configuration as that of a projection system 40 according to Example 1, which will be described later.

Figure 4:
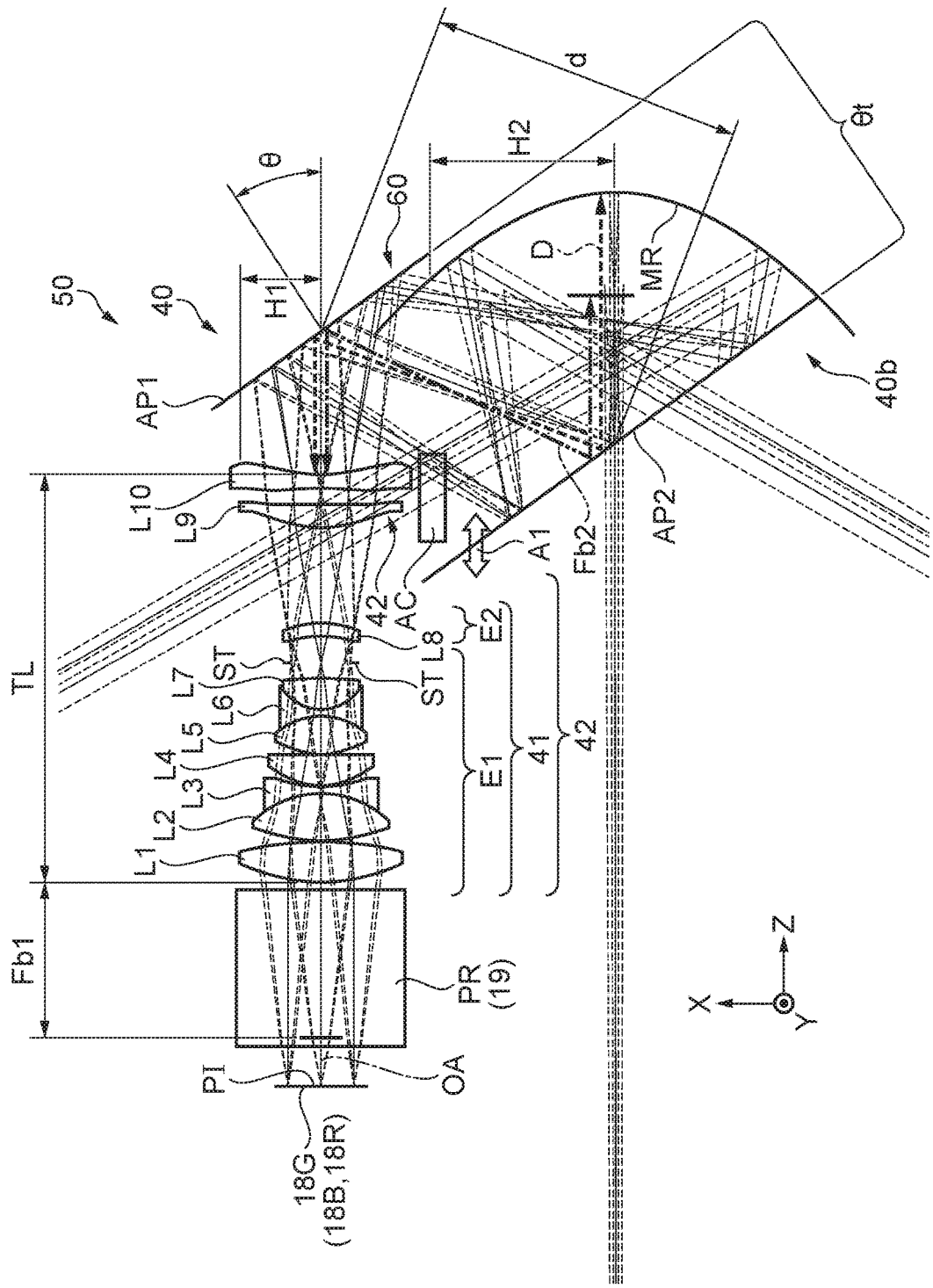
FIG. 4 is a configuration diagram and light ray diagram of a portion from the object plane to a concave reflection mirror in the projection system according to the first embodiment or Example 1.

The projection system 40 according to the present embodiment projects an image formed on the liquid crystal panel 18G (18R, 18B) on a surface that is not shown but is irradiated with the image light, such as a screen, as shown in FIG. 4 and other figures. A prism PR, which corresponds to the cross dichroic prism 19 shown in FIG. 1, is disposed between the projection system 40 and the liquid crystal panel 18G (18R, 18B).

The projection system 40 includes a first optical group 40a, which is formed of a plurality of lenses and has positive power, and a second optical group 40b, which is formed of a single mirror MR having a reflection surface having a concave aspheric shape, with the first optical group 40a and the second optical group 40b sequentially arranged from a reduction side.

Figure 2:
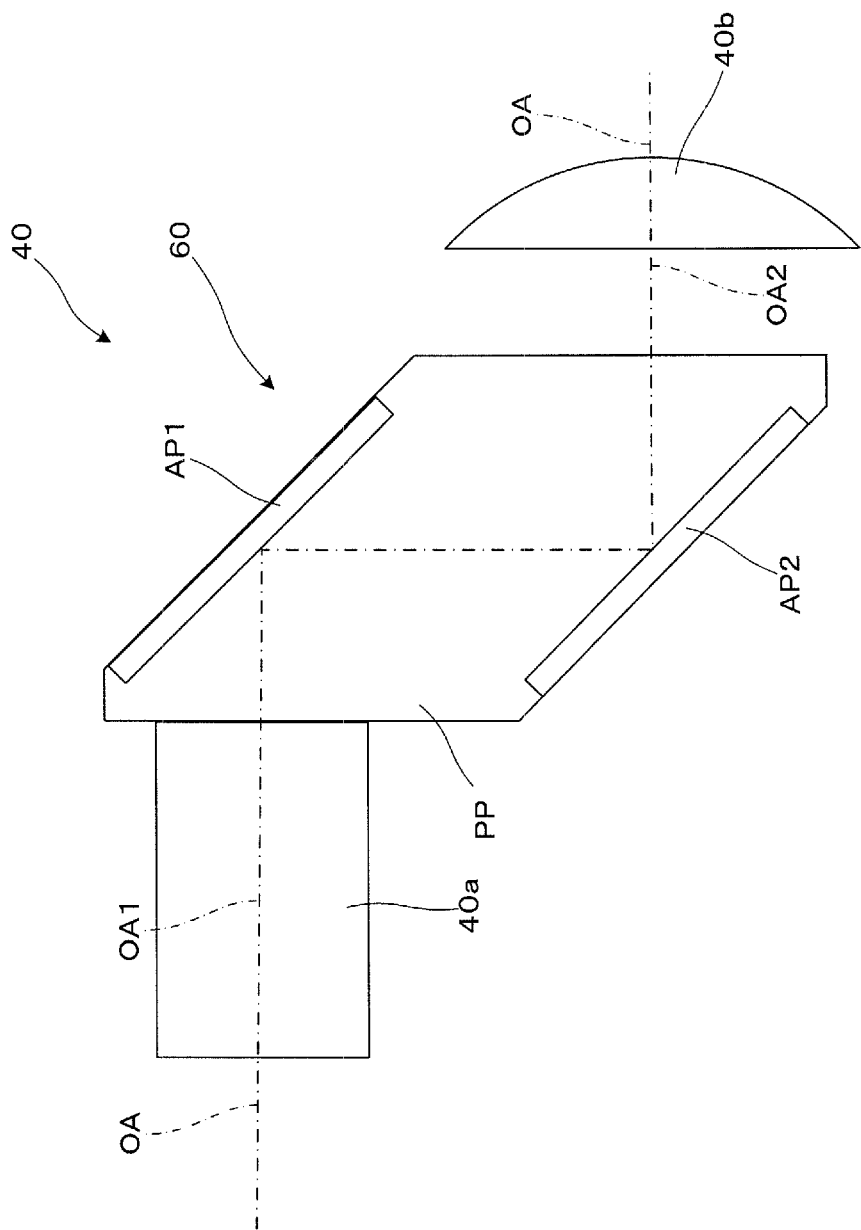
FIG. 2 is a plan view conceptually showing the projection system incorporated in the projector according to the first embodiment.

The projection system 40 further includes an optical path deflection system 60, which is formed of two optical path deflectors, a first optical path deflector AP1 and a second optical path deflector AP2, as conceptually shown, for example, in FIG. 2. The first optical path deflector AP1 and the second optical path deflector AP2 are so paired as to form two reflection surfaces facing each other and deflect the optical path of the image light. That is, in the optical path deflection system 60, the first optical path deflector AP1 and the second optical path deflector AP2 are formed of two mirrors and so disposed that the reflection surfaces thereof face each other. In the optical path deflection system 60, the first optical path deflector AP1 and the second optical path deflector AP2 are so positioned by a holder PP, which is molded integrally therewith, that the two optical path deflectors incline with respect to the optical axis OA by a specific angle and are fixed with the arrangement of the two optical path deflectors maintained. In the following description, the optical axis OA of the projection system 40 is also so taken that the optical axis of the first optical group 40a of the projection system 40 is referred to as an optical axis OA1 and the optical axis of the second optical group 40b of the projection system 40 is referred to as an optical axis OA2. From a different point of view, the optical path deflection system 60 can be so taken as to adjust the relationship between the optical axis OA1 of the first optical group 40a and the optical axis OA2 of the second optical group 40b.

The present embodiment is characterized in that the size of the entire apparatus is reduced by increasing the overall length of the projection system 40, in particular, by providing a large gap between the first optical group 40a and the second optical group 40b and deflecting the optical path of the projection system 40 with the aid of the first optical path deflector AP1 and the second optical path deflector AP2 disposed in the gap. That is, first of all, the projection system 40 includes the first optical group 40a and the second optical group 40b, which are each formed a lens, a curve mirror, or any other component, as an optically functional primary section. Based on the above configuration, the optical path deflection system 60, which includes the first optical path deflector AP1 and the second optical path deflector AP2, which are each formed of a flat mirror having a reflection surface that inclines with respect to the optical axis OA, is provided between the first optical group 40a and the second optical group 40b to deflect the optical path. The projection system 40 thus has a compact folded configuration as a whole. In the thus configured optical path deflection system 60, the first optical path deflector AP1 can deflect the optical path in such a way that the optical path extends in the longitudinal direction of the screen, and the second optical path deflector AP2 can orient the optical path deflected by the first optical path deflector AP1 in the same direction again in which the optical path extends from the first projection system 40a.

Figure 3:
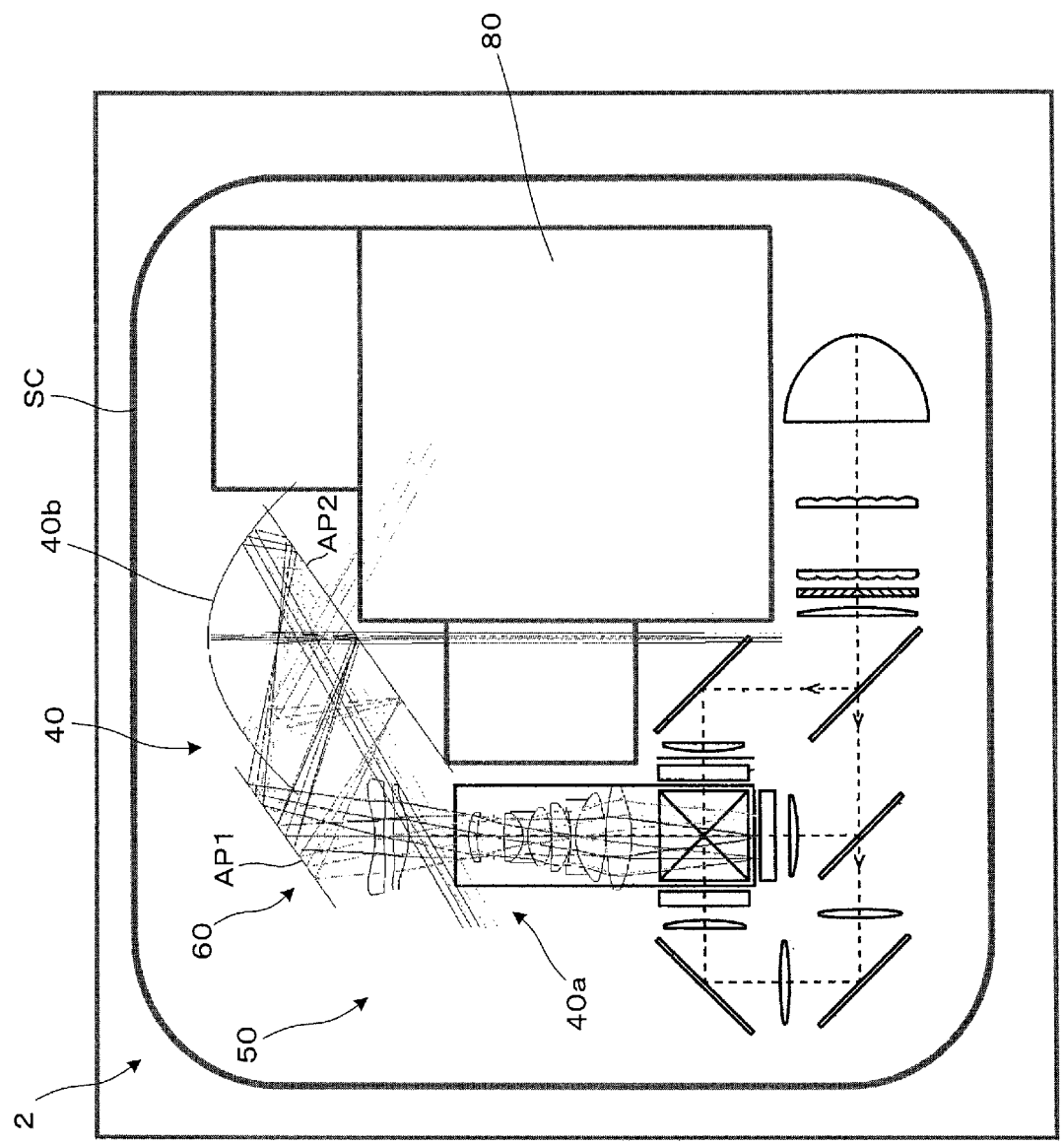
FIG. 3 is a plan view showing the projector in which the projection system is incorporated in an enclosure.

The folded configuration of the projection system 40 described above allows, when the projection system 40 is incorporated in an enclosure SC of the projector 2, the first optical group 40a to be disposed in a position close to an end of the enclosure SC and a portion from which light rays exit to be disposed at the center of the enclosure SC, as shown, for example, in FIG. 3. The projection system 40 is thus advantageously configured in terms of exterior appearance and installability. Specifically, first of all, in the case shown in FIG. 3, in which the first optical group 40a of the projection system 40 is located in a left portion of the enclosure SC, that is, in a +X-side portion, the folding operation of the first optical path deflector AP1 shifts the optical path rightward. That is, the optical path extending primarily in the direction +Z as a whole is so deflected as to extend primarily in the direction −X. Further, the folding operation of the second optical path deflector AP2 causes the direction in which the optical path extends to be oriented again in the initial direction +Z, in which the optical path primarily extends. Finally, the reflecting operation of the mirror MR causes the direction in which the optical path extends to be oriented in the direction −Z in which the optical path primarily extends, followed by projection of an enlarged image. The thus configured path allows the first optical group 40a to be disposed in a position close to an end of the enclosure SC and the portion from which light rays exit to be disposed at the center of the enclosure, whereby a power supply, the circuit apparatus 80 for image formation, and other components can be disposed in a free space. The exterior appearance, the installability, and other factors of the projector 2 can thus be improved.

Figure 5:
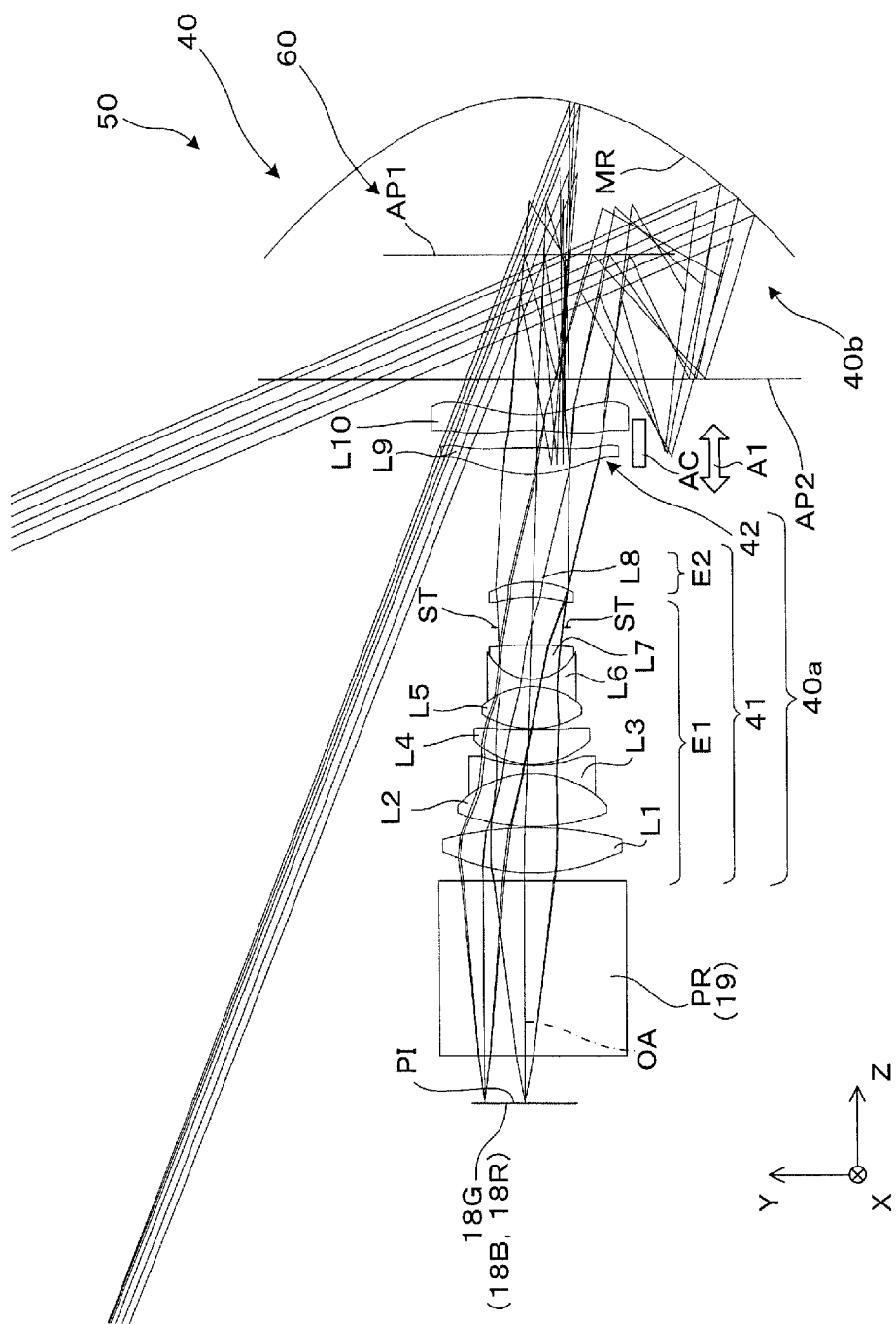
FIG. 5 is another configuration diagram and light ray diagram of the portion from the object plane to the concave reflection mirror in the projection system according to the first embodiment or Example 1.
Figure 6:
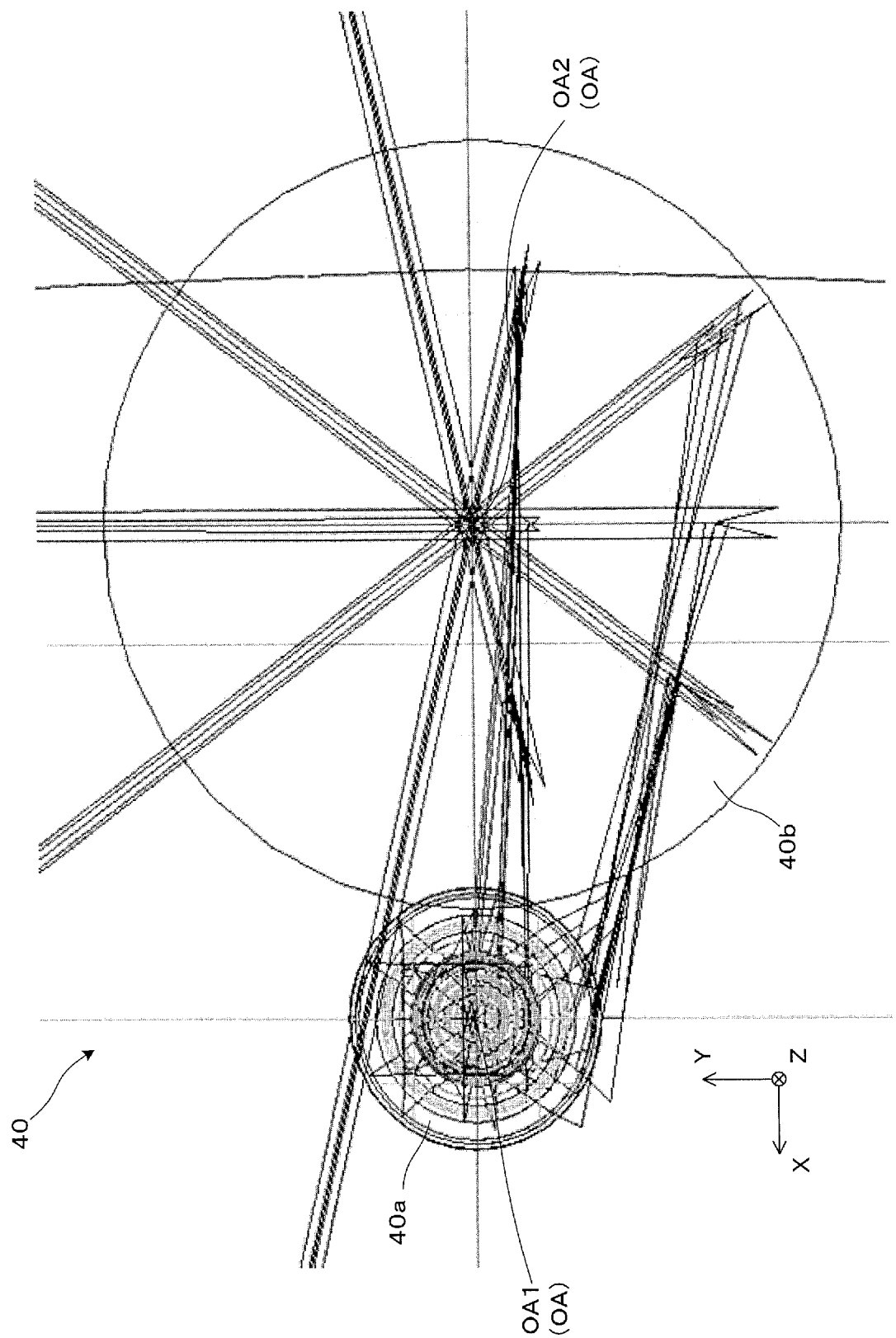
FIG. 6 is a rear view for showing the optical path in the projection system viewed in another direction.

The configurations of the first optical group 40a and the second optical group 40b, which are each an optically functional primary section of the projection system 40, will be described below with reference to FIGS. 4 and 5. FIG. 4 is a configuration diagram and light ray diagram of a portion from the object plane to the concave reflection mirror in the projection system according to the present embodiment or Example 1, and FIG. 4 corresponds to the projection system 40 incorporated in the enclosure SC in FIG. 3. FIG. 5 corresponds to FIG. 4 and is a side view of the projection system 40. FIG. 6 is a rear view for showing the optical path in the projection system viewed in another direction. That is, FIG. 6 shows the projection system 40 viewed from the side facing the image display device. The projection system 40 is so disposed with the reflection surfaces inclining that the optical path is folded not only in the upward/downward direction, that is, the direction Y but in the rightward/leftward direction, that is, the direction X, as shown in FIGS. 4 to 6.

The first optical group 40a forms an intermediate image of the liquid crystal panel 18G (18R, 18B), which is an image display device disposed in a reduction-side conjugate position, which is conjugate with the intermediate image.

The second optical group 40b enlarges the intermediate image formed by the first optical group 40a and projects the enlarged intermediate image toward the surface to be irradiated with the image light, such as a screen, with a half angle of view being greater than or equal to 50°.

In the present embodiment, the optical path deflection system 60 is disposed between the first optical group 40a and the second optical group 40b. The arrangement allows the optical path to be folded with degradation in the performance of the optical function of the two optical groups suppressed. If the reflection surface, such as the first optical path deflector AP1, which forms the optical path deflection system 60, is provided in a relay lens system, such as the first optical group 40a, that is, in the first optical group 40a to fold the optical path in the first optical group 40a, deterioration in the performance could occur due, for example, to a shift and inclination of the optical axis between a front lens group on the upstream side of the first optical path deflector AP1 in the optical path and a rear lens group on the downstream side of the first optical path deflector AP1 in the optical path out of lens groups that form the first optical group 40a. In the present embodiment, such a situation is avoided by providing the optical path deflection system 60 between the first optical group 40a and the second optical group 40b. In this case, however, a large air gap needs to be provided between the first optical group 40a and the second optical group 40b. That is, the first optical group 40a and the second optical group 40b each need to have a long back focal length.

On the other hand, since the projection system 40 has a very wide half angle of view, for example, greater than or equal to 50°, the second optical group 40b, which performs the magnifying projection, has a very short focal length. It is therefore difficult to increase the distance between the second optical group 40b and the intermediate image, that is, the reduction-side back focal length of the second optical group 40b. In such a situation, to sufficiently increase the air gap that allows the optical path deflection system 60 to be disposed between the first optical group 40a and the second optical group 40b, the first optical group 40a needs to have a very long magnifying-side back focal length.

Further, since the second optical group 40b provides a very wide field angle, it is difficult to design an aberration-free second optical group 40b. Therefore, to allow the second optical group 40b to produce a satisfactory final image, it is necessary for the first optical group 40a to form the intermediate image in consideration of aberrations produced by the second optical group 40b in advance so that the aberrations are canceled. In the present embodiment, the first optical group 40a and the second optical group 40b of the projection system 40 are configured in consideration of the above.

The first optical group 40a is formed of a first-first lens group 41, which is provided on the reduction side, and a first-second lens group 42, which is provided on an enlargement side. The first optical group 40a is formed of ten lenses L1 to L10, with part of the lenses forming the first-first lens group 41 and the remainder forming the first-second lens group 42.

The first-first lens group 41 has an aperture stop ST provided therein, and it is assumed in the description that the first-first lens group 41 is formed of a lens group E1 on the reduction side of the aperture stop ST and a lens group E2 on the enlargement side of the aperture stop ST. In the example shown in FIG. 4, the lens group E1 is formed of the lenses L1 to L7, and the lens group E2 is formed of the lens L8.

The first-second lens group 42 is formed of two lenses, that is, the lenses L9 and L10. The first-second lens group 42 has a plurality of aspheric surfaces as lens surfaces.

The first-second lens group 42 moves in the optical axis direction when focusing is performed in association with a change in magnification. That is, when focusing is performed in association with a change in magnification, the first-second lens group 42 brings an image into focus by movement of at least one of the two lenses L9 and L10 with the aid of the actuator AC in the optical axis direction, that is, a direction A1 along the optical axis OA. The actuator AC can move the lenses in a variety of aspects in accordance with the aspect in which the focusing is performed when the magnification is changed. For example, the lenses may be moved independently of each other or may be moved in synchronization with each other, for example, by using a cam mechanism.

It is important that the first-first lens group 41 of the first optical group 40a has a structure for efficiently capturing the light ray flux from the liquid crystal panel 18G (18R, 18B), which is an image display device. In contrast, the first-second lens group 42 is responsible for the focusing performed when the projection magnification is changed.

A variety of conditions on the projection system. 40, such as optical-system distances, will be described below.

In the first optical group 40a, let Fb1 be an air equivalent distance from the position of a panel surface PI of the liquid crystal panel 18G (18R, 18B), which is the reduction-side conjugate position, to the surface closest to the reduction side in the first optical group 40a, that is, the reduction-side surface of the lens L1. Let Fb2 be the air equivalent distance from the surface closest to the enlargement side in the first optical group 40a to a paraxial focal position which is located on the optical axis OA and where the intermediate image is formed. Further, let TL be the overall length of the first optical group 40a. Under the definitions described above, the following conditional expressions are satisfied:

$$0.1 < Fb1/Fb2 < 0.3 \qquad (1), \text{ and}$$

$$0.8 < Fb2/TL < 2.0 \qquad (2).$$

Conditional Expression (1) represents a condition on the ratio of the air equivalent distance Fb1 to the air equivalent distance Fb2 and allows the first optical group 40a and the second optical group 40b to be separated from each other with a sufficient reduction-side back focal length maintained.

When Fb1/Fb2 is smaller than the lower limit set by Conditional Expression (1), the enlargement-side back focal length of the first optical group 40a is too long, and it is therefore difficult for the first optical group 40a to form in advance an intermediate image capable of canceling the aberrations produced by the second optical group 40b. That is, from a different point of view, an attempt to cause the second optical group 40b to cancel residual aberrations that cannot be corrected by the first optical group 40a results in an increase in the size of the mirror that forms the second optical group 40b and an increase in the number of lenses. The increases are not preferable in terms, for example, of cost reduction.

When Fb1/Fb2 is greater than the upper limit set by Conditional Expression (1), the enlargement-side back focal length of the first optical group 40a is too short, and it is therefore difficult to efficiently dispose the optical path deflection system 60.

Conditional Expression (2) represents a condition on the ratio of the enlargement-side back focal length of the first optical group 40a to the overall length of the first optical group 40a.

When Fb2/TL is smaller than the lower limit set by Conditional Expression (2), the overall length of the first optical group 40a is too long, and the distance from the panel surface PI of the liquid crystal panel 18G (18R, 18B) disposed on the reduction side to the first optical path deflector AP1 is therefore too long. That is, the final overall length of the folded projection system 40 undesirably increases.

When Fb2/TL is greater than the upper limit set by Conditional Expression (2), the overall length of the first optical group 40a is too short relative to the enlargement-side back focal length, and it is therefore difficult to satisfactorily form the intermediate image with sufficient reduction-side and enlargement-side back focal lengths maintained.

The projection system 40 further satisfies the following conditional expression:

$$0.2 < (H1+H2)/D < 0.6 \qquad (3)$$

where D represents the distance from the surface closest to the enlargement side in the first optical group 40a, that is, an enlargement-side surface S1 of the lens L10 to the surface closest to the reduction side in the second optical group 40b, that is, a reflection surface S2 of the mirror MR, H1 represents the effective aperture radius of the surface S1, and H2 represents the effective aperture radius of the surface S2.

Conditional Expression (3) represents a condition on the distance between the first optical group 40a and the second optical group 40b, the effective aperture radius of the surface closest to the enlargement side in the first optical group 40a, and the effective aperture radius of the surface closest to the reduction side in the second optical group 40b and allows the optical path deflection system 60, which is formed of the two optical path deflectors AP1 and AP2, to be efficiently disposed between the first optical group 40a and the second optical group 40b.

When (H1+H2)/D is smaller than the lower limit set by Conditional Expression (3), the gap between the first optical group 40a and the second optical group 40b widens so that the two optical path deflectors AP1 and AP2 are readily disposed, whereas the effective aperture radii H1 and H2 increase, that is, the diameters of the lens L10 and the mirror MR increase, and the projection system 40 is in turn undesirably excessively large.

When (H1+H2)/D is greater than the upper limit set by Conditional Expression (3), the gap between the first optical group 40a and the second optical group 40b is too narrow, so that the distance between the first optical path deflector AP1 and the second path deflector AP2 is insufficient, undesirably resulting in interference of the deflected light ray flux with the lenses and other optical elements that form the first optical group 40a and the second optical group 40b and interference of frames that incorporate the lenses and other optical elements with a frame that incorporates the two optical path deflectors AP1 and AP2.

The projection system 40 further satisfies the following conditional expression:

$$0.08 < F/F1 < 0.16 \qquad (4)$$

where F represents the focal length of the entire projection system 40, and F1 represents the focal length of the first optical group 40a.

Conditional Expression (4) represents a condition that allows the second optical group 40b to be formed of a concave mirror. To allow the second optical group 40b to be formed of a large power concave aspheric mirror in order to configure the second optical group 40b with at least a single concave aspheric mirror, as in the present embodiment, the light rays that travel from the first optical group 40a toward the second optical group 40b need to be divergent light, and field curvature that cancels large field curvature produced by the concave aspheric mirror needs to be imparted in advance to the intermediate image. To this end, the focal length F1 of the first optical group 40a with respect to the focal length F of the entire projection system 40 preferably falls within the range expressed by Conditional Expression (4).

When F/F1 is smaller than the lower limit set by Conditional Expression (4), the power of the first optical group 40a is too small, so that the divergence of the light rays that exit out of the first optical group 40a is small. As a result, the second optical group 40b cannot provide a wide field angle, and it is difficult for the first optical group 40a to cancel the amount of field curvature produced by the second optical group 40b. It is therefore difficult to produce a final flat image plane.

When F/F1 is greater than the upper limit set by Conditional Expression (4), the power of the first optical group 40a is too large. Therefore, the divergence of the light rays that exit out of the first optical group 40a is large, but a wide gap between the first optical group 40a and the second optical group 40b results in too a large diameter of the concave mirror that forms the second optical group 40b. The excessive increase in the diameter of the concave mirror is not preferable from the viewpoint of size reduction.

In an ultrawide-angle optical system, such as the projection system 40, the amount by which the focal point moves when the magnification is changed is relatively small because the focal length of the optical system is much shorter than the focal length of a typical projection system. Further, in a concave-mirror-containing optical system, which achieves a final wide field angle with the aid of the single mirror, a change in the projection distance results not only in large amounts of field curvature and astigmatism and therefore lowers the contrast but in a large change in distortion. Therefore, to correct the aberrations to sufficiently small amounts at the time of focusing, it is preferable to dispose a plurality of aspheric surfaces in positions closest to the enlargement side in the first optical group 40a for correction of the variety of types of aberration produced when the magnification is changed. To this end, it is preferable in the embodiment to change the distance between the two aspheric lenses that form the first-second lens group 42, which is a focusing group, to simultaneously perform the focusing and the aberration correction.

In the present embodiment or in Example 1, which corresponds thereto and will be described later, in which the range over which the magnification is changed is relatively wide, the two lenses that form the first-second lens group 42 are moved independently of each other. In a case where a narrow range over which the magnification is changed is set, sufficient focusing can be achieved by movement of only one of the two lenses or movement of the two lenses as an integral unit.

In the projection system 40, the lenses that form the first optical group 40a will be described below sequentially from the reduction side. First of all, in the first optical group 40a, the first-first lens group 41 and the first-second lens group 42 are formed of the ten lenses in total, as described above. In the first-first lens group 41, the reduction-side lens group E1 includes the lenses L1 to L7, and the enlargement-side lens group E2 includes the lens L8. The first-second lens group 42 includes the two lenses L9 and L10.

In the first-first lens group 41, the lens group E1, which is provided on the reduction side of the aperture stop ST, is so configured that the lenses L1, L2, L5, and L7 are each a positive convex lens and the lenses L3 and L6 are each a negative concave lens. The lens L4 is a positive meniscus lens having a convex surface facing the reduction side. The lenses L2 and L3 form a doublet. The lens L4 is an aspheric lens having two aspheric surfaces on opposite sides. The lenses L5, L6, and L7 form a triplet.

In the first-first lens group 41, the lens group E2, which is provided on the enlargement side of the aperture stop ST, is so configured that the lens L8 is a positive meniscus lens having a convex surface facing the enlargement side.

The lenses L1 to L8 are made of glass and are each a spherical lens except the lens L4. The lenses L1 to L8 each have a circular shape axially symmetric with respect to the optical axis OA.

In the first-second lens group 42, the lens L9 is a positive convex lens, and the lens L10 is a negative concave lens. The lenses L9 and L10 are each an aspheric lens made of a resin, have two aspheric surfaces on opposite sides, and have a circular shape axially symmetric with respect to the optical axis OA.

As described above, the first optical group 40a is formed of the ten lenses (lenses L1 to L10) in total.

The second optical group 40b is formed of the single mirror MR axially symmetric with respect to the optical axis OA and having a concave aspheric shape. The mirror MR reflects video image light having exited out of the first optical group 40a toward the surface to be irradiated with the image light, such as a screen.

The lenses L1 to L10, which form the first optical group 40a, and the mirror MR, which forms the second optical group 40b, each have a shape axially symmetric with respect to the optical axis OA, as described above. That is, the lenses L1 to L10 and the reflection surface of the mirror MR are rotationally symmetric with respect to the common optical axis OA.

In the thus configured projection system 40, the first optical group 40a forms the intermediate image on the upstream side of the second optical group 40b, as described above. That is, in the projection system 40, the first optical group 40a first forms an image on the upstream side of the second optical group 40b, which is a mirror, in other words, the first optical group 40a forms a primary image (intermediate image) on the upstream side of the mirror MR. Thereafter, in the projection system 40, the second optical group 40b forms an image again on the screen to perform proximate projection.

Further, in the projection system 40, the portion on the reduction side is a roughly telecentric system, as shown in FIGS. 4 and 5. Therefore, when the cross dichroic prism 19 combines the light fluxes modulated by the liquid crystal panels 18R, 18G, and 18B with one another to form image light, as described above, variation in the assembly of the cross dichroic prism 19 and the liquid crystal panels 18R, 18G, and 18B is unlikely to occur.

As described above, in the projection system 40 according to the present embodiment and the projector 2, which is a projection-type image display apparatus using the projection system 40, the projection system 40 includes the first optical group 40a, which forms an intermediate image, and the second optical group 40b, which enlarges and projects the intermediate image formed by the first optical group 40a, and the first optical group 40a and the second optical group 40b satisfy a variety of conditions, such as Conditional Expression (1) described above. Therefore, first of all, in the case where the projection system 40 is incorporated in the projector 2, an ultrawide field angle that allows enlargement and projection of an image at a half angle of view of 50° or greater is achieved. Further, in the above description, the optical path deflection system 60, which includes the two optical path deflectors AP1 and AP2, is disposed between the first optical group 40a and the second optical group 40b to allow a compact configuration in which the optical path is folded with deterioration in performance suppressed.

Figure 7A:
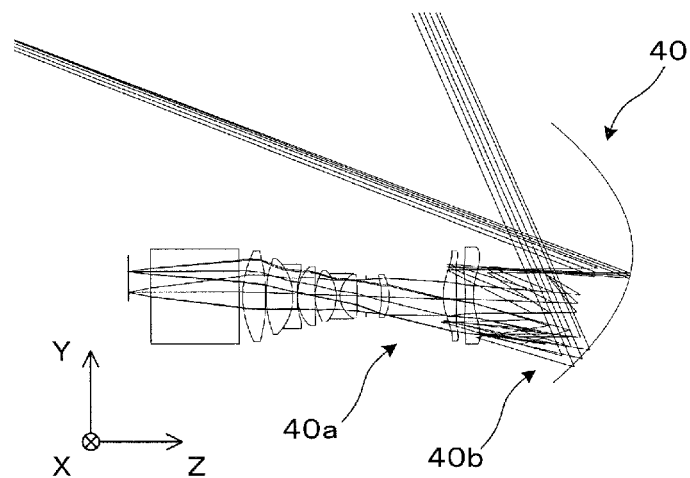
FIG. 7A is a configuration diagram and light ray diagram of a portion from the object plane to a concave reflection mirror in a projection system according to a variation.
Figure 7B:
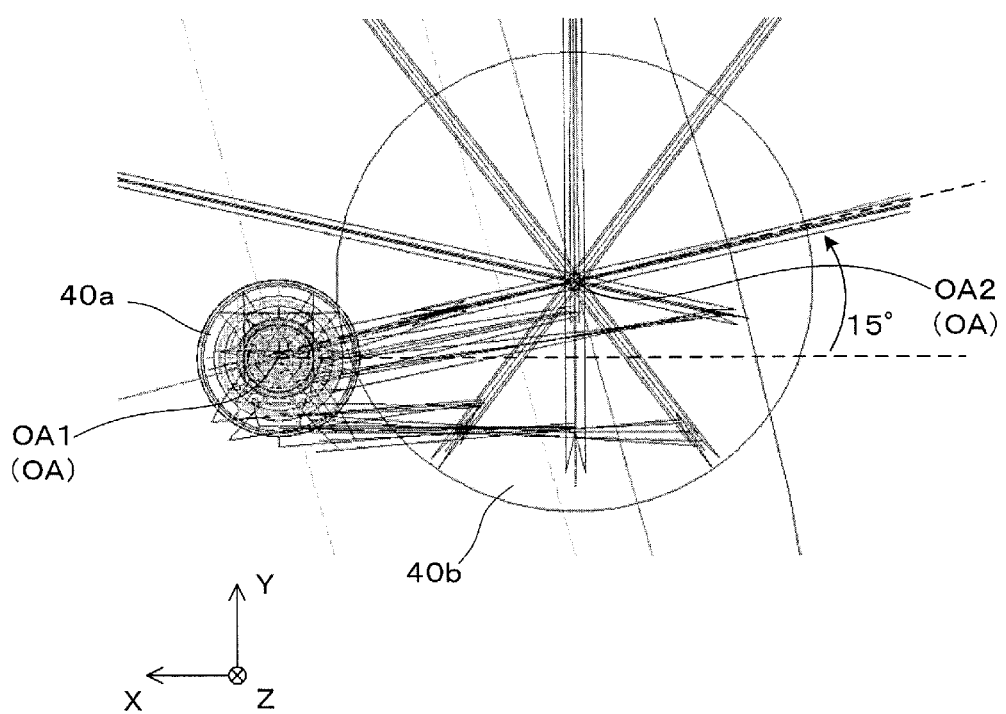
FIG. 7B is a rear view for showing the optical path in the projection system according to the variation viewed in another direction.

In the example described above, the optical axis OA does not incline with respect to the horizontal plane, that is, the plane XZ in the folding operation of the first optical path deflector AP1 and the second optical path deflector AP2, as shown, for example, in FIGS. 5 and 6. In contrast, as a variation, it is conceivable that the optical axis OA inclines with respect to the plane XZ in the reflection operation of the first optical path deflector AP1 as shown byway of example in FIGS. 7A and 7B, which correspond to FIGS. 5 and 6, respectively. That is, the first optical path deflector AP1 is conceivably so disposed that the direction of a normal to the reflection flat surface of the first optical path deflector AP1 contains a component in the direction Y. In the example shown in FIG. 7B, the first optical path deflector AP1 inclines counterclockwise by 15° around the optical axis OA1 of the first optical group 40a. That is, in the plan view in FIG. 7B, the straight line passing through the points representing the optical axis OA1 of the first optical group 40a and the optical axis OA2 of the second optical group 40b inclines by 15° with respect to the direction X. In other words, the optical axis OA deflected by the first optical path deflector AP1 inclines with respect to the horizontal axis or the vertical axis of the plane in the reduction-side conjugate position, that is, the optical axis OA is not parallel to the direction X or the direction Y in a plane parallel to the plane XY.

In a refraction/reflection complex optical system, such as that in the present embodiment, in which the light flux having exited out of a first optical group is reflected off a second optical group, so that a paraxial light flux having exited out of the first optical group is reflected off the second optical group, then returns toward the first optical group, and interferes therewith. To avoid the situation described above, the entire screen needs to be shifted in the upward/downward direction to a height where the light flux does not interfere with the first optical group. In the second optical group 40b, the effective range of the actually used optical system is shifted downward with respect to the optical axis OA' of the first optical group 40a. Therefore, for example, in the case where the optical axis does not incline, as in the example shown in FIGS. 5 and 6, a partially protruding portion is likely to be present in a lower portion of the enclosure. Further, to place a cover glass plate or any other component in the image light ray exiting position located roughly on the optical axis, it is likely to be necessary to cut the enclosure SC in such a way that the exiting light rays do not interfere with the enclosure. It is further likely to be necessary to cut part of a lens or otherwise shape the lens to avoid interference between the mirror that forms the second optical group 40b and the enlargement-side lens of the first optical group 40a. To solve the problems described above, it is believed that the inclining configuration shown in FIGS. 7A and 7B by way of example allows simplification of the overall arrangement, reduction in the thickness of the apparatus, and other advantageous effects, whereby the possible necessary measures described above can be avoided or suppressed.

Figure 8A:
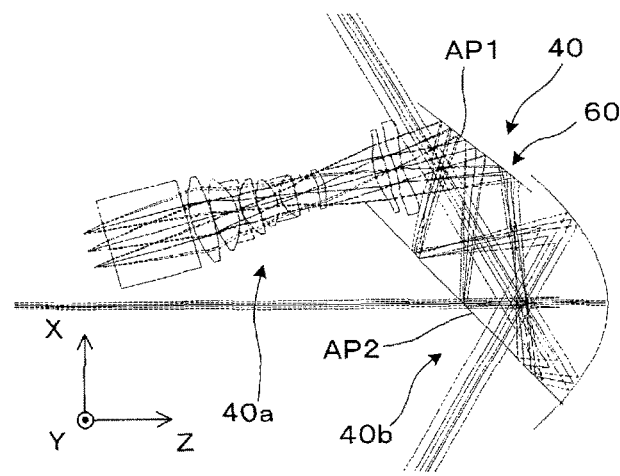
FIG. 8A is a configuration diagram and light ray diagram of a portion from the object plane to a concave reflection mirror in a projection system according to another variation.
Figure 8B:
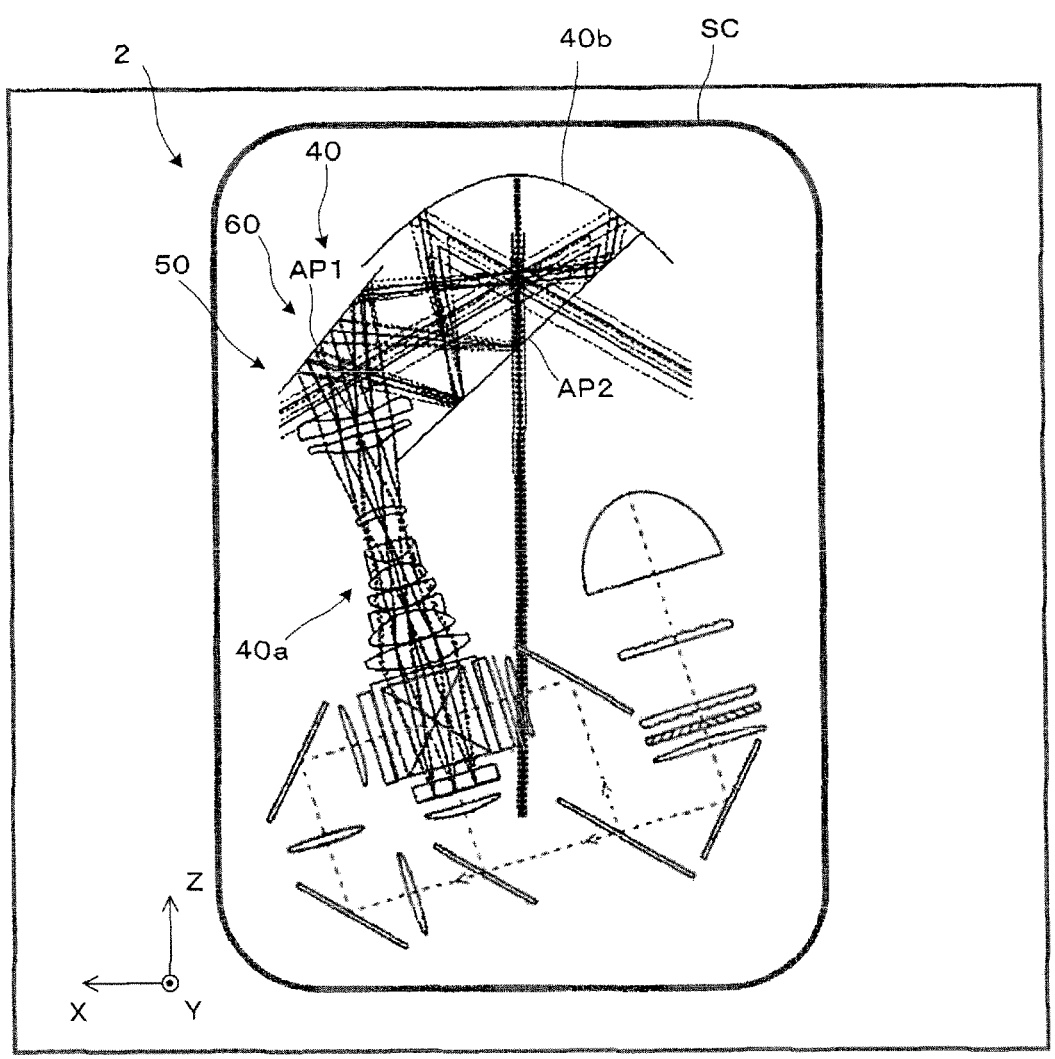
FIG. 8B is a plan view showing a projector in which the projection system according to the other variation is incorporated in an enclosure.

In the optical path deflection system 60, the first optical path deflector AP1 and the second optical path deflector AP2 are so disposed as to be parallel to each other, in the example shown in FIGS. 2 to 6. That is, the optical axis OA' of the first optical group 40a and the optical axis OA2 of the second optical group 40b, which is the optical axis deflected by the optical path deflection system 60, are parallel to each other, and the direction in which the optical axis OA' extends coincides with the direction in which the optical axis OA2 extends. In this case, the projection system 40 can be accommodated in the enclosure SC, which has a roughly square shape, as shown, for example, in FIG. 3. In contrast, it is conceivable as another variation that the first optical path deflector AP1 and the second optical path deflector AP2 incline with respect to each other, as shown by way of example in FIGS. 8A and 8B, which correspond to FIGS. 4 and 3, respectively. In the example shown in FIGS. 8A and 8B, the first optical path deflector AP1 and the second optical path deflector AP2 incline by 7.5° with respect to each other. In this case, for example, the lateral width of the enclosure SC can be further reduced by folding the ramp portion of the optical engine.

Second Embodiment

A projection system according to a second embodiment and a projection-type image display apparatus incorporating the projection system will be described below in detail with reference to FIGS. 9 to 11A and 11B. The present embodiment is a variation of the first embodiment and is the same as the first embodiment except that the second optical group is formed of a plurality of lenses in the projection system. Therefore, portions having the same functions as those in the first embodiment have the same names and reference characters and will not be described in detail.

Figure 10:
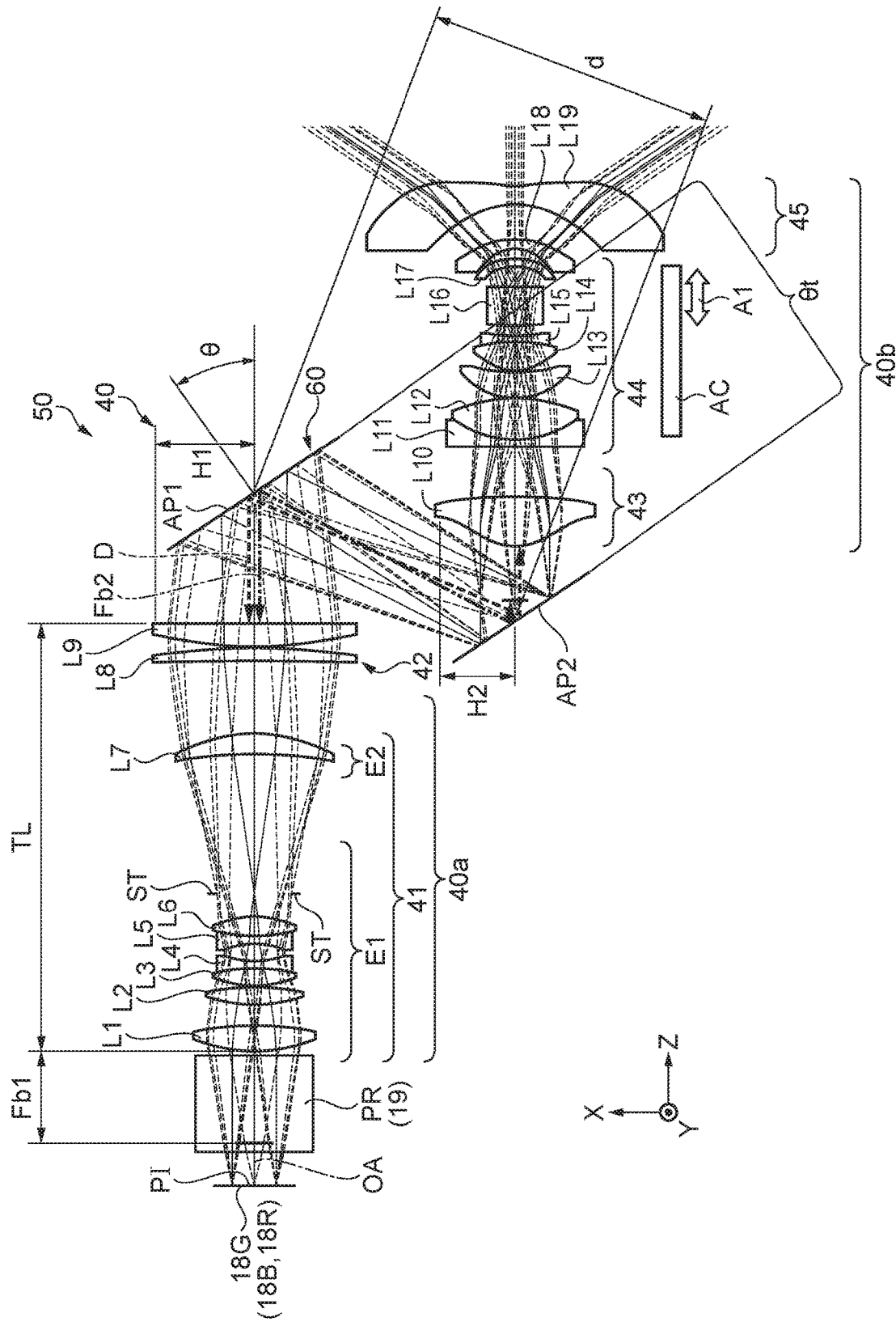
FIG. 10 is a configuration diagram and light ray diagram of a portion from the object plane to a concave reflection mirror in the projection system according to the second embodiment or Example 4.
Figure 11A:
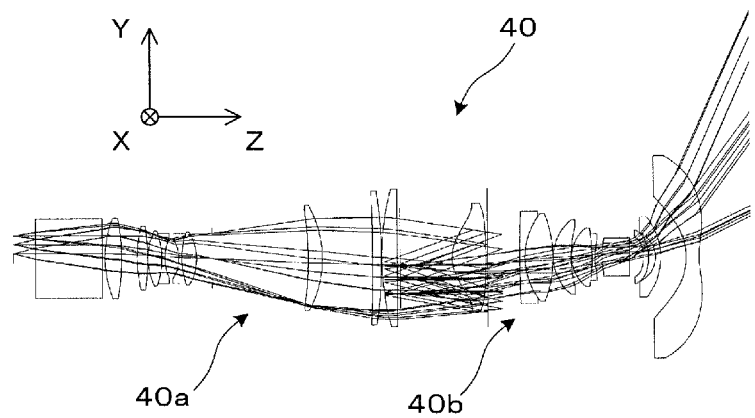
FIG. 11A is another configuration diagram and light ray diagram of the portion from the object plane to the concave reflection mirror in the projection system according to the second embodiment or Example 4.
Figure 11B:
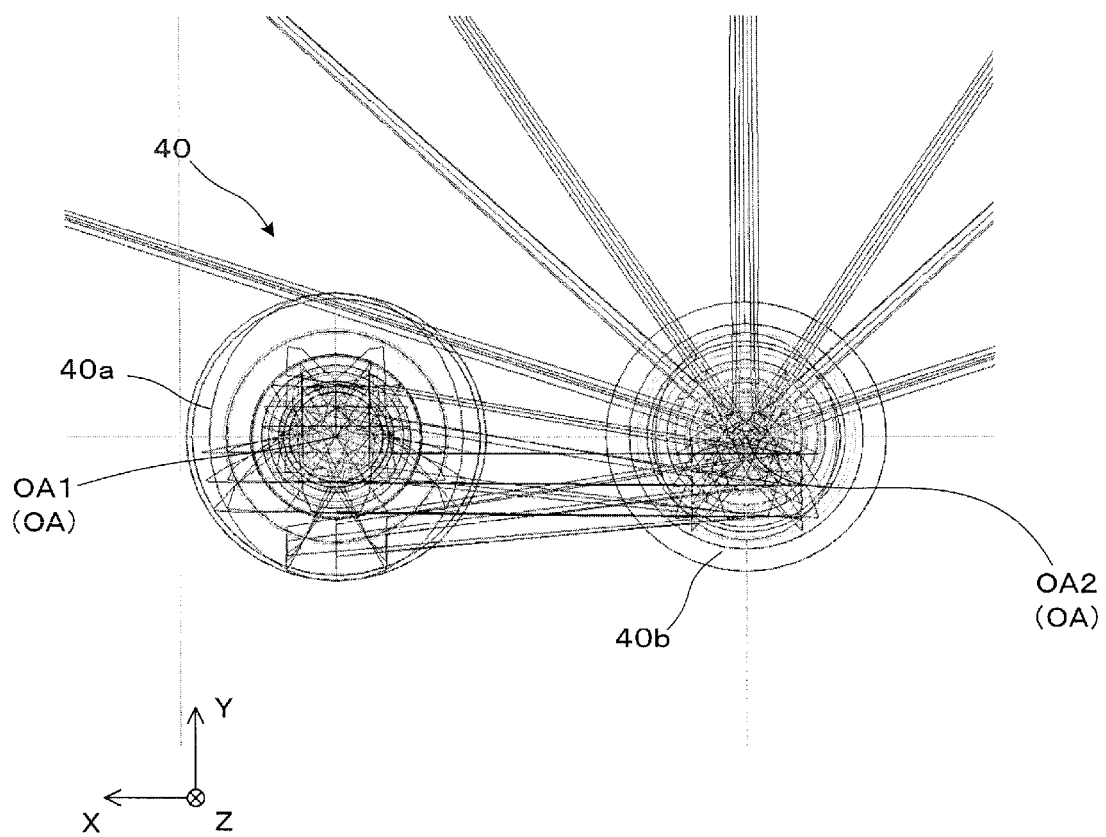
FIG. 11B is a rear view for showing the optical path in the projection system viewed in another direction.

FIG. 9 is a plan view showing a projector in which the projection system according to the present embodiment or Example 4 is incorporated in the enclosure and corresponds to FIG. 3. FIGS. 10 and 11A are each a configuration diagram and light ray diagram of the portion from the object plane to the concave reflection mirror in the projection system and correspond to FIGS. 4 and 5, respectively. FIG. 11B is a rear view for showing the optical path in the projection system viewed in another direction and corresponds to FIG. 6.

The projection system 40 according to the present embodiment differs from the projection system 40 according to the first embodiment, in which out of the first optical group 40a and the second optical group 40b, the second optical group 40b is formed of the single mirror having a concave aspheric reflection surface, in that the second optical group 40b is formed of a plurality of lenses including at least a single aspheric lens having negative power. That is, in the present embodiment, the plurality of lenses that form the second optical group 40b enlarge and project the intermediate image formed by the first optical group 40a toward a surface to be irradiated with the image light, such as a screen, with the half angle of view being greater than or equal to 50°.

The projection system 40 according to the present embodiment will be specifically described below with reference to FIGS. 10 and 11A and other figures. The projection system 40 shown in FIGS. 10 and 11A and other figures by way of example has the same configuration as that of the projection system 40 according to Example 4, which will be described later.

First of all, also in the present embodiment, the optical path deflection system 60, which is formed of the first and second optical path deflectors AP1, AP2, is disposed between the first optical group 40a and the second optical group 40b. The arrangement allows the optical path to be folded with degradation in the performance of the optical function of the two optical groups suppressed, whereby the size of the entire apparatus is reduced.

Specific examples of the configurations of the first optical group 40a and the second optical group 40b, which are each an optically functional primary section of the projection system 40, will be described below.

The projection system 40 is formed of the first optical group 40a, which is formed of a plurality of lenses, and the second optical group 40b, which is formed of a plurality of lenses, sequentially arranged from the reduction side. That is, the second optical group 40b is formed only of a refractive system and includes no reflective optical system.

The first optical group 40a forms an intermediate image of an image display device disposed in the reduction-side conjugate position, which is conjugate with the intermediate image, and the second optical group 40b enlarges the intermediate image formed by the first optical group 40a and projects the enlarged intermediate image toward the surface to be irradiated with the image light, such as a screen, as in the first embodiment.

The first optical group 40a is formed of a first-first lens group 41, which is provided on the reduction side and has positive power, and a first-second lens group 42, which is provided on the enlargement side and has positive or negative power. The first optical group 40a is formed of nine lenses L1 to L9, with part of the lenses forming the first-first lens group 41 and the remainder forming the first-second lens group 42.

The first-first lens group 41 has an aperture stop ST provided therein, and it is assumed that the first-first lens group 41 is formed of a lens group E1 on the reduction side of the aperture stop ST and a lens group E2 on the enlargement side of the aperture stop ST in the description. In the example shown in FIG. 10, the lens group E1 is formed of the lenses L1 to L6, and the lens group E2 is formed of the lens L7.

In the example shown in FIG. 10, the first-second lens group 42 is formed of two lenses, that is, the lenses L8 and L9. Out of the two lenses, the reduction-side lens L8 is a positive meniscus lens having a convex surface facing the enlargement side. On the other hand, the enlargement-side lens L9 is a positive meniscus lens having a convex surface facing the reduction side.

The first-first lens group 41 and the first-second lens group 42 are each a fixed group that does not move in the optical axis direction, for example, when focusing is performed.

The second optical group 40b is formed of a second-first lens group 43, which is provided on the reduction side, a second-second lens group 44, which is provided on the enlargement side of the second-first lens group 43, and a second-third lens group 45, which is provided on the enlargement side of the second-second lens group 44, that is, in a position closest to the enlargement side. The second optical group 40b is formed of ten lenses L10 to L19, with one part of the lenses forming the second-first lens group 43, another part of the lenses forming the second-second lens group 44, and the remainder forming the second-third lens group 45.

The second-first lens group 43 is formed of one lens, the lens L10. The second-second lens group 44 is formed of eight lenses, the lenses L11 to L18. The second-third lens group 45 is formed of one lens, the lens L19.

In the example shown in FIG. 10, the second-first lens group 43 and the second-third lens group 45 are each a fixed group that does not move in the optical axis direction, for example, when focusing is performed. On the other hand, the second-second lens group 44 moves in the optical axis direction when focusing is performed in association with a change in magnification. That is, when focusing is performed in association with a change in magnification, the second-second lens group 44 brings an image into focus by moving at least one of the eight lenses L11 to L18 with the aid of the actuator AC in the optical axis direction, that is, the direction A1 along the optical axis OA. The actuator AC can move the lenses in a variety of aspects in accordance with the aspect in which the focusing is performed when the magnification is changed. For example, the lenses may be moved independently of each other or may be moved in synchronization with each other, for example, by using a cam mechanism.

Also in the present embodiment, Conditional Expressions (1) to (3) are satisfied, as in the first embodiment. As for the condition on the focal length of the entire projection system 40 and the focal length of the first optical group 40a, however, the following conditional expression is satisfied instead of Conditional Expression (4):

$$|F/F1| < 0.06 \quad (5)$$

Conditional Expression (5) represents a condition that allows the second optical group 40b to be formed of a plurality of lenses.

In the present embodiment, the second optical group 40b can be formed of a combination of a plurality of lenses, as described above. In the case where the second optical group 40b is formed of a concave mirror, the light rays having exited out of the first optical group 40a are preferably received as divergent light by the concave mirror, as described in the first embodiment by way of example. In contrast, in the case where the light rays are received by a refractive system formed only of lenses, as in the present embodiment, the light rays having exited out of the first optical group 40a are desirably roughly telecentric light rays to avoid a possibility of a very large reduction-side lens of the second optical group 40b or a possibility of chromatic aberrations generated by the second optical group 40b. That is, the first optical group 40a preferably has positive or negative small power. The reason for this is that the second optical group 40b can therefore readily correct the aberrations.

When the first optical group 40a has large negative power and $|F/F1|$ is greater than the upper limit set by Conditional Expression (5), the light rays having exited out of the first optical group 40a are excessively convergent. Therefore, the size of the reduction-side lens of the second optical group 40b can be reduced, but the size of the enlargement-side lens of the first optical group 40a is undesirably too large.

When the first lens group has large positive power and $|F/F1|$ is greater than the upper limit set by Conditional Expression (5), the light rays having exited out of the first lens group are excessively divergent. Therefore, the size of the enlargement-side lens of the first optical group 40a can be reduced, but the size of the reduction-side lens of the second optical group 40b increases, and it is difficult to correct aberrations in the second optical group 40b, requiring a complicated lens configuration, which is not preferable also from the viewpoint of cost.

In the projection system 40, the lenses that form the first optical group 40a and the second optical group 40b will be described below sequentially from the reduction side, with reference to FIGS. 10 and 11A. First of all, in the first optical group 40a, the first-first lens group 41 and the first-second lens group 42 are formed of the nine lenses in total, as described above. In the first-first lens group 41, the reduction-side lens group E1 includes the lenses L1 to L6, and the enlargement-side lens group E2 includes the lens L7. The first-second lens group 42 includes the two lenses L8 and L9.

In the first-first lens group 41, the lens group E1, which is provided on the reduction side of the aperture stop ST, is so configured that the lenses L1, L2, L3, and L6 are each a positive convex lens and the lenses L4 and L5 are each a negative concave lens. The lenses L3 and L4 form a doublet. The lenses L5 and L6 form a doublet.

In the first-first lens group 41, the lens group E2, which is provided on the enlargement side of the aperture stop ST, is so configured that the lens L7 is a positive meniscus lens having a convex surface facing the enlargement side. The lenses L1 to L7 are made of glass, are each a spherical lens except the lens L4, and each have a circular shape axially symmetric with respect to the optical axis OA.

In the first-second lens group 42, the lens L8 is a positive meniscus lens having a convex surface facing the enlargement side, and the lens L9 is a positive meniscus lens having a convex surface facing the reduction side. The lenses L8 and L9 are made of glass, are each a spherical lens except the lens L4, and each have a circular shape axially symmetric with respect to the optical axis OA.

As described above, the first optical group 40a is formed of the nine lenses (lenses L1 to L9) in total.

In the second optical group 40b, the second-first lens group 43, the second-second lens group 44, and the second-third lens group 45 are formed of the ten lenses in total, as described above. The second-first lens group 43 includes the lens L10, the second-second lens group 44 includes the lenses L11 to L18, and the second-third lens group 45 includes the lens L19.

The lens L10 of the second-first lens group 43 is a positive lens having a convex shape in the vicinity of the optical axis. The lens L10 is an aspheric lens made of a resin, has two aspheric surfaces on opposite sides, and has a circular shape axially symmetric with respect to the optical axis OA.

In the second-second lens group 44, the lens L11 is a negative meniscus lens having a convex surface facing the reduction side. The lens L12 is a positive convex lens. The lens L13 is a positive meniscus lens having a convex surface facing the reduction side. The lens L14 is a positive convex lens. The lens L15 is a negative concave lens. The lens L16 is a positive meniscus lens having a convex surface facing the reduction side. The lens L17 is a positive meniscus lens having a convex surface facing the enlargement side. The lens L18 is a negative meniscus lens having a convex surface facing the enlargement side. The lenses L11 to L18 are made of glass, are each a spherical lens, and each have a circular shape axially symmetric with respect to the optical axis OA.

The lens L19 of the second-third lens group 45 is a negative lens having a concave shape in the vicinity of the optical axis. The lens L19 is an aspheric lens made of a resin, has two aspheric surfaces on opposite sides, and has a circular shape axially symmetric with respect to the optical axis OA.

As described above, in the projection system 40 according to the present embodiment and the projector 2, which is a projection-type image display apparatus using the projection system 40, the projection system 40 includes the first optical group 40a, which forms an intermediate image, and the second optical group 40b, which enlarges and projects the intermediate image formed by the first optical group 40a, and the first optical group 40a and the second optical group 40b satisfy a variety of conditions, such as Conditional Expression (1). Therefore, first of all, in the case where the projection system 40 is incorporated in the projector 2, an ultrawide field angle that allows enlargement and projection of an image at a half angle of view of 50° or greater is achieved. Further, in the above description, the optical path deflection system 60, which includes the two optical path deflectors AP1 and AP2, is disposed between the first optical group 40a and the second optical group 40b to allow a compact configuration in which the optical path is folded with deterioration in performance suppressed.

In particular, in the present embodiment, the second optical group 40b, which is a relay optical system, is formed only of a plurality of lenses, that is, a refractive optical system. In this case, the overall length of the second optical group 40b is undesirably greater than the overall length of the optical system using the concave mirror shown in the first embodiment. In the optical system using the concave mirror, however, in which the optical path is folded by the second optical group 40b and returns toward the first optical group 40a, the returning optical path is likely to interfere with a lens or any other component. Restriction is therefore likely to be imposed, for example, a shift mechanism that moves the projection screen upward or downward cannot be used. In contrast, in an ultrawide-angle projection system formed only of a refractive optical system, as in the present embodiment, it is believed that the positional shift of the screen described above is readily performed.

Figure 12A:
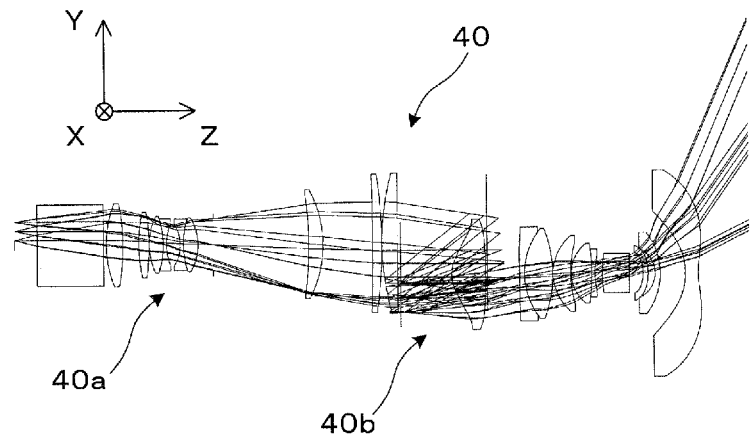
FIG. 12A is a configuration diagram and light ray diagram of a portion from the object plane to a concave reflection mirror in a projection system according to a variation.
Figure 12B:
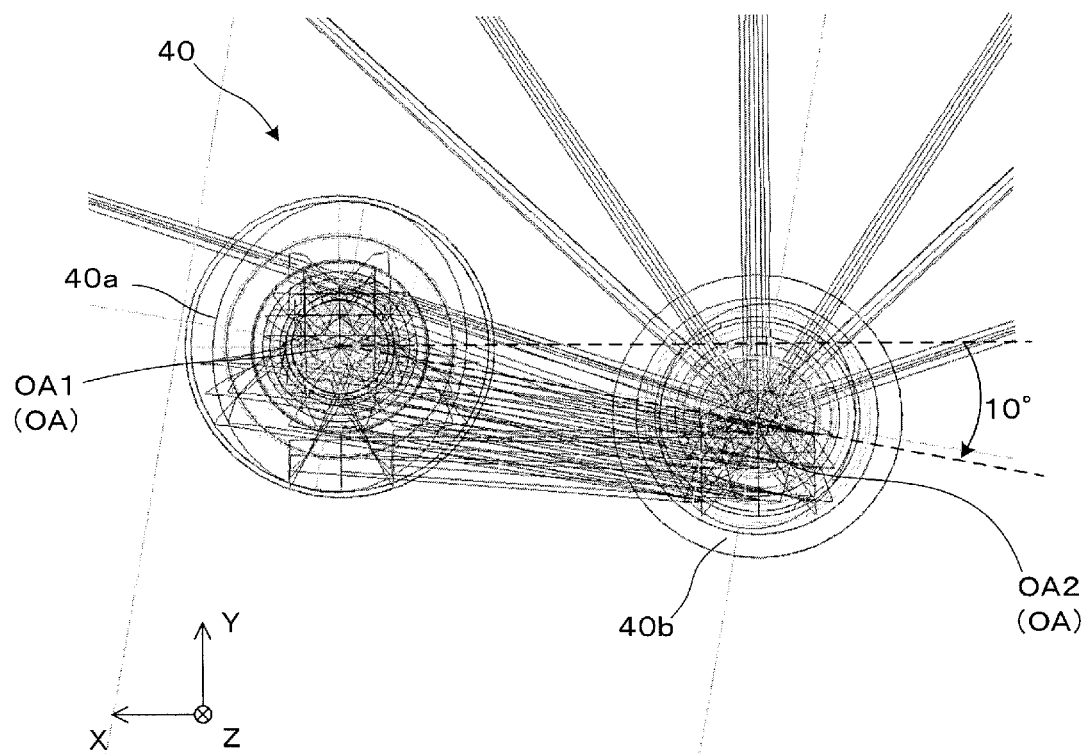
FIG. 12B is a rear view for showing the optical path in the projection system according to the variation viewed in another direction.

In the example described above, the optical axis OA does not incline with respect to the horizontal plane, that is, the plane XZ in the folding operation of the first optical path deflector AP1 and the second optical path deflector AP2, as shown, for example, in FIGS. 11A and 11B. In contrast, as a variation, it is conceivable that the optical axis OA inclines with respect to the plane XZ in the reflection operation of the first optical path deflector AP1 as shown by way of example in FIGS. 12A and 12B, which correspond to FIGS. 11A and 11B, respectively. That is, the first optical path deflector AP1 is conceivably so disposed that the direction of a normal to the reflection flat surface of the first optical path deflector AP1 contains a component in the direction Y. In the example shown in FIG. 12B, the first optical path deflector AP1 inclines clockwise by 10° around the optical axis OA1 of the first optical group 40a. That is, in the plan view in FIG. 12B, the straight line passing through the points representing the optical axis OA1 of the first optical group 40a and the optical axis OA2 of the second optical group 40b inclines by 10° with respect to the direction X, so that the second optical group 40b is lowered toward the side −Y.

In shift projection, as in the present embodiment, the dimension of the apparatus in the height direction, that is, in the direction Y is roughly determined by the effective aperture diameter of the enlargement-side lens of the first optical group 40a in the direction Y and the effective aperture diameter of the enlargement-side lens of the second optical group 40b in the direction Y. It is therefore conceivable that the upper portion of the second optical group 40b protrudes above the upper portion of the first optical group 40a and forms the highest portion, as shown, for example, in FIG. 11B. In contrast, in the case shown in FIG. 12B, the light ray reflected by the first optical path deflector AP1 is rotated clockwise by 10° around the optical axis OA1 of the first optical group 40a. The height of the light ray flux that exits out of the second optical group 40b is therefore lowered, whereby the entire enclosure can be lowered.

Other Conditions

Conditions common to the first and second embodiments described above will be described below. The projection system 40 shown in each of the embodiments satisfies the following Conditional Expressions (6) to (8) as well as Conditional Expressions (1) to (3) described above.

First of all, the projection system 40 satisfies the following conditional expression:

$$0.3 < d/D < 0.6 \qquad (6)$$

where D represents the distance from the surface closest to the enlargement side in the first optical group 40a to the surface closest to the reduction side in the second optical group 40b, and d represents the on-axis length of the optical path deflection system 60.

Conditional Expression (6) represents a condition on the ratio of the on-axis length d between the two optical path deflectors AP1 and AP2 provided between the two optical groups 40a and 40b to the distance D between the first optical group 40a and the second optical group 40b and represents a condition that prevents the light ray flux from interfering with the two optical groups 40a and 40b or the two optical path deflectors AP1 and AP2 after the optical path deflection system 60 deflects the optical axis.

When d/D is smaller than the lower limit set by Conditional Expression (6), the inter-optical-axis distance between the two optical path deflectors AP1 and AP2 is too short, so that the optical axis OA' of the first optical group 40a and the optical axis OA2 of the second optical group 40b are too close to each other. In this case, particularly in the case where the second optical group 40b is formed of a mirror, as in the first embodiment, the possibility of interference between the first optical path deflector AP1 and the second optical group 40b undesirably increases.

When d/D is greater than the upper limit set by Conditional Expression (6), the inter-optical-axis distance between the two optical path deflectors AP1 and AP2 is too long, so that possibilities of interference of the light ray flux of the image light having exited out of the first optical path deflector AP1 with the first optical group 40a and interference of the light ray flux incident on the second optical path deflector AP2 with the second optical group 40b undesirably increase.

The projection system 40 further satisfies the following conditional expression:

$$30° < \theta < 50° \quad (7)$$

where θ represents the angle of incidence of the light ray flux emitted from the first optical group 40a on the first optical path deflector AP1.

When θ is smaller than the lower limit set by Conditional Expression (7), the angle of incidence on the first optical path deflector AP1 is too small, so that the light ray flux having passed through the first optical group 40a and having been deflected by the first optical path deflector AP1 is likely to be interfered by the second optical group 40b. As a result of an attempt to avoid the interference, the distance between the first optical group 40a and the second optical group 40b needs to be further increased, undesirably causing an increase in the size of the second optical group 40b.

When θ is greater than the upper limit set by Conditional Expression (7), particularly in the case where the second optical group 40b is formed of a concave mirror, as in the first embodiment, the concave mirror has a deeply shaped reflection surface, and it is therefore difficult to satisfactorily dispose the second optical path deflector AP2 and the second optical group 40b with no interference with each other.

It is therefore preferable that θ is so set as to fall within the range defined by Conditional Expression (7), and θ shown in the embodiments described above byway of example satisfies the condition described above.

In the projection system 40, the optical path deflection system 60 satisfies the following conditional expression:

$$\theta t < 15° \quad (8)$$

where θt represents the angle between the reflection surface of the first optical path deflector AP1 and the reflection surface of the second optical path deflector AP2.

In a case where the two optical path deflectors AP1 and AP2 are parallel to each other, that is, the angle θt is equal to zero in Conditional Expression (8), it is believed that producing the two optical path deflectors AP1 and AP2, for example, integrated with each other allows inspection thereof using a collimator or any other tool to be readily performed. On the other hand, to aim further reduction in size of the entire apparatus, it is conceivable that the two optical path deflectors AP1 and AP2 are not parallel to each other but the parallelism is caused to deteriorate to some extent, as described with reference to FIGS. 8A and 8B. However, if the angle θt between the two reflection surfaces that form the two optical path deflectors AP1 and AP2 is too large to fall within the range set by Conditional Expression (8), it is difficult to prevent the light ray fluxes corresponding to the screen peripheries from interfering with each other in order particularly to ensure the optical path.

EXAMPLES

Specific examples of the projection system 40 will be described below. The meanings of a variety of parameters common to Examples 1 to 6, which will be described below, are summarized below. Eccentricity or rotation in the tables shown below represents the inclination of each of the reflection surfaces that form the first and second optical path deflectors AP1, AP2.

f: Focal length of entire optical system

ω: Half angle of view

FNo: F-Number

R: Radius of curvature

D: On-axis inter-surface space (thickness of lens or space between lenses)

Nd: Refractive index at d line vd: Abbe number at d line

H: Effective aperture radius

An aspheric surface is expressed by the following polynomial (expression of aspheric surface):

Even-Number High-Order Aspheric Surface:

$$z = \frac{ch^2}{1 + \sqrt{1-(k+1)c^2h^2}} + A04 \cdot h^4 + A06 \cdot h^6 + A08 \cdot h^8 + A10 \cdot h^{10} + A12 \cdot h^{12} + A14 \cdot h^{14}$$

Odd-Number High-Order Aspheric Surface:

$$z = \frac{ch^2}{1 + \sqrt{1-(k+1)c^2h^2}} + A04 \cdot h^3 + A06 \cdot h^4 + A08 \cdot H^5 + A10 \cdot h^6 + A12 \cdot h^7 + A14 \cdot h^8 + A04 \cdot h^9 + A06 \cdot h^{10} + A08 \cdot h^{11} + A10 \cdot h^{12} + A12 \cdot h^{13} + A14 \cdot h^{14}$$

The parameters in the polynomial are as follows:

c: Curvature (1/R)

h: Height from optical axis k: Conic coefficient of aspheric surface

Ai: Higher-order aspheric coefficient of aspheric surface

OBJ stands for the panel surface PI. STO stands for the aperture stop ST. IMG stands for the image plane (projection plane) on the screen. A surface labeled with a surface number followed by "*" or "**" is a surface having an aspheric shape, with "*" representing an even-number high-order aspheric surface and "**" representing an odd-number high-order aspheric surface.

Example 1

Table 1 shown below shows data on the lens surfaces in Example 1.

TABLE 1

F 2.88
FNo 2.44
ω 71.8

| Surface number | R | D | Nd | Vd | H | Eccentricity (rotation) |
|---|---|---|---|---|---|---|
| OBJ | Infinity | 6.060 | | | | |
| 1 | Infinity | 22.920 | 1.51633 | 64.1 | | |
| 2 | Infinity | 1.000 | | | | |
| 3 | 29.122 | 5.929 | 1.92286 | 20.9 | 11.47 | |
| 4 | −53.481 | 0.150 | | | 11.12 | |
| 5 | 30.494 | 7.000 | 1.49700 | 81.5 | 9.50 | |
| 6 | −14.959 | 1.000 | 1.92286 | 20.9 | 7.96 | |
| 7 | 22.255 | 0.150 | | | 7.25 | |
| *8 | 12.5 | 4.491 | 1.49700 | 81.5 | 7.26 | |
| *9 | 89.379 | 0.135 | | | 6.72 | |
| 10 | 13.933 | 5.500 | 1.48749 | 70.2 | 6.20 | |
| 11 | −11.01 | 1.000 | 1.90043 | 37.4 | 5.35 | |
| 12 | 7.14 | 4.500 | 1.76182 | 26.5 | 4.92 | |
| 13 | −67.809 | 2.313 | | | 4.85 | |
| STO | Infinity | 4.000 | | | 4.63 | |
| 15 | −18.813 | 2.000 | 1.80000 | 29.8 | 4.96 | |
| 16 | −13.423 | d16 | | | 5.20 | |
| *17 | 15.914 | 3.500 | 1.53116 | 56.0 | 11.09 | |
| *18 | −93.779 | d18 | | | 11.37 | |
| *19 | −34.888 | 2.000 | 1.53116 | 56.0 | 11.92 | |
| *20 | 18.542 | d20 | | | 12.72 | |
| 21 | Infinity | 0.000 | Reflection surface | | | −35.0 |
| 22 | Infinity | −48.000 | | | | −35.0 |
| 23 | Infinity | 0.000 | Reflection surface | | | 35.0 |
| 24 | Infinity | 37.000 | | | | 35.0 |
| *25 | −28.425 | d25 | Reflection surface | | | 35.10 |

In Table 1 shown above and the following tables, 10 raised to some power ($1.00 \times 10^{+18}$, for example) is expressed by using E (1.00E+18, for example).

Table 2 shown below shows aspheric coefficients of the lens surfaces in Example 1.

TABLE 2

| Surface number | \multicolumn{5}{c}{Even-ordered Aspheric coefficient} |
|---|---|---|---|---|---|
| | 8 | 9 | 17 | 18 | 19 |
| K | 0.00000 | 0.00000 | 0.00000 | 0.00000 | 6.23015 |
| A04 | 3.4798E−05 | 1.0184E−05 | −1.5438E−04 | 2.0444E−06 | 1.4603E−04 |
| A06 | −7.1435E−08 | −7.7442E−07 | 5.8105E−07 | 1.6057E−06 | 4.2397E−07 |
| A08 | 5.5192E−09 | −2.4043E−09 | −3.9570E−09 | −8.8620E−09 | −3.1498E−09 |
| A10 | 0.0000E+00 | 0.0000E+00 | 0.0000E+00 | 0.0000E+00 | 0.0000E+00 |
| A12 | 0.0000E+00 | 0.0000E+00 | 0.0000E+00 | 0.0000E+00 | 0.0000E+00 |
| A14 | 0.0000E+00 | 0.0000E+00 | 0.0000E+00 | 0.0000E+00 | 0.0000E+00 |

| 20 | 25 |
|---|---|
| 0.00000 | −0.57313 |
| −1.4966E−04 | 6.3727E−06 |
| 2.6829E−07 | −3.0433E−09 |
| −2.7439E−10 | 2.7284E−12 |
| −5.0735E−12 | −1.0655E−15 |
| 0.0000E+00 | 1.7204E−19 |
| 0.0000E+00 | 8.5761E−23 |

Table 3 shown below shows the values of the variable spaces d16, d18, d20, and d25 in Table 1 in a case where the projection distance is changed.

TABLE 3

| | \multicolumn{4}{c}{Variable space} |
|---|---|---|---|---|
| Projection distance | Reference distance | Short distance | Long distance |
| d16 | 14.008 | 13.739 | 14.204 |
| d18 | 2.343 | 2.373 | 2.320 |
| d20 | 21.139 | 21.310 | 21.898 |
| d25 | −376.756 | −305.444 | −504.330 |

FIG. 13 is a cross-sectional view of the projection system according to Example 1. The projection system shown in FIG. 13 corresponds to the projection system 40 according to the first embodiment. In FIG. 13, the first and second optical path deflectors AP1, AP2, which each only fold the optical path but have no power, are omitted, and the folding operation of the two optical path deflectors is drawn in the form of a development. In FIG. 13, the projection system 40 enlarges and projects an image on the panel surface PI at the magnification according to the distance to the screen. The first optical group 40a of the projection system 40 includes the ten lenses L1 to L10, the lenses L1 to L7, which form the lens group E1 of the first-first lens group 41, the lens L8, which forms the lens group E2 of the first-first lens group 41, and the lenses L9 and L10, which form the first-second lens group 42, sequentially arranged from the reduction side. The magnification is changed when the projection position is changed (projection distance is changed), for example, in a case where projection to a wall surface is changed to projection to a floor surface. When focusing is performed in association with a change in magnification, as described above, the first-first lens group 41 remains fixed, whereas the first-second lens group 42 is moved. That is, in the first-second lens group 42, the two lenses L9 and L10 are moved independently of each other when the magnification is changed to bring an image into focus.

The lenses L1 to L10 and other components have been described in detail with reference to FIG. 4 and other figures and are summarized below. The first optical group 40a is formed of the following ten lenses sequentially arranged from the reduction side: the positive biconvex first lens L1; the doublet of the positive biconvex second lens L2 and the negative biconcave third lens L3; the positive fourth lens L4 having a meniscus shape having a convex surface facing the reduction side and having aspheric surfaces on opposite sides; the triplet of the positive biconvex fifth lens L5, the negative biconcave sixth lens L6, and the positive biconvex seventh lens L7; the positive eighth lens L8 having a meniscus shape having a convex surface facing the enlargement side; the positive ninth lens L9 having a biconvex shape in the vicinity of the optical axis and having aspheric surfaces on opposite sides; and the negative tenth lens L10 having a biconcave shape in the vicinity of the optical axis and having aspheric surfaces on opposite sides.

The first optical path deflector AP1, which deflects the optical axis OA' of the first optical group 40a, and the second optical path deflector AP2, which causes the optical axis OA folded by the first optical path deflector AP1 to be oriented again in the direction in which the optical axis OA' of the first optical group 40a extends, are disposed between the first optical group 40a and the second optical group 40b, and the second optical group 40b finally enlarges and projects an image.

When the angle of incidence of the light having exited out of the first optical group 40a and incident on the first optical path deflector AP1 is set at 45°, the light is deflected by 90°, whereas when the angle of incidence θ is set at 45° or smaller, the position of the second optical group 40b can be so moved in the optical axis direction to advantageously achieve size reduction. To this end, θ is set at 35° in Example 1.

The mirror MR, which forms the second optical group 40b, is formed of a single aspheric mirror having a concave shape. Specific data on each of the lenses, such as the curvature, are shown in Table 1 described above.

Figure 14:
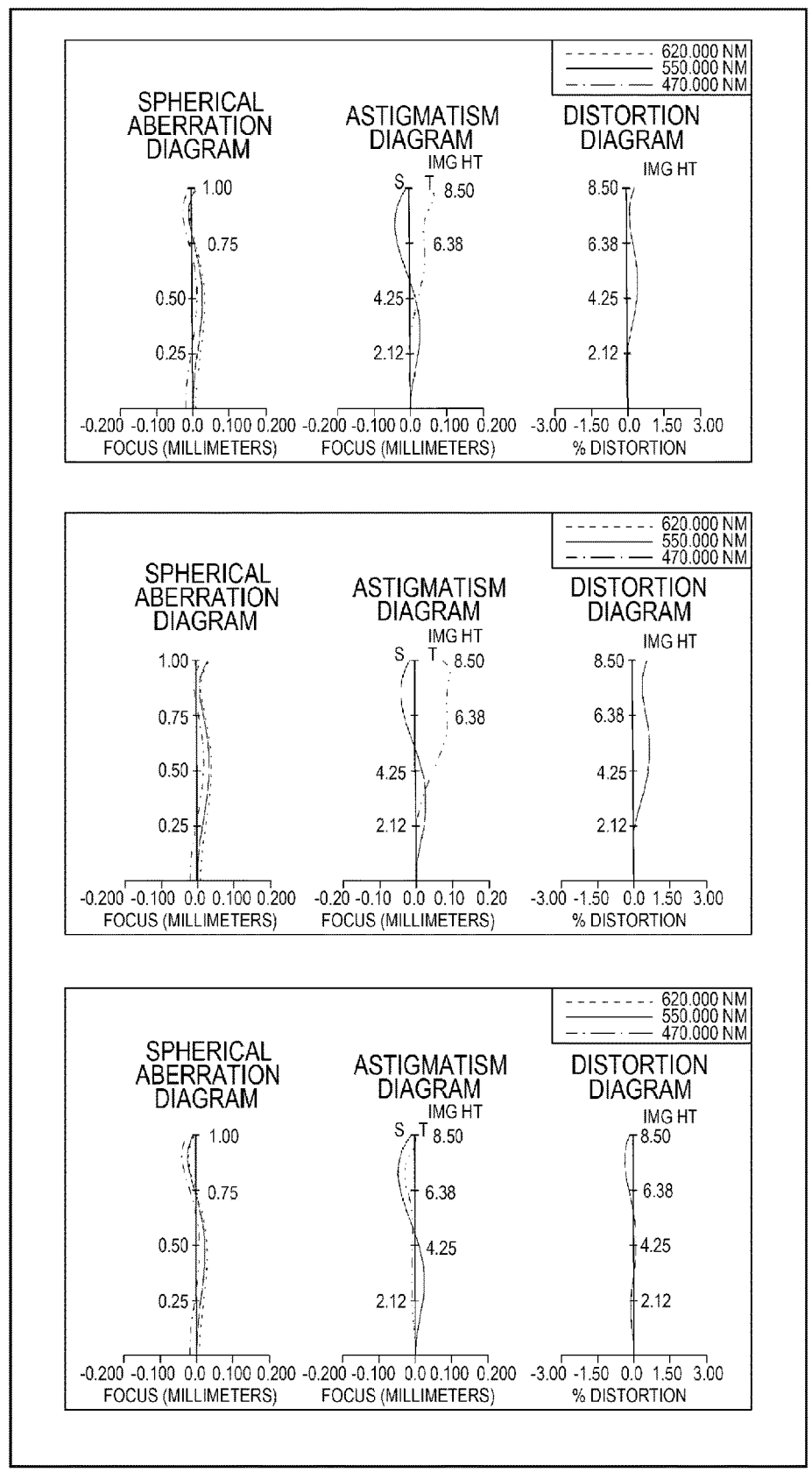
FIG. 14 shows reduction-side aberrations produced by the projection system according to Example 1.

FIG. 14 shows reduction-side aberrations (spherical aberration, astigmatism, and distortion) produced by the projection system when the projection magnification is changed. The upper portion, the middle portion, and the lower portion in FIG. 14 correspond to reduction-side aberrations at a reference distance, a short distance, and a long distance in Table 3, respectively.

Example 2

Table 4 shown below shows data on the lens surfaces in Example 2.

TABLE 4

F 2.82
FNo 2.00
ω 72.0

| Surface number | R | D | Nd | Vd | H | Eccentricity (rotation) |
|---|---|---|---|---|---|---|
| OBJ | Infinity | 6.060 | | | | |
| 1 | Infinity | 22.920 | 1.51633 | 64.1 | | |
| 2 | Infinity | 1.000 | | | | |
| 3 | 233.602 | 4.633 | 1.92286 | 20.9 | 11.87 | |
| 4 | −31.948 | 0.150 | | | 11.98 | |
| 5 | 15.973 | 6.000 | 1.62041 | 60.3 | 10.12 | |
| 6 | −217.943 | 1.000 | 1.92286 | 20.9 | 9.05 | |
| 7 | 17.252 | 4.000 | 1.51633 | 64.1 | 7.87 | |
| 8 | 251.993 | 0.103 | | | 7.10 | |
| 9 | 16.864 | 5.000 | 1.48749 | 70.2 | 6.40 | |
| 10 | −21.447 | 1.000 | 2.00100 | 29.1 | 5.50 | |
| 11 | 7.789 | 3.500 | 1.74077 | 27.8 | 5.01 | |
| 12 | 253.389 | 2.095 | | | 4.94 | |
| STO | Infinity | 4.000 | | | 4.88 | |
| 14 | −9.917 | 2.000 | 1.92286 | 20.9 | 5.26 | |
| 15 | −9.449 | d15 | | | 5.81 | |
| *16 | 16.998 | 4.771 | 1.53116 | 56.0 | 14.92 | |
| *17 | −161.456 | d17 | | | 15.50 | |
| *18 | 259.556 | 1.800 | 1.53116 | 56.0 | 16.25 | |
| *19 | 14.605 | d19 | | | 16.93 | |
| 20 | Infinity | 0.000 | Reflection surface | | | −37.5 |
| 21 | Infinity | −55.000 | | | | −37.5 |
| 22 | Infinity | 0.000 | Reflection surface | | | 37.5 |
| 23 | Infinity | 45.000 | | | | 37.5 |
| *24 | −34.621 | d24 | Reflection surface | | 42.32 | |
| IMG | Infinity | 0 | | | | |

Table 5 shown below shows aspheric coefficients of the lens surfaces in Example 2.

TABLE 5

| | Even-ordered Aspheric coefficient | | | | |
|---|---|---|---|---|---|
| Surface number | 16 | 17 | 18 | 19 | 24 |
| K | 0.00000 | 0.00000 | −89.00000 | −0.48675 | −0.83296 |
| A04 | −8.0074E−05 | 1.2524E−04 | 1.3771E−04 | −1.3436E−04 | 3.2250E−06 |
| A06 | 4.0677E−07 | 1.2998E−07 | −6.5372E−07 | 2.7904E−07 | −2.4400E−09 |
| A08 | −2.1234E−09 | −3.1647E−09 | 1.8678E−09 | −4.3024E−10 | 1.9808E−12 |
| A10 | 5.5293E−13 | 5.1021E−12 | −3.3643E−12 | −6.5976E−13 | −1.0792E−15 |
| A12 | 0.0000E+00 | 0.0000E+00 | 0.0000E+00 | 0.0000E+00 | 3.2787E−19 |
| A14 | 0.0000E+00 | 0.0000E+00 | 0.0000E+00 | 0.0000E+00 | −4.1519E−23 |

Table 6 shown below shows the values of the variable spaces d15, d17, d19, and d24 in Table 4 in a case where the projection distance is changed.

TABLE 6

| | Variable space | | |
|---|---|---|---|
| Projection distance | Reference distance | Short distance | Long distance |
| d15 | 19.736 | 19.318 | 20.171 |
| d17 | 2.232 | 2.225 | 2.239 |
| d19 | 28.000 | 28.330 | 27.659 |
| d24 | −376.756 | −305.269 | −504.219 |

Figure 15:
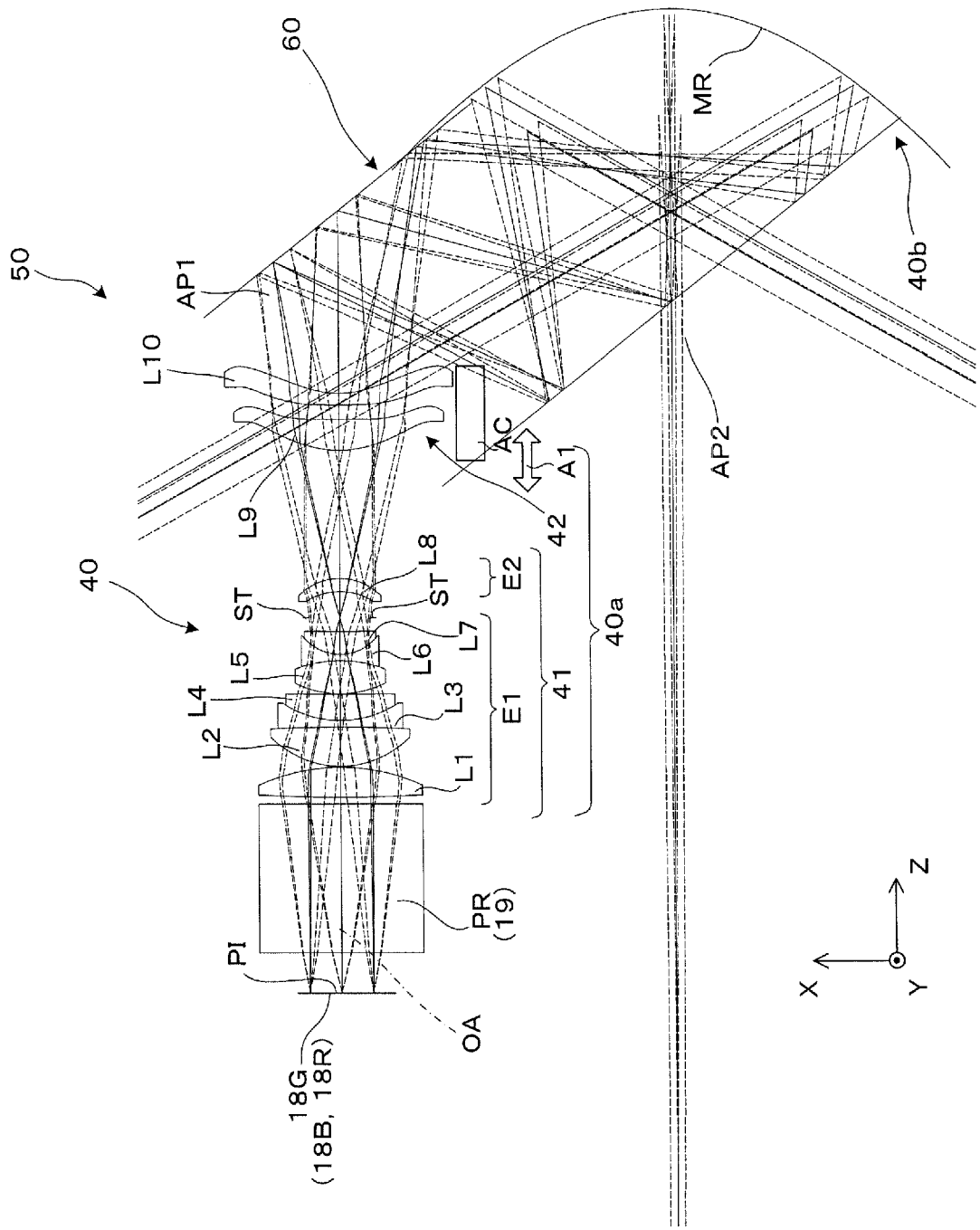
FIG. 15 is a configuration diagram and light ray diagram of a portion from the object plane to a concave reflection mirror in a projection system according to Example 2.
Figure 16:
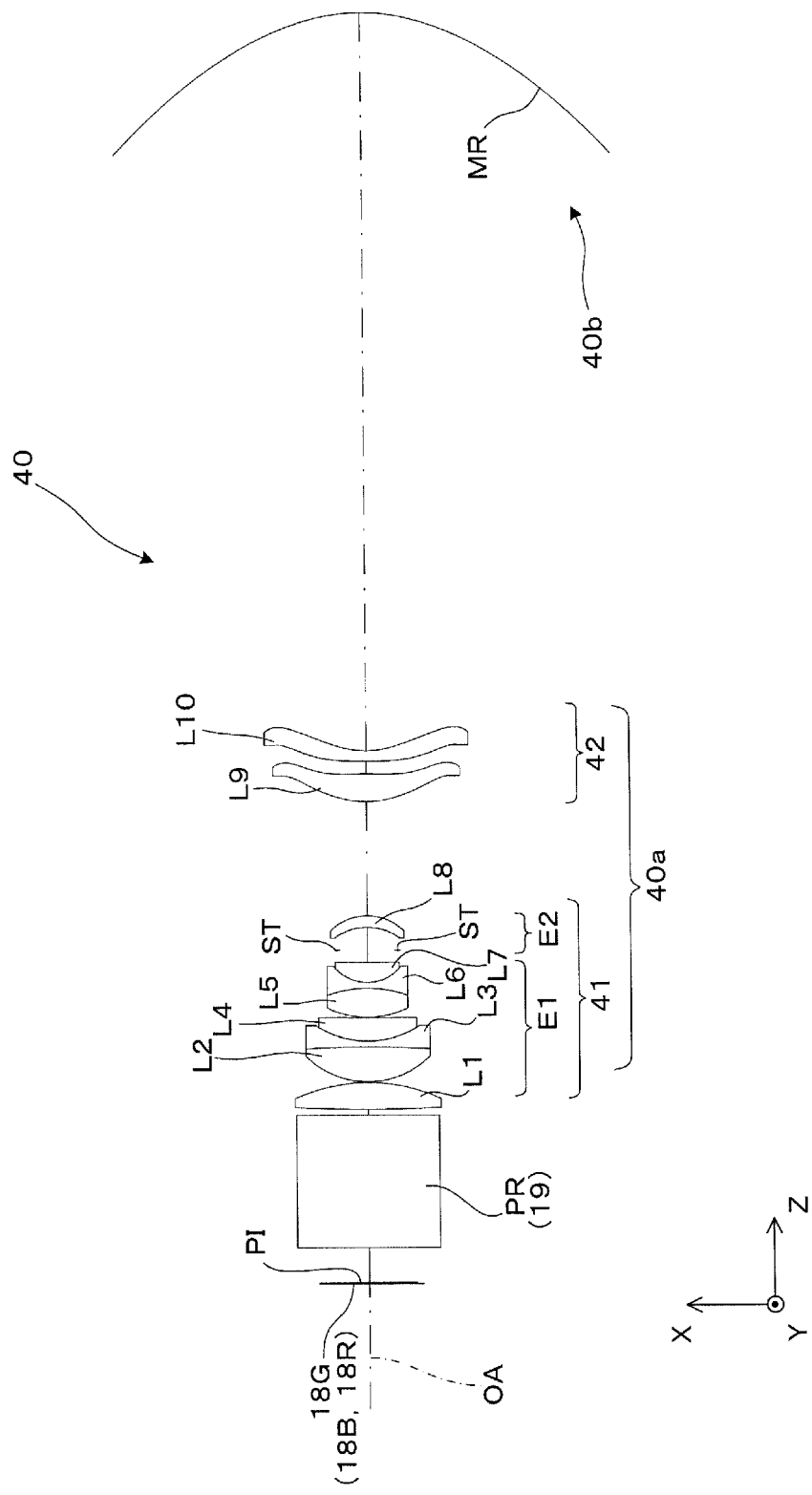
FIG. 16 shows the configuration of the projection system according to Example 2.

FIG. 15 is a configuration diagram and light ray diagram of the portion from the object plane to the concave reflection mirror in the projection system according Example 2. FIG. 16 is a cross-sectional view of the projection system according to Example 2. In FIG. 16, the first and second optical path deflectors AP1, AP2, which each only fold the optical path but have no power, are omitted, and the folding operation of the two optical path deflectors is drawn in the form of a development. In FIG. 15 or 16, the projection system 40 enlarges and projects an image on the panel surface PI at the magnification according to the distance to the screen. The first optical group 40a of the projection system 40 includes the ten lenses L1 to L10, the lenses L1 to L7, which form the lens group E1 of the first-first lens group 41, the lens L8, which forms the lens group E2 of the first-first lens group 41, and the lenses L9 and L10, which form the first-second lens group 42, sequentially arranged from the reduction side.

The lenses L1 to L10 are summarized below. The first optical group 40a is formed of the following ten lenses sequentially arranged from the reduction side: the positive biconvex first lens L1; the triplet of the positive biconvex second lens L2, the negative biconcave third lens L3, and the positive fourth lens L4 having a meniscus shape having a convex surface facing the enlargement side; the triplet of the positive biconvex fifth lens L5, the negative biconcave sixth lens L6, and the positive seventh lens L7 having a meniscus shape having a convex surface facing the enlargement side; the positive eighth lens L8 having a meniscus shape having a convex surface facing the reduction side and having aspheric surfaces on opposite sides; the positive ninth lens L9 having a biconvex shape in the vicinity of the optical axis and having aspheric surfaces on opposite sides; and the negative tenth lens L10 having a meniscus shape having a convex surface facing the enlargement side in the vicinity of the optical axis and having aspheric surfaces on opposite sides.

The mirror MR, which forms the second optical group 40b, is formed of a single aspheric mirror having a concave shape. Specific data on each of the lenses, such as the curvature, are shown in Table 4 described above.

Figure 17:
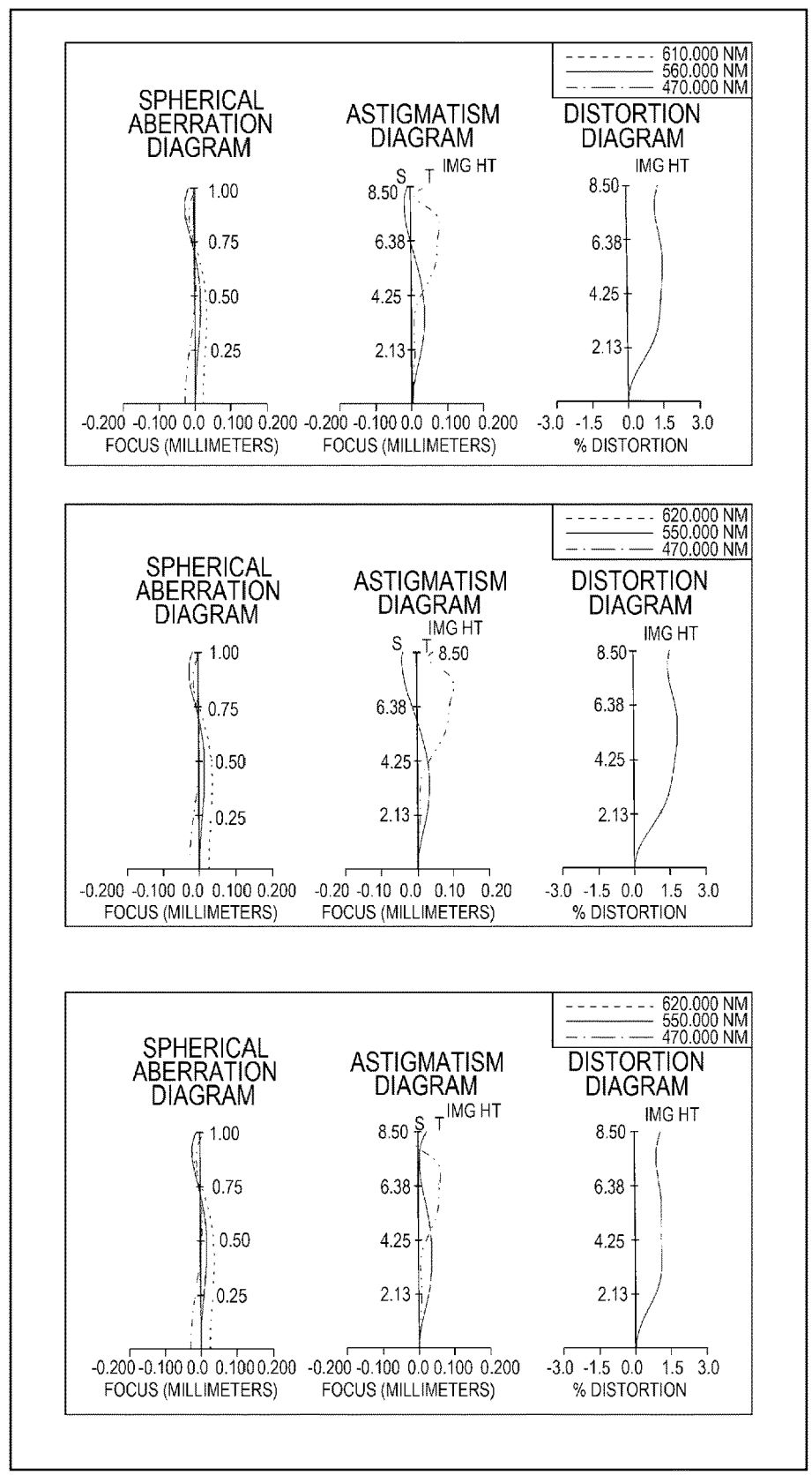
FIG. 17 shows reduction-side aberrations produced by the projection system according to Example 2.

FIG. 17 shows reduction-side aberrations (spherical aberration, astigmatism, and distortion) produced by the projection system when the projection magnification is changed. The upper portion, the middle portion, and the lower portion in FIG. 17 correspond to reduction-side aberrations at the reference distance, the short distance, and the long distance in Table 6, respectively.

Example 3

Table 7 shown below shows data on the lens surfaces in Example 3.

TABLE 7

| | | F −3.71 FNo 2.02 ω 72.3 | | | | |
|---|---|---|---|---|---|---|
| Surface number | R | D | Nd | Vd | H | Eccentricity (rotation) |
| OBJ | Infinity | 6.010 | | | | |
| 1 | Infinity | 26.820 | 1.51633 | 64.1 | | |
| 2 | Infinity | 1.000 | | | | |
| 3 | 4427.571 | 5.554 | 1.90366 | 31.3 | 15.18 | |
| 4 | −35.191 | 3.140 | | | 15.34 | |
| 5 | 36.643 | 9.351 | 1.49700 | 81.5 | 12.47 | |
| 6 | −21.214 | 1.200 | 1.90366 | 31.3 | 11.12 | |
| 7 | 26.325 | 0.100 | | | 10.49 | |
| 8 | 18.470 | 7.000 | 1.48749 | 70.2 | 10.81 | |
| 9 | −43.236 | 2.383 | | | 10.60 | |
| 10 | 21.997 | 8.500 | 1.72825 | 28.5 | 9.78 | |
| 11 | −14.000 | 1.100 | 1.90366 | 31.3 | 9.01 | |
| 12 | 20.667 | 8.072 | | | 8.17 | |
| STO | Infinity | 7.000 | | | 8.89 | |
| 14 | −427.198 | 5.000 | 1.62280 | 57.1 | 10.55 | |
| 15 | −22.902 | d15 | | | 10.92 | |
| *16 | 50.000 | 4.000 | 1.53116 | 56.0 | 16.81 | |
| *17 | 315.178 | d17 | | | 17.47 | |
| *18 | −22.379 | 3.000 | 1.53116 | 56.0 | 20.48 | |
| *19 | −135.485 | d19 | | | 22.02 | |
| 20 | Infinity | 0.000 | Reflection surface | | | −33.5 |
| 21 | Infinity | −83.000 | | | | −33.5 |
| 22 | Infinity | 0.000 | Reflection surface | | | 33.5 |
| 23 | Infinity | 69.000 | | | | 33.5 |
| *24 | −53.792 | d24 | Reflection surface | | 66.15 | |
| IMG | Infinity | 0 | | | | |

Table 8 shown below shows aspheric coefficients of the lens surfaces in Example 3.

TABLE 8

| | Even-ordered Aspheric coefficient | | | | |
|---|---|---|---|---|---|
| Surface number | 16 | 17 | 18 | 19 | 24 |
| K | 0.00000 | 0.00000 | −2.85691 | 0.00000 | −3.48045 |
| A04 | −5.9708E−05 | −6.0203E−05 | 4.2131E−05 | 4.1817E−05 | −1.1907E−06 |
| A06 | −1.6195E−08 | 8.5530E−08 | −5.5173E−08 | −1.4187E−07 | 3.2218E−10 |
| A08 | 1.8765E−10 | 3.1464E−11 | 2.0957E−11 | 2.5020E−10 | −6.5789E−14 |
| A10 | 0.0000E+00 | 0.0000E+00 | −2.8394E−14 | −2.8674E−13 | 7.5755E−18 |
| A12 | 0.0000E+00 | 0.0000E+00 | 0.0000E+00 | 1.3545E−16 | −3.7027E−22 |
| A14 | 0.0000E+00 | 0.0000E+00 | 0.0000E+00 | 0.0000E+00 | 0.0000E+00 |

Table 9 shown below shows the values of the variable spaces d15, d17, d19, and d24 in Table 7 in a case where the projection distance is changed.

TABLE 9

| Variable space | | | |
|---|---|---|---|
| Projection distance | Reference distance | Short distance | Long distance |
| d15 | 36.943 | 36.268 | 37.671 |
| d17 | 13.827 | 14.034 | 13.621 |
| d19 | 38.000 | 38.469 | 37.478 |
| d24 | −501.000 | −409.664 | −663.764 |

Figure 18:
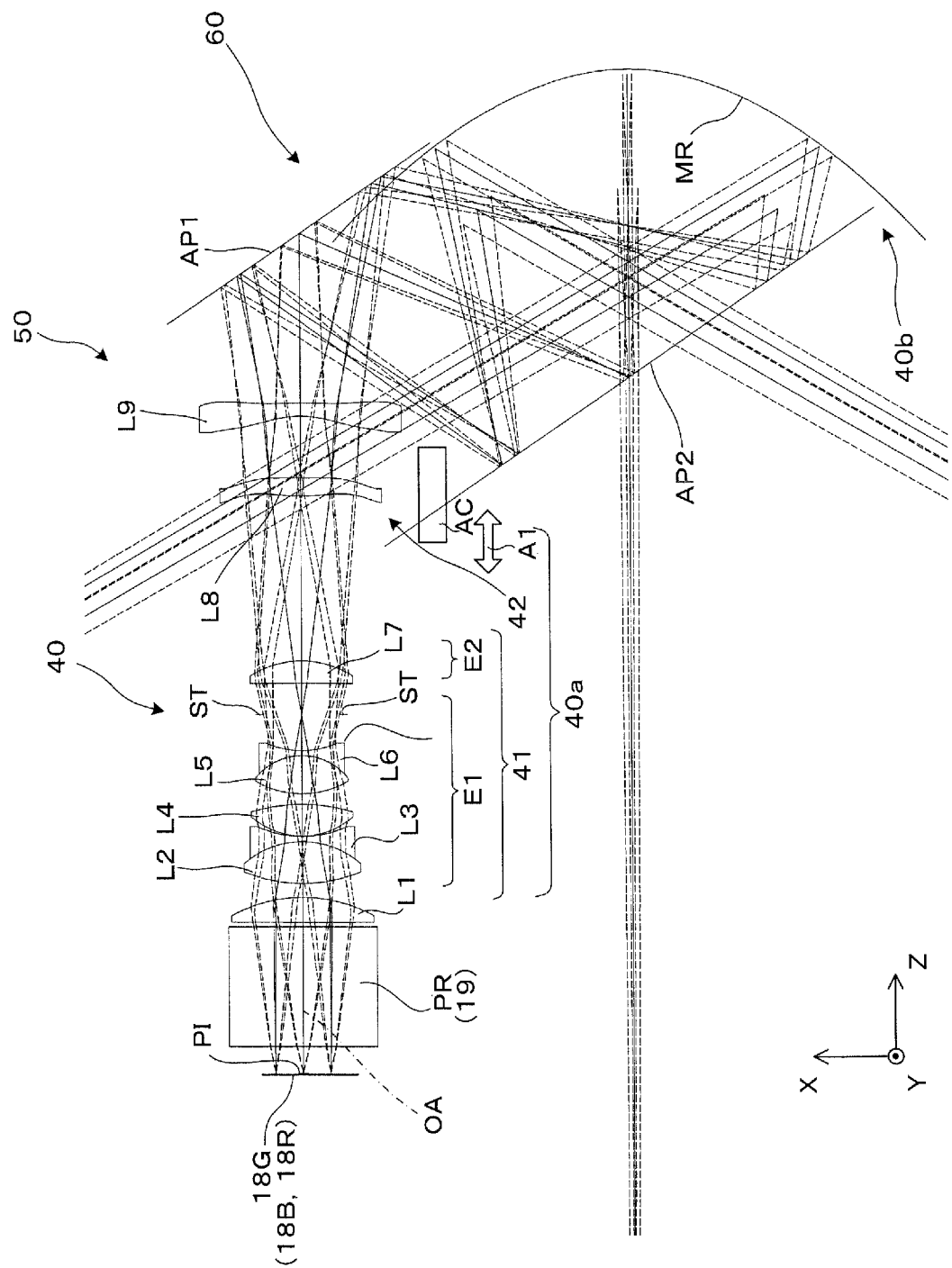
FIG. 18 is a configuration diagram and light ray diagram of a portion from the object plane to a concave reflection mirror in a projection system according to Example 3.
Figure 19:
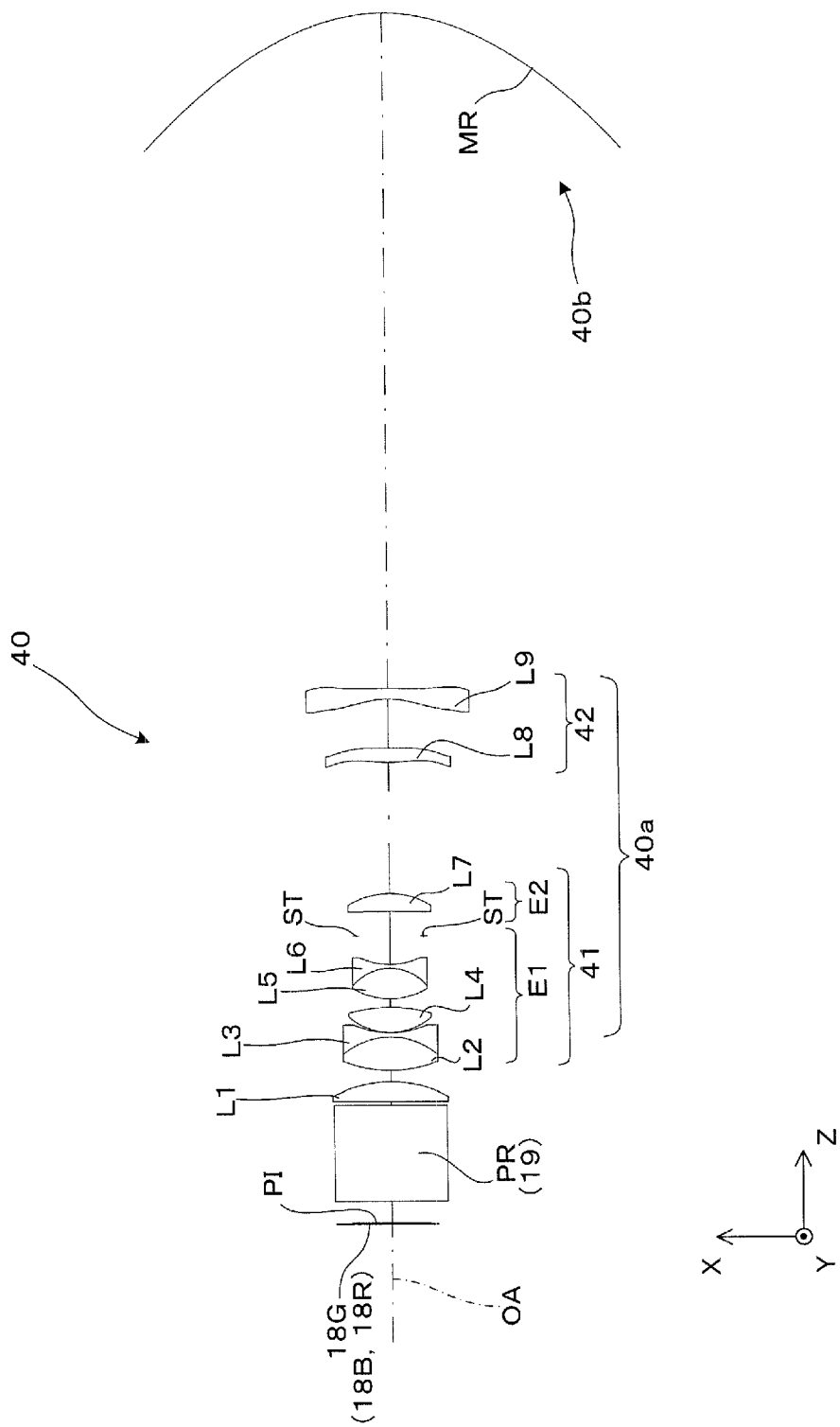
FIG. 19 shows the configuration of the projection system according to Example 3.

FIG. 18 is a configuration diagram and light ray diagram of the portion from the object plane to the concave reflection mirror in the projection system according Example 3. FIG. 19 is a cross-sectional view of the projection system according to Example 3. In FIG. 19, the first and second optical path deflectors AP1, AP2, which each only fold the optical path but have no power, are omitted, and the folding operation of the two optical path deflectors is drawn in the form of a development. In FIG. 18 or 19, the projection system 40 enlarges and projects an image on the panel surface PI at the magnification according to the distance to the screen. The first optical group 40a of the projection system 40 includes the nine lenses L1 to L9, that is, the lenses L1 to L6, which form the lens group E1 of the first-first lens group 41, the lens L7, which forms the lens group E2 of the first-first lens group 41, and the lenses L8 and L9, which form the first-second lens group 42, sequentially arranged from the reduction side.

The lenses L1 to L9 are summarized below. The first optical group 40a is formed of the following nine lenses sequentially arranged from the reduction side: the positive biconvex first lens L1; the doublet of the positive biconvex second lens L2 and the negative biconcave third lens L3; the positive biconvex fourth lens L4; the doublet of the positive biconvex fifth lens L5 and the negative biconcave sixth lens L6; the positive seventh lens L7 having a meniscus shape having a convex surface facing the enlargement side; the positive eighth lens L8 having a meniscus shape having a convex surface facing the reduction side in the vicinity of the optical axis and having aspheric surfaces on opposite sides; and the negative ninth lens L9 having a meniscus shape having a convex surface facing the enlargement side in the vicinity of the optical axis and having aspheric surfaces on opposite sides.

The mirror MR, which forms the second optical group 40b, is formed of a single aspheric mirror having a concave shape. Specific data on each of the lenses, such as the curvature, are shown in Table 7 described above.

Figure 20:
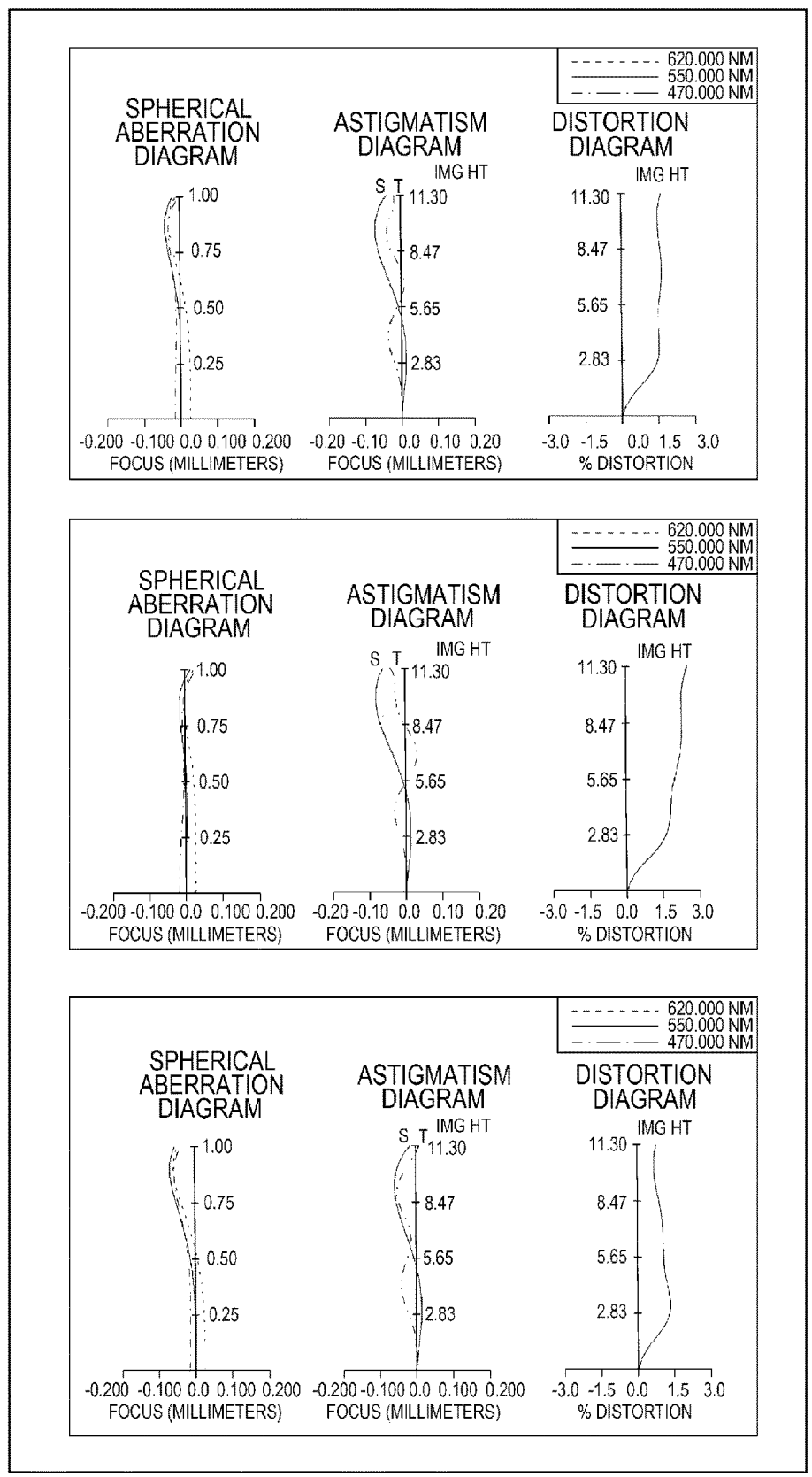
FIG. 20 shows reduction-side aberrations produced by the projection system according to Example 3.

FIG. 20 shows reduction-side aberrations (spherical aberration, astigmatism, and distortion) produced by the projection system when the projection magnification is changed. The upper portion, the middle portion, and the lower portion in FIG. 20 correspond to reduction-side aberrations at the reference distance, the short distance, and the long distance in Table 9, respectively.

Example 4

Table 10 shown below shows data on the lens surfaces in Example 4.

TABLE 10

F −3.96
FNo 1.99
ω 70.9

| Surface number | R | D | Nd | Vd | H | Eccentricity (rotation) |
|---|---|---|---|---|---|---|
| OBJ | Infinity | 8.700 | | | | |
| 1 | Infinity | 25.910 | 1.51680 | 64.2 | | |
| 2 | Infinity | 1.000 | | | | |
| 3 | 46.242 | 6.500 | 1.84666 | 23.8 | 15.27 | |
| 4 | −88.600 | 6.100 | | | 15.02 | |
| 5 | 61.723 | 4.004 | 1.67790 | 55.3 | 12.00 | |
| 6 | −84.388 | 0.100 | | | 11.62 | |
| 7 | 26.936 | 5.423 | 1.49700 | 81.5 | 10.27 | |
| 8 | −33.250 | 1.200 | 1.84666 | 23.8 | 9.40 | |
| 9 | 22.170 | 5.400 | | | 8.38 | |
| 10 | −15.388 | 1.200 | 1.84666 | 23.8 | 8.23 | |
| 11 | 35.744 | 5.743 | 1.75700 | 47.8 | 9.31 | |
| 12 | −20.876 | 6.000 | | | 9.83 | |
| STO | Infinity | 37.220 | | | 10.31 | |
| 14 | −137.711 | 5.500 | 1.51633 | 64.1 | 19.50 | |
| 15 | −46.489 | 19.400 | | | 20.20 | |
| 16 | −723.365 | 3.500 | 1.85026 | 32.3 | 25.54 | |
| 17 | −192.502 | 0.100 | | | 25.84 | |
| 18 | 111.913 | 6.000 | 1.83400 | 37.2 | 26.54 | |
| 19 | 11449.858 | 35.000 | | | 26.43 | |
| 20 | Infinity | 0.000 | Reflection surface | | | −32.5 |
| 21 | Infinity | −80.000 | | | | −32.5 |
| 22 | Infinity | 0.000 | Reflection surface | | | 32.5 |
| 23 | Infinity | 20.000 | | | | 32.5 |
| *24 | 14.606 | 13.098 | 1.51633 | 64.1 | 20.77 | |
| *25 | −3444.687 | d25 | | | 20.73 | |
| 26 | 479.065 | 2.000 | 1.85896 | 22.7 | 17.60 | |
| 27 | 29.727 | 11.000 | 1.59522 | 67.7 | 16.73 | |
| 28 | −51.015 | 0.100 | | | 16.61 | |
| 29 | 20.308 | 6.906 | 1.49700 | 81.5 | 14.11 | |
| 30 | 50.510 | 0.200 | | | 12.73 | |
| 31 | 15.716 | 8.000 | 1.49700 | 81.5 | 10.90 | |
| 32 | −72.826 | 1.200 | 1.80000 | 29.8 | 8.68 | |
| 33 | 34.078 | d33 | | | 7.37 | |
| 34 | 58.134 | 10.466 | 1.80100 | 35.0 | 5.58 | |
| 35 | 2732.624 | 5.407 | | | 7.00 | |
| *36 | −18.750 | 2.000 | 1.83220 | 40.1 | 8.15 | |
| *37 | −20.940 | 2.671 | | | 9.99 | |
| 38 | −11.097 | 2.000 | 1.92286 | 20.9 | 9.99 | |
| 39 | −27.520 | d39 | | | 15.12 | |
| **40 | −32.603 | 5.000 | 1.53116 | 56.0 | 24.87 | |
| **41 | 26.000 | d41 | | | 39.45 | |
| IMG | Infinity | | | | | |

Table 11 shown below shows aspheric coefficients of the lens surfaces in Example 4.

TABLE 11

| | Even-ordered Aspheric coefficient | | | |
|---|---|---|---|---|
| Surface number | 24 | 25 | 36 | 37 |
| K | −0.83056 | 0.00000 | 3.61782 | 2.29596 |
| A04 | −6.0885E−05 | −2.0960E−05 | −5.6942E−05 | 2.7361E−05 |
| A06 | 2.2021E−08 | 7.9356E−08 | −1.4915E−06 | −8.3729E−07 |
| A08 | 3.3464E−10 | −1.2616E−10 | 2.4781E−09 | −1.4105E−09 |
| A10 | −1.1791E−12 | −8.8856E−14 | −9.9726E−11 | 2.7887E−11 |

TABLE 11-continued

| A12 | 1.1035E-15 | 2.3897E-16 | 0.0000E+00 | 0.0000E+00 |
|---|---|---|---|---|
| A14 | 0.0000E+00 | 0.0000E+00 | 0.0000E+00 | 0.0000E+00 |

| Odd-ordered Aspheric coefficient | | |
|---|---|---|
| Surface number | 40 | 41 |
| K | −10.43805 | −18.28587 |
| A03 | −8.9438E−04 | −4.7878E−04 |
| A04 | 1.5704E−05 | 4.8796E−06 |
| A05 | 5.9605E−08 | 1.6251E−07 |
| A06 | 0.0000E+00 | −4.5075E−09 |
| A07 | 0.0000E+00 | −6.0249E−11 |
| A08 | 0.0000E+00 | 1.6968E−12 |
| A09 | 0.0000E+00 | 3.0882E−14 |
| A10 | 0.0000E+00 | −8.4813E−16 |

Table 12 shown below shows the values of the variable spaces d25, d33, d39, and d41 in Table 10 in a case where the projection distance is changed.

TABLE 12

| Variable space | | | |
|---|---|---|---|
| Projection distance | Reference distance | Short distance | Long distance |
| d25 | 13.249 | 13.501 | 13.033 |
| d33 | 2.876 | 2.828 | 2.894 |
| d39 | 9.827 | 9.623 | 10.025 |
| d41 | 500.000 | 411.800 | 662.000 |

Figure 21:
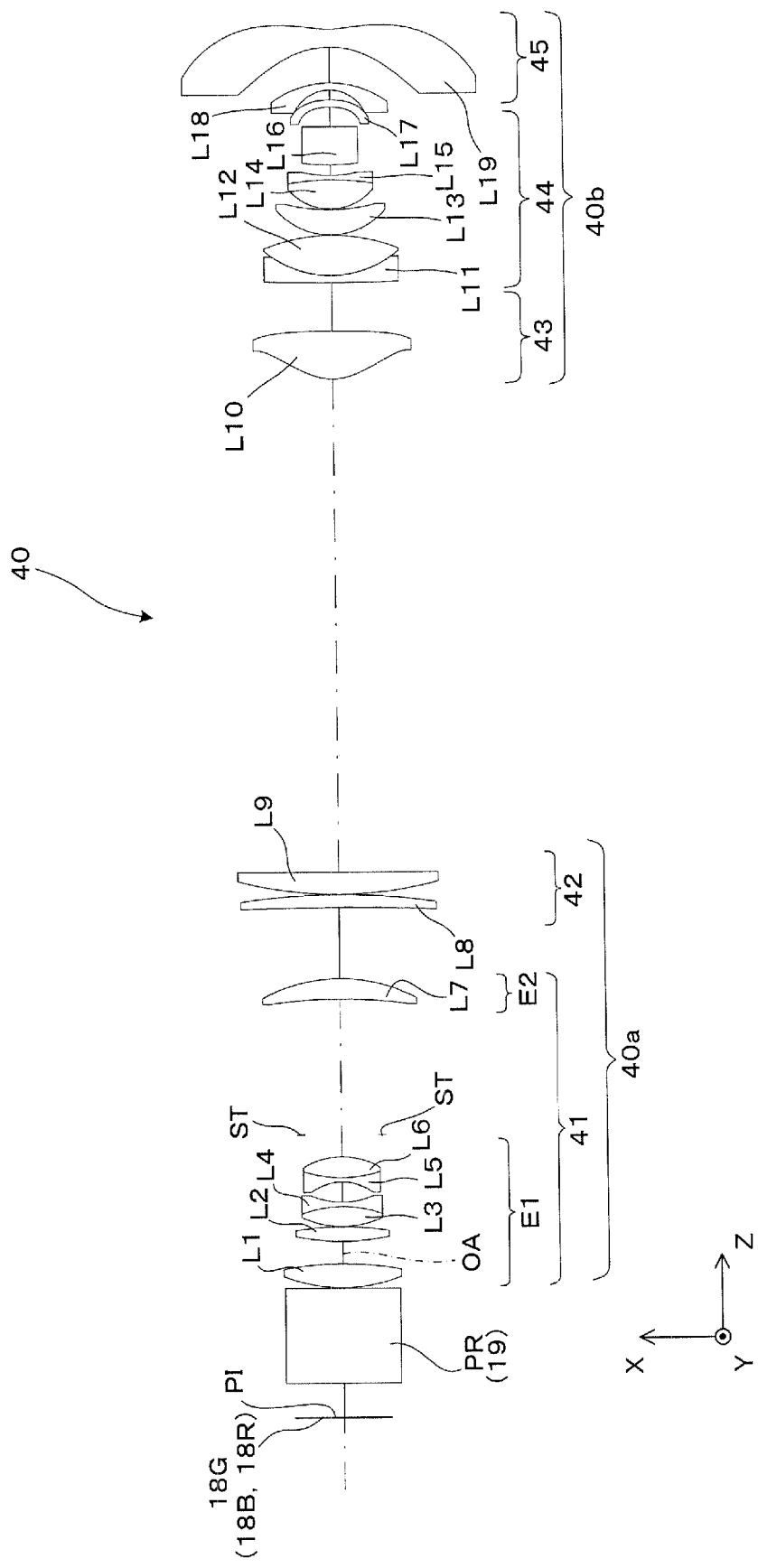
FIG. 21 shows the configuration of a projection system according to Example 4.

FIG. 21 is a cross-sectional view of the projection system according to Example 4. The projection system shown in FIG. 21 corresponds to the projection system 40 according to the second embodiment. In FIG. 21, the first and second optical path deflectors AP1, AP2, which each only fold the optical path but have no power, are omitted, and the folding operation of the two optical path deflectors is drawn in the form of a development. In FIG. 21, the projection system 40 enlarges and projects an image on the panel surface PI at the magnification according to the distance to the screen. The first optical group 40a of the projection system 40 includes the nine lenses L1 to L9, the lenses L1 to L6, which form the lens group E1 of the first-first lens group 41, the lens L7, which forms the lens group E2 of the first-first lens group 41, and the lenses L8 and L9, which form the first-second lens group 42, sequentially arranged from the reduction side. The second optical group 40b of the projection system 40 includes the following lenses sequentially arranged from the reduction side: the lens L10, which forms the second-first lens group 43; the lenses L11 to L18, which form the second-second lens group 44; and the lens L19, which forms the second-third lens group 45. The magnification is changed when the projection position is changed (projection distance is changed), for example, in a case where projection to a wall surface is changed to projection to a floor surface. When focusing is performed in association with a change in magnification, as described above, the first optical group 40a, the second-first lens group 43, and the second-third lens group 45 are remains fixed, whereas the second-second lens group 44 is moved. That is, in the second-second lens group 44, the eight lenses L11 and L18 are moved when the magnification is changed to bring an image into focus.

The first optical path deflector AP1, which deflects the optical axis OA' of the first optical group 40a, and the second optical path deflector AP2, which causes the optical axis OA folded by the first optical path deflector AP1 to be oriented again in the direction in which the optical axis OA' of the first optical group 40a extends, are disposed between the first optical group 40a and the second optical group 40b, and the second optical group 40b finally enlarges and projects an image.

The lenses L1 to L19 and other components have been described in detail with reference to FIG. 10 and other figures and are summarized below. The first optical group 40a is formed of the following nine lenses sequentially arranged from the reduction side: the positive biconvex first lens L1; the positive biconvex second lens L2; the doublet of the positive biconvex third lens L3 and the negative biconcave fourth lens L4; the doublet of the negative biconcave fifth lens L5 and the positive biconvex sixth lens L6; the positive seventh lens L7 having a meniscus shape having a convex surface facing the enlargement side; the positive eighth lens L8 having a meniscus shape having a convex surface facing the enlargement side; and the positive ninth lens L9 having a meniscus shape having a convex surface facing the reduction side.

The second optical group 40b is formed of the following ten lenses: the positive tenth lens L10 having a biconvex shape in the vicinity of the optical axis and having aspheric surfaces on opposite sides; the doublet of the negative eleventh lens L11 having a meniscus shape having a convex surface facing the reduction side and the positive biconvex twelfth lens L12; the positive thirteenth lens L13 having a meniscus shape having a convex surface facing the reduction side; the doublet of the positive biconvex fourteenth lens L14 and the negative biconcave fifteenth lens L15; the positive sixteenth lens L16 having a meniscus shape having a convex surface facing the reduction side; the negative seventeenth lens L17 having a meniscus shape having a convex surface facing the enlargement side and having aspheric surfaces on opposite sides; the negative eighteenth lens L18 having a meniscus shape having a convex surface facing the reduction side; and the negative nineteenth lens L19 having a biconcave shape in the vicinity of the optical axis and having aspheric surfaces on opposite sides.

Specific data on each of the lenses, such as the curvature, are shown in Table 10 described above.

Figure 22:
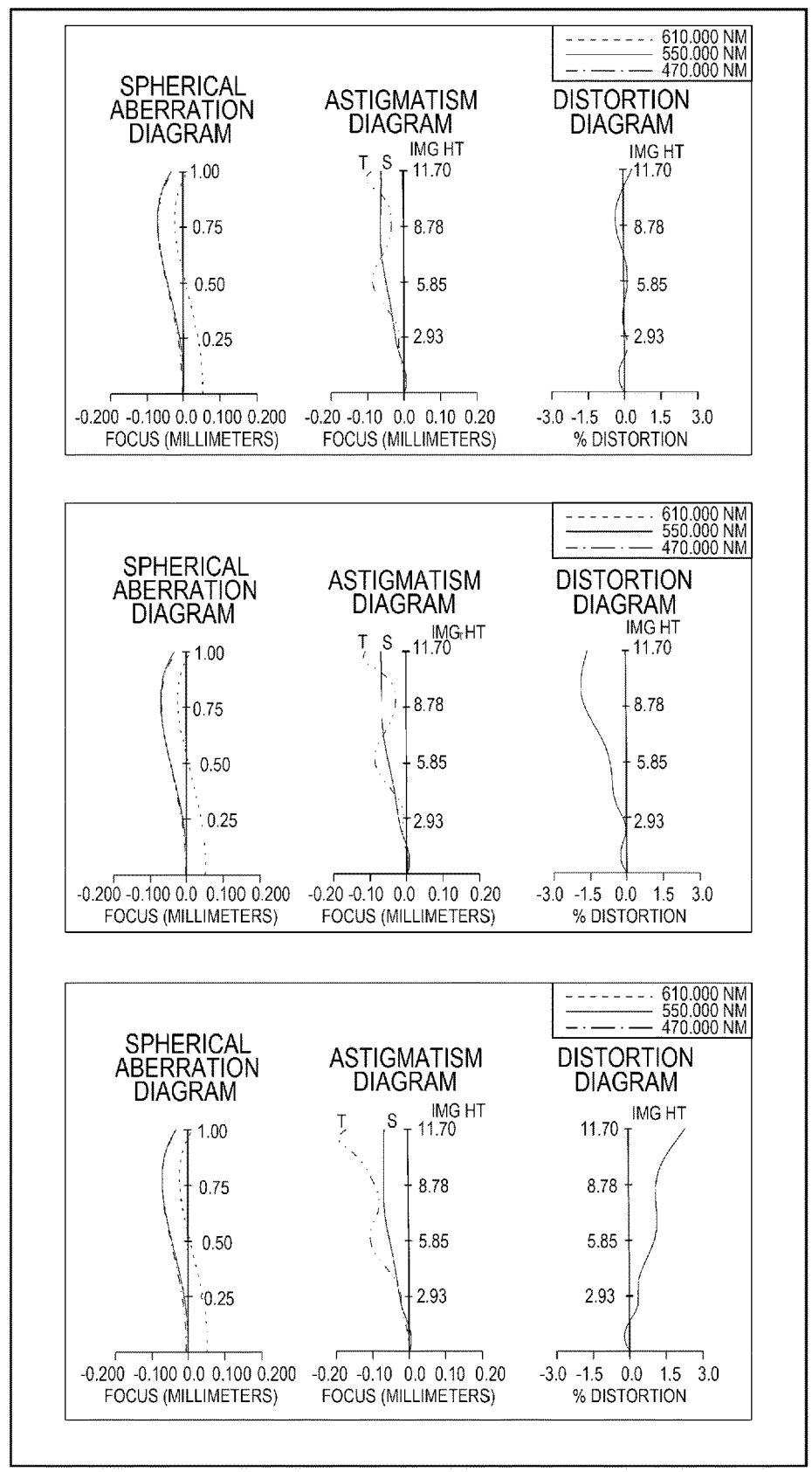
FIG. 22 shows reduction-side aberrations produced by the projection system according to Example 4.

FIG. 22 shows reduction-side aberrations (spherical aberration, astigmatism, and distortion) produced by the projection system when the projection magnification is changed. The upper portion, the middle portion, and the lower portion in FIG. 22 correspond to reduction-side aberrations at the reference distance, the short distance, and the long distance in Table 12, respectively.

Example 5

Table 13 shown below shows data on the lens surfaces in Example 5.

TABLE 13

F −3.96
FNo 1.90
ω 71.2

| Surface number | R | D | Nd | Vd | H | Eccentricity (rotation) |
|---|---|---|---|---|---|---|
| OBJ | Infinity | 8.500 | | | | |
| 1 | Infinity | 25.910 | 1.51680 | 64.2 | | |
| 2 | Infinity | 1.000 | | | | |
| 3 | 29.517 | 5.484 | 1.85896 | 22.7 | 16.34 | |
| 4 | 88.151 | 2.995 | | | 15.89 | |
| 5 | 136.740 | 4.657 | 1.43875 | 94.9 | 15.27 | |
| 6 | −61.857 | 0.100 | | | 14.85 | |
| 7 | 42.641 | 7.500 | 1.49700 | 81.5 | 13.00 | |
| 8 | −26.561 | 1.200 | 1.80000 | 29.8 | 12.16 | |
| 9 | 16.317 | 8.000 | 1.49700 | 81.5 | 10.86 | |
| 10 | −112.659 | 0.100 | | | 10.80 | |
| 11 | 20.906 | 3.400 | 1.48749 | 70.2 | 10.99 | |
| 12 | 69.731 | 15.000 | | | 10.80 | |
| STO | Infinity | 4.179 | | | 8.58 | |
| *14 | 31.133 | 3.000 | 1.69680 | 55.5 | 9.20 | |
| *15 | 83.429 | 8.069 | | | 9.21 | |
| 16 | −14.780 | 1.500 | 1.72825 | 28.5 | 10.50 | |
| 17 | 377.281 | 14.442 | | | 11.36 | |
| 18 | −58.420 | 7.500 | 1.83400 | 37.3 | 20.06 | |
| 19 | −30.367 | 0.100 | | | 21.37 | |
| 20 | 142.253 | 7.500 | 1.88300 | 40.8 | 24.84 | |
| 21 | −104.736 | 25.000 | | | 25.00 | |
| 22 | Infinity | 0.000 | Reflection surface | | | −40.0 |
| 23 | Infinity | −66.000 | | | | −40.0 |
| 24 | Infinity | 0.000 | Reflection surface | | | 40.0 |
| 25 | Infinity | 26.000 | | | | 40.0 |
| 26 | −123.931 | 5.000 | 1.84666 | 23.8 | 26.11 | |
| 27 | −66.416 | d27 | | | 26.44 | |
| *28 | 16.158 | 5.000 | 1.50941 | 55.9 | 24.31 | |
| *29 | 29.789 | 6.000 | | | 23.99 | |
| 30 | 95.399 | 5.551 | 1.49700 | 81.5 | 24.05 | |
| 31 | −606.104 | 0.100 | | | 23.90 | |
| 32 | 29.587 | 14.000 | 1.49700 | 81.5 | 22.44 | |
| 33 | −313.330 | 0.100 | | | 21.18 | |
| 34 | 17.316 | 11.500 | 1.61800 | 63.3 | 14.38 | |
| 35 | −79.552 | 1.200 | 1.84666 | 23.8 | 11.31 | |
| 36 | 23.158 | d36 | | | 8.59 | |
| 37 | 82.794 | 3.798 | 1.65412 | 39.7 | 7.30 | |
| 38 | 165.981 | 6.555 | | | 8.99 | |
| 39 | −11.715 | 2.000 | 1.72000 | 50.2 | 9.94 | |
| 40 | −23.250 | d40 | | | 13.88 | |
| **41 | −25.679 | 2.771 | 1.50941 | 55.9 | 25.42 | |
| **42 | 88.427 | d42 | | | 39.37 | |
| IMG | Infinity | | | | | |

Table 14 shown below shows aspheric coefficients of the lens surfaces in Example 5.

TABLE 14

Even-ordered Aspheric coefficient

| Surface number | 14 | 15 | 28 | 29 |
|---|---|---|---|---|
| K | −0.27032 | 29.96503 | −0.95615 | 0.00000 |
| A04 | −1.7122E−06 | −8.6712E−06 | −3.9178E−05 | −2.1634E−05 |
| A06 | −4.8307E−08 | −1.3308E−07 | 7.6436E−09 | −3.2354E−09 |
| A08 | −7.1105E−11 | 8.4508E−11 | 1.1520E−11 | 1.1096E−11 |
| A10 | 0.0000E+00 | −2.4377E−12 | 0.0000E+00 | 0.0000E+00 |

TABLE 14-continued

| | | | | |
|---|---|---|---|---|
| A12 | 0.0000E+00 | 0.0000E+00 | 0.0000E+00 | 0.0000E+00 |
| A14 | 0.0000E+00 | 0.0000E+00 | 0.0000E+00 | 0.0000E+00 |

Odd-ordered Aspheric coefficient

| Surface number | 40 | 41 |
|---|---|---|
| K | −7.25487 | 0.00000 |
| A03 | −0.00069132 | −0.00034974 |
| A04 | 2.5862E−05 | −2.1343E−06 |
| A05 | −1.0797E−06 | 1.4598E−07 |
| A06 | 1.5706E−09 | −2.0408E−09 |
| A07 | 5.0312E−10 | 2.6928E−11 |
| A08 | −1.0505E−12 | −6.6259E−13 |
| A09 | 0.0000E+00 | 0.0000E+00 |
| A10 | 0.0000E+00 | 0.0000E+00 |

Table 15 shown below shows the values of the variable spaces d27, d36, d40, and d42 in Table 13 in a case where the projection distance is changed.

TABLE 15

Variable space

| Projection distance | Reference distance | Short distance | Long distance |
|---|---|---|---|
| d27 | 8.115 | 8.273 | 8.083 |
| d36 | 5.884 | 5.965 | 5.745 |
| d40 | 15.291 | 15.052 | 15.462 |
| d42 | 480.000 | 391.800 | 642.000 |

Figure 23:
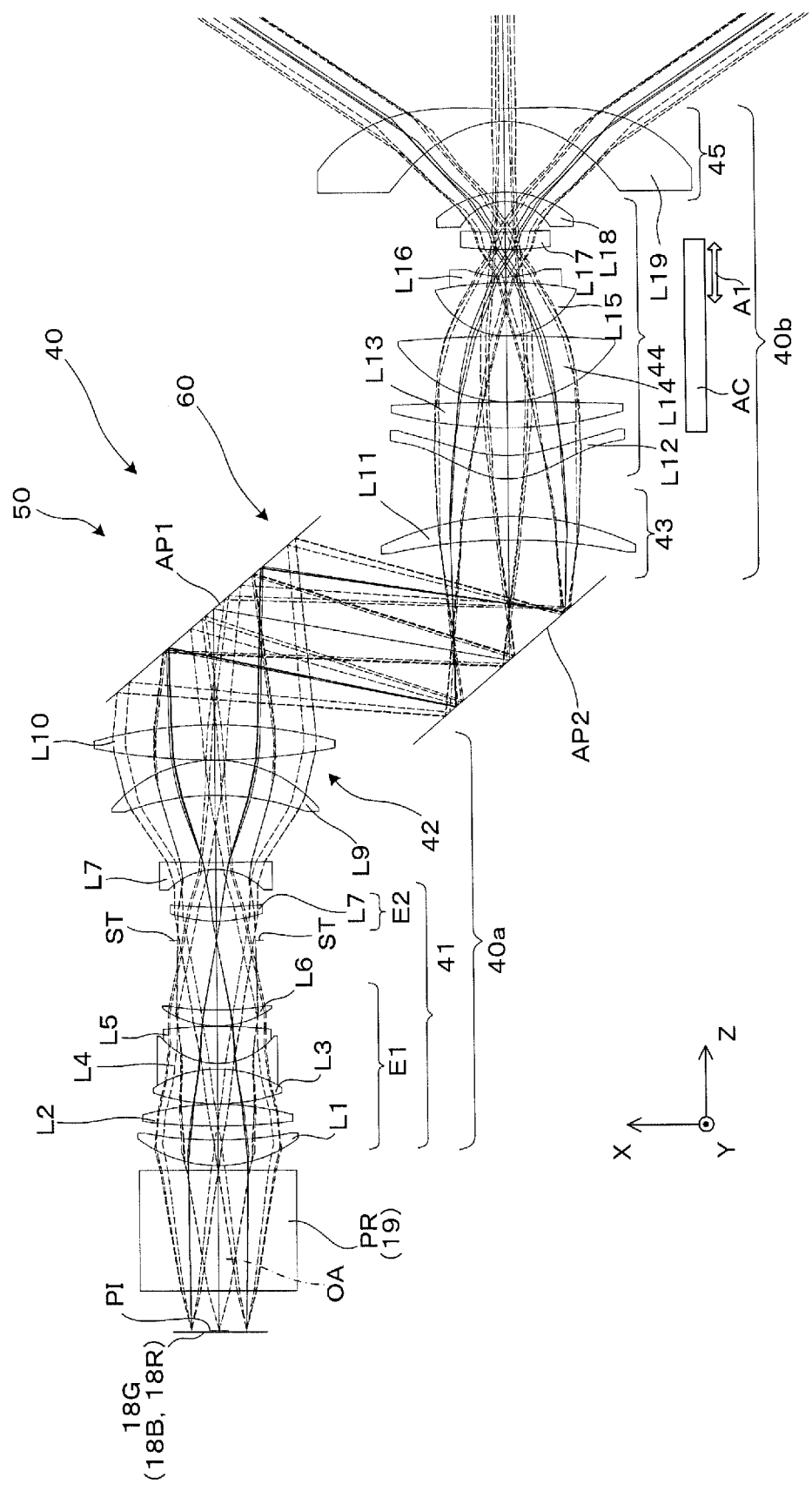
FIG. 23 is a configuration diagram and light ray diagram of a portion from the object plane to a concave reflection mirror in a projection system according to Example 5.
Figure 24:
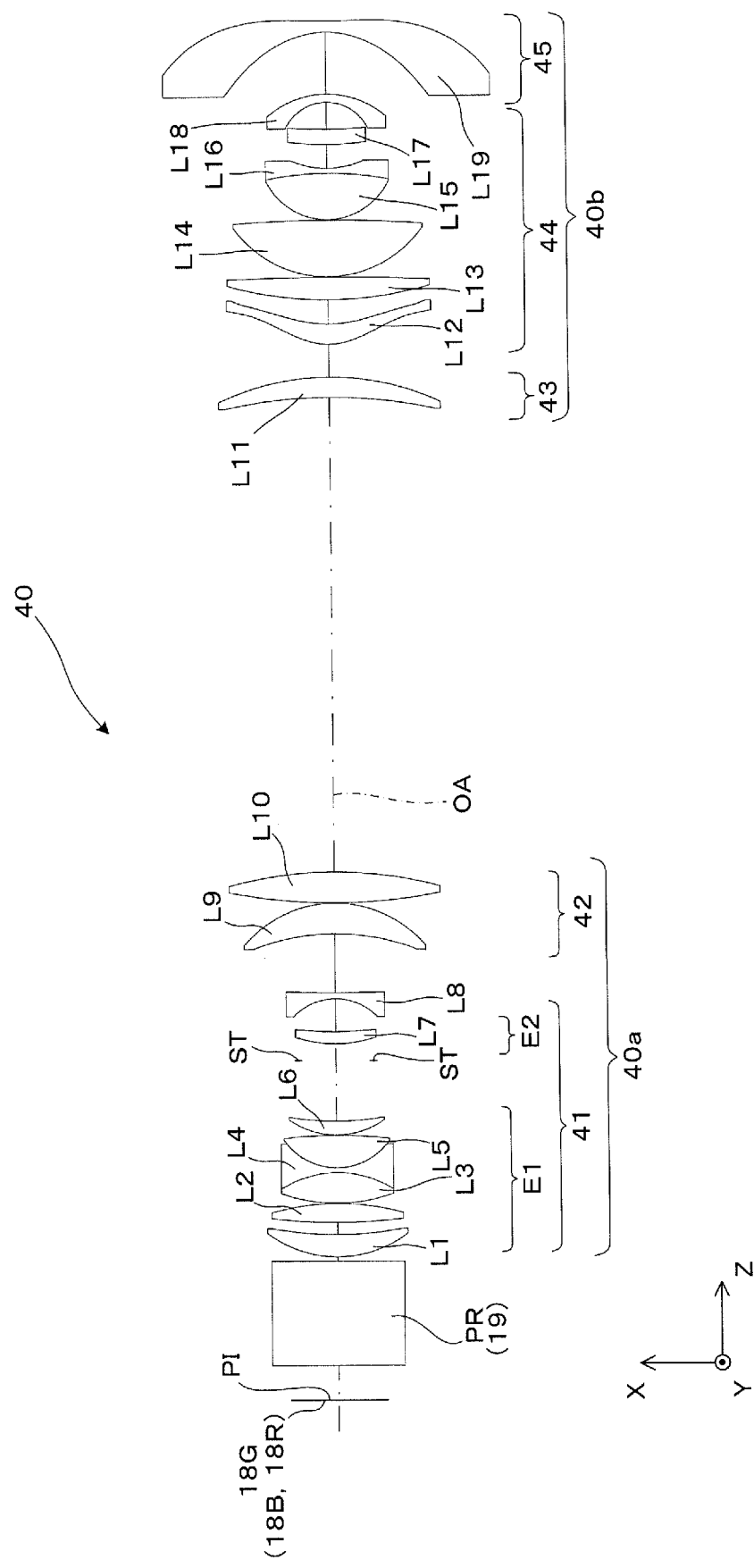
FIG. 24 shows the configuration of the projection system according to Example 5.

FIG. 23 is a configuration diagram and light ray diagram of the portion from the object plane to the concave reflection mirror in the projection system according Example 5. FIG. 24 is a cross-sectional view of the projection system according to Example 5. In FIG. 24, the first and second optical path deflectors, which each only fold the optical path but have no power, are omitted, and the folding operation of the two optical path deflectors is drawn in the form of a development. In FIG. 23 or 24, the projection system 40 enlarges and projects an image on the panel surface PI at the magnification according to the distance to the screen. The first optical group 40a of the projection system 40 includes the ten lenses L1 to L10, the lenses L1 to L6, which form the lens group E1 of the first-first lens group 41, the lens L7, which forms the lens group E2 of the first-first lens group 41, and the lenses L8 to L10, which form the first-second lens group 42, sequentially arranged from the reduction side. The second optical group 40b of the projection system 40 includes the following lenses sequentially arranged from the reduction side: the lens L11, which forms the second-first lens group 43; the lenses L12 to L18, which form the second-second lens group 44; and the lens L19, which forms the second-third lens group 45. The magnification is changed when the projection position is changed (projection distance is changed), for example, in a case where projection to a wall surface is changed to projection to a floor surface. When focusing is performed in association with a change in magnification, as described above, the first optical group 40a, the second-first lens group 43, and the second-third lens group 45 are remains fixed, whereas the second-second lens group 44 is moved. That is, in the second-second lens group 44, at least part of the seven lenses L12 and L18 is moved when the magnification is changed to bring an image into focus.

The first optical path deflector AP1, which deflects the optical axis OA' of the first optical group 40a, and the second optical path deflector AP2, which causes the optical axis OA folded by the first optical path deflector AP1 to be oriented again in the direction in which the optical axis OA' of the first optical group 40a extends, are disposed between the first optical group 40a and the second optical group 40b, and the second optical group 40b finally enlarges and projects an image.

The lenses L1 to L10 are summarized below. The first optical group 40a is formed of the following ten lenses sequentially arranged from the reduction side: the positive first lens L1 having a meniscus shape having a convex surface facing the enlargement side; the positive biconvex second lens L2; the triplet of the positive biconvex third lens L3, the negative biconcave fourth lens L4, and the positive biconvex fifth lens L5; the positive sixth lens L6 having a meniscus shape having a convex surface facing the reduction side; the positive seventh lens L7 having a meniscus shape having a convex surface facing the reduction side; the negative eighth lens L8 having a meniscus shape having a convex surface facing the enlargement side; the positive ninth lens L9 having a meniscus shape having a convex surface facing the enlargement side; and the positive biconvex tenth lens L10.

The second optical group 40b is formed of the following nine lenses: the positive eleventh lens L11 having a meniscus shape having a convex surface facing the enlargement side; the positive twelfth lens L12 having a meniscus shape having a convex surface facing the reduction side in the vicinity of the optical axis and having aspheric surfaces on opposite sides; the positive biconvex thirteenth lens L13; the positive biconvex fourteenth lens L14; the doublet of the positive biconvex fifteenth lens L15 and the negative biconcave sixteenth lens L16; the positive seventeenth lens L17 having a meniscus shape having a convex surface facing the enlargement side; the negative eighteenth lens L18 having a meniscus shape having a convex surface facing the enlargement side; and the negative nineteenth lens L19 having a biconcave shape in the vicinity of the optical axis and having aspheric surfaces on opposite sides.

Specific data on each of the lenses, such as the curvature, are shown in Table 13 described above.

Figure 25:
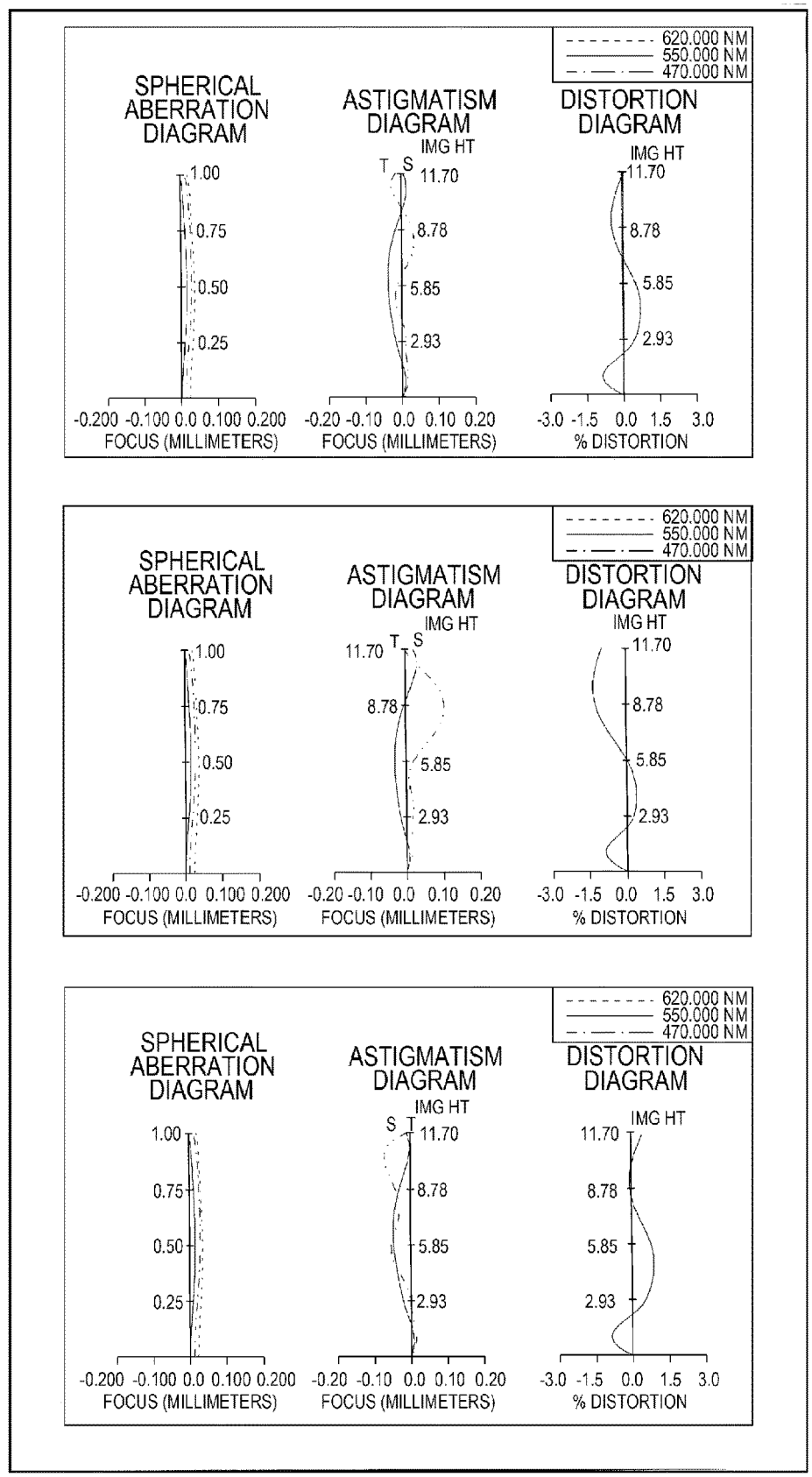
FIG. 25 shows reduction-side aberrations produced by the projection system according to Example 5.

FIG. 25 shows reduction-side aberrations (spherical aberration, astigmatism, and distortion) produced by the projection system when the projection magnification is changed. The upper portion, the middle portion, and the lower portion in FIG. 25 correspond to reduction-side aberrations at the reference distance, the short distance, and the long distance in Table 15, respectively.

Example 6

Table 16 shown below shows data on the lens surfaces in Example 6.

TABLE 16

F $-3.96$
FNo 2.00
$\omega$ 71.2

| Surface number | R | D | Nd | Vd | H | Eccentricity (rotation) |
|---|---|---|---|---|---|---|
| OBJ | Infinity | 8.500 | | | | |
| 1 | Infinity | 25.910 | 1.51680 | 64.2 | | |
| 2 | Infinity | 1.000 | | | | |
| 3 | 43.410 | 7.830 | 1.85896 | 22.7 | 17.28 | |

TABLE 16-continued

F $-3.96$
FNo 2.00
$\omega$ 71.2

| Surface number | R | D | Nd | Vd | H | Eccentricity (rotation) |
|---|---|---|---|---|---|---|
| 4 | −67.288 | 0.192 | | | 17.07 | |
| 5 | 27.535 | 8.500 | 1.49700 | 81.5 | 13.96 | |
| 6 | −36.110 | 1.200 | 1.85896 | 22.7 | 12.69 | |
| 7 | 20.000 | 7.000 | 1.49700 | 81.5 | 10.74 | |
| 8 | −109.788 | 15.101 | | | 10.00 | |
| STO | Infinity | 18.465 | | | | |
| 10 | 109.217 | 4.500 | 1.69680 | 55.5 | 11.50 | |
| *11 | −42.015 | 5.313 | | | 11.79 | |
| 12 | −16.410 | 1.500 | 1.78472 | 25.7 | 11.73 | |
| 13 | −2408.092 | 14.086 | | | 14.24 | |
| 14 | −68.481 | 8.500 | 1.83400 | 37.2 | 23.08 | |
| 15 | −31.651 | 0.100 | | | 24.00 | |
| 16 | 105.227 | 7.400 | 1.88300 | 40.8 | 28.49 | |
| 17 | −263.323 | 28.003 | | | 28.51 | |
| 18 | Infinity | 0.000 | Reflection surface | | | −35.0 |
| 19 | Infinity | −69.000 | | | | −35.0 |
| 20 | Infinity | 0.000 | Reflection surface | | | 35.0 |
| 21 | Infinity | 23.000 | | | | 35.0 |
| *22 | 90.436 | 5.000 | 1.50941 | 55.9 | 23.94 | |
| *23 | −101.443 | d23 | | | 23.72 | |
| 24 | 44.575 | 15.440 | 1.49700 | 81.5 | 25.57 | |
| 25 | −75.925 | 0.100 | | | 25.57 | |
| 26 | 30.268 | 10.893 | 1.49700 | 81.5 | 22.77 | |
| 27 | 96.326 | 0.100 | | | 21.42 | |
| 28 | 25.000 | 14.200 | 1.61800 | 63.3 | 18.17 | |
| 29 | −49.779 | 1.200 | 1.84666 | 23.8 | 15.21 | |
| 30 | 71.453 | d30 | | | 12.76 | |
| 31 | 18.443 | 3.789 | 1.49700 | 81.5 | 9.97 | |
| 32 | 22.460 | 13.277 | | | 8.02 | |
| 33 | −11.569 | 2.000 | 1.60300 | 65.4 | 9.81 | |
| 34 | −37.635 | d34 | | | 15.20 | |
| **35 | −21.513 | 2.771 | 1.50941 | 55.9 | 28.00 | |
| **36 | 262.355 | d36 | | | 38.24 | |
| IMG | Infinity | | | | | |

Table 17 shown below shows aspheric coefficients of the lens surfaces in Example 6.

TABLE 17

| | Even-ordered Aspheric coefficient | | |
|---|---|---|---|
| Surface number | 11 | 22 | 23 |
| K | −1.00000 | 0.00000 | 6.78020 |
| A04 | −8.8082E−06 | 3.8303E−06 | 3.5749E−05 |
| A06 | −4.5030E−08 | −5.0305E−10 | −1.7894E−08 |
| A08 | 1.2364E−10 | −7.6798E−12 | −6.5626E−13 |
| A10 | −1.0754E−12 | 0.0000E+00 | 0.0000E+00 |
| A12 | 0.0000E+00 | 0.0000E+00 | 0.0000E+00 |
| A14 | 0.0000E+00 | 0.0000E+00 | 0.0000E+00 |

| | Odd-ordered Aspheric coefficient | |
|---|---|---|
| Surface number | 35 | 36 |
| K | −1.19846 | 0.00000 |
| A03 | −3.8870E−04 | −2.8773E−04 |
| A04 | 3.0711E−05 | −7.1150E−07 |
| A05 | −5.4961E−07 | 1.4788E−07 |

TABLE 17-continued

| | | |
|---|---|---|
| A06 | 2.9770E−09 | −2.5440E−09 |
| A07 | 0.0000E+00 | 0.0000E+00 |
| A08 | 0.0000E+00 | 0.0000E+00 |
| A09 | 0.0000E+00 | 0.0000E+00 |
| A10 | 0.0000E+00 | 0.0000E+00 |

Table 18 shown below shows the values of the variable spaces d23, d30, d34, and d36 in Table 16 in a case where the projection distance is changed.

TABLE 18

| | Variable space | | |
|---|---|---|---|
| Projection distance | Reference distance | Short distance | Long distance |
| d23 | 0.891 | 0.964 | 0.800 |
| d30 | 1.250 | 1.149 | 1.157 |
| d34 | 13.989 | 14.017 | 13.922 |
| d36 | 500.000 | 411.800 | 662.000 |

Figure 26:
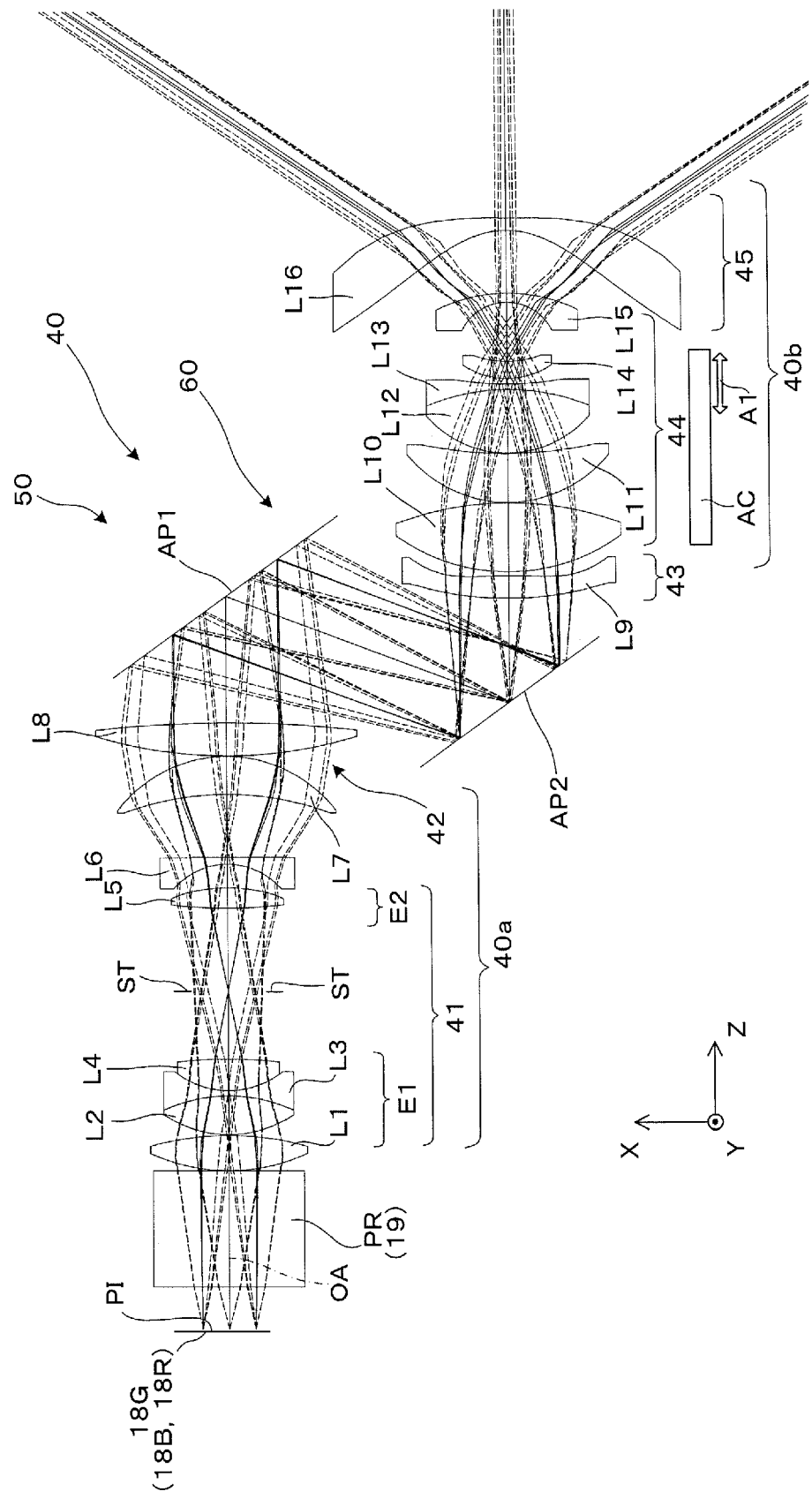
FIG. 26 is a configuration diagram and light ray diagram of a portion from the object plane to a concave reflection mirror in a projection system according to Example 6.
Figure 27:
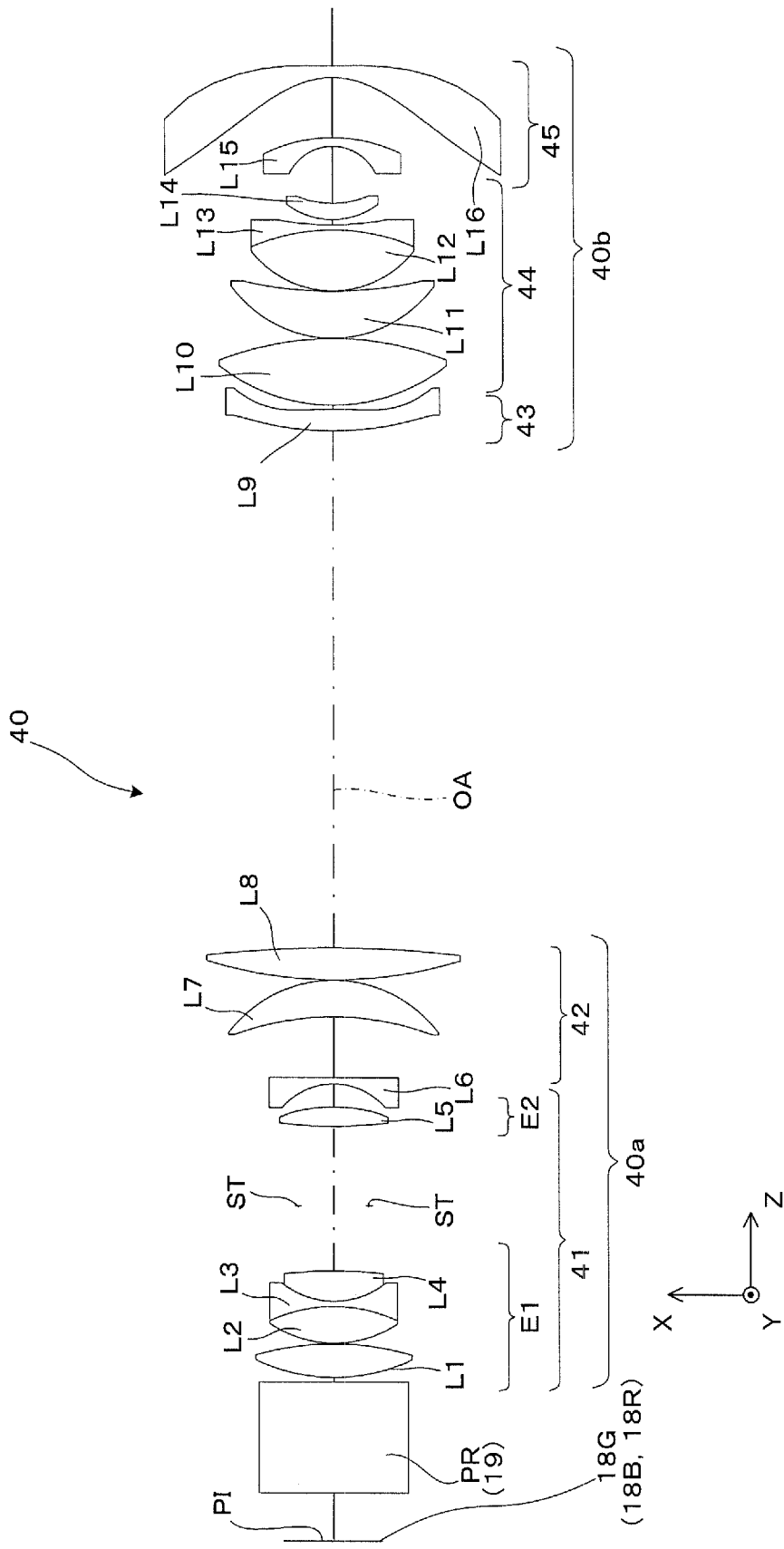
FIG. 27 shows the configuration of the projection system according to Example 6.

FIG. 26 is a configuration diagram and light ray diagram of the portion from the object plane to the concave reflection mirror in the projection system according Example 6. FIG. 27 is a cross-sectional view of the projection system according to Example 6. In FIG. 27, the first and second optical path deflectors, which each only fold the optical path but have no power, are omitted, and the folding operation of the two optical path deflectors is drawn in the form of a development. In FIG. 26 or 27, the projection system 40 enlarges and projects an image on the panel surface PI at the magnification according to the distance to the screen. The first optical group 40a of the projection system 40 includes the eight lenses L1 to L8, the lenses L1 to L4, which form the lens group E1 of the first-first lens group 41, the lens L5, which forms the lens group E2 of the first-first lens group 41, and the lenses L6 to L8, which form the first-second lens group 42, sequentially arranged from the reduction side. The second optical group 40b of the projection system 40 includes the following lenses sequentially arranged from the reduction side: the lens L9, which forms the second-first lens group 43; the lenses L10 to L15, which form the second-second lens group 44; and the lens L16, which forms the second-third lens group 45. The magnification is changed when the projection position is changed (projection distance is changed), for example, in a case where projection to a wall surface is changed to projection to a floor surface. When focusing is performed in association with a change in magnification, as described above, the first optical group 40a, the second-first lens group 43, and the second-third lens group 45 are remains fixed, whereas the second-second lens group 44 is moved. That is, in the second-second lens group 44, the six lenses L10 and L15 are moved when the magnification is changed to bring an image into focus.

The first optical path deflector AP1, which deflects the optical axis OA1 of the first optical group 40a, and the second optical path deflector AP2, which causes the optical axis OA folded by the first optical path deflector AP1 to be oriented again in the direction in which the optical axis OA1 of the first optical group 40a extends, are disposed between the first optical group 40a and the second optical group 40b, and the second optical group 40b finally enlarges and projects an image.

The lenses L1 to L8 are summarized below. The first optical group 40a is formed of the following eight lenses sequentially arranged from the reduction side: the positive biconvex first lens L1; the triplet of the positive biconvex second lens L2, the negative biconcave third lens L3, and the positive biconvex fourth lens L4, the positive biconvex fifth lens L5 having aspheric surfaces on opposite sides; the negative sixth lens L6 having a meniscus shape having a convex surface facing the enlargement side; the positive seventh lens L7 having a meniscus shape having a convex surface facing the enlargement side; and the positive biconvex eighth lens L8.

The second optical group 40b is formed of the following eight lenses: the positive ninth lens L9 having a biconvex shape in the vicinity of the optical axis and having aspheric surfaces on opposite sides; the positive biconvex tenth lens L10; the positive eleventh lens L1 having a meniscus shape having a convex surface facing the reduction side; the doublet of the positive biconvex twelfth lens L12 and the negative biconcave thirteenth lens L13; the positive fourteenth lens L14 having a meniscus shape having a convex surface facing the reduction side; the negative fifteenth lens L15 having a meniscus shape having a convex surface facing the enlargement side; and the negative sixteenth lens L16 having a biconcave shape in the vicinity of the optical axis and having aspheric surfaces on opposite sides.

Specific data on each of the lenses, such as the curvature, are shown in Table 16 described above.

Figure 28:
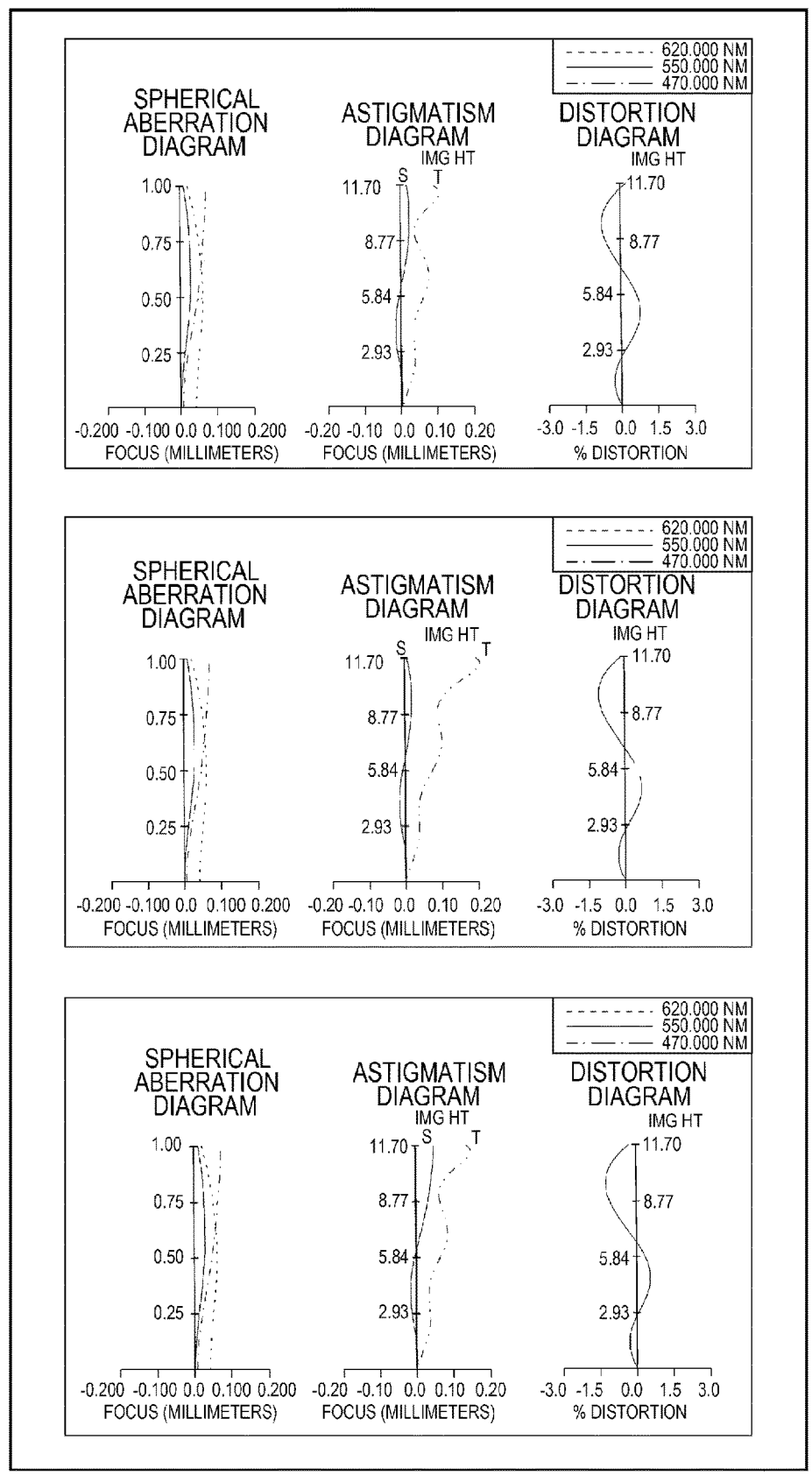
FIG. 28 shows reduction-side aberrations produced by the projection system according to Example 6.

FIG. 28 shows reduction-side aberrations (spherical aberration, astigmatism, and distortion) produced by the projection system when the projection magnification is changed. The upper portion, the middle portion, and the lower portion in FIG. 28 correspond to reduction-side aberrations at the reference distance, the short distance, and the long distance in Table 18, respectively.

OUTLINE OF EXAMPLES

In each of Examples, a wide half angle of view greater than or equal to 70 degrees at the wide-angle end is achieved in a compact configuration. The variety of conditions described above, that is, Conditional Expressions (1) to (8) are as follows and satisfied in Examples. However, Conditional Expression (4) is satisfied only in Examples 1 to 3, and Conditional Expression (5) is satisfied only in Examples 4 to 6. As for Conditional Expression (8), θt=7.5° in one of the variations of Example 1 presented by way of example, whereas θt=0° in the other Examples.

TABLE 19

| Calculated value of conditional expression | Example 1 | Example 2 | Example 3 | Example 4 | Example 5 | Example 6 |
|---|---|---|---|---|---|---|
| (1) 0.1 < Fb1/Fb2 < 0.4 | 0.244 | 0.203 | 0.153 | 0.226 | 0.261 | 0.270 |
| (2) 0.8 < Fb2/TL < 2.0 | 1.513 | 1.756 | 1.391 | 1.047 | 1.073 | 0.984 |
| (3) 0.2 < (H1 + H2)/ D < 0.6 | 0.451 | 0.463 | 0.464 | 0.350 | 0.437 | 0.437 |

TABLE 19-continued

| Calculated value of conditional expression | Example 1 | Example 2 | Example 3 | Example 4 | Example 5 | Example 6 |
|---|---|---|---|---|---|---|
| (4) 0.08 < F/F1 < 0.16 | 0.128 | 0.128 | 0.135 | — | — | — |
| (5) \|F/F1\| < 0.06 | — | — | — | −0.013 | −0.015 | 0.002 |
| (6) 0.3 < d/D < 0.6 | 0.452 | 0.430 | 0.437 | 0.593 | 0.564 | 0.575 |
| (7) 25° < θ < 50° | 35.0 | 37.5 | 33.5 | 32.5 | 40.0 | 35.0 |
| (8) θt < 15 | 7.5 | | | | | |

As described above, in a specific aspect of the invention, the projection system satisfies the following conditional expression:

$$0.2 < (H1+H2)/D < 0.6 \quad (3)$$

where D represents the distance from the surface closest to the enlargement side in the first optical group to the surface closest to the reduction side in the second optical group, H1 represents the effective aperture radius of the surface closest to the enlargement side in the first optical group, and H2 represents the effective aperture radius of the surface closest to the reduction side in the second optical group. In this case, the distance between the first optical group and the second optical group can be increased, whereby the optical path deflection system formed, for example, of two optical path deflectors can be efficiently disposed.

In another aspect of the invention, the second optical group includes at least one aspheric reflection surface having a concave shape, and the projection system satisfies the following conditional expression:

$$0.08 < F/F1 < 0.16 \quad (4)$$

where F represents the focal length of the entire projection system, and F1 represents the focal length of the first optical group. In this case, the second optical group can be formed of a concave mirror.

In still another aspect of the invention, the second optical group includes a plurality of lenses including at least one aspheric lens having negative power, and the projection system satisfies the following conditional expression:

$$|F/F1| < 0.06 \quad (5)$$

where F represents the focal length of the entire projection system, and F1 represents the focal length of the first optical group. In this case, the second lens group can be formed of a plurality of lenses.

In still another aspect of the invention, in the optical path deflection system, the first and second optical path deflectors are formed of two mirrors and so disposed that the reflection surfaces of the two mirrors face each other. In this case, the two mirrors can deflect the optical path of the image light.

In still another aspect of the invention, the projection system satisfies the following conditional expression:

$$0.3 < d/D < 0.6 \quad (6)$$

where D represents the distance from the surface closest to the enlargement side in the first optical group to the surface closest to the reduction side in the second optical group, and d represent the on-axis length the optical path deflection system. In this case, after the optical path deflection system deflects the optical axis, interference of the light ray flux with the first and second optical groups or the two optical path deflectors, which form the optical path deflection system, can be avoided.

In still another aspect of the invention, the optical axis of the first optical group and the optical axis of the second optical group, which is the optical axis deflected by the optical path deflection system, are parallel to each other, and the directions in which the two optical axes extend coincide with each other. In this case, the optical system can be compact and accommodated, for example, in a roughly square enclosure.

In still another aspect of the invention, the projection system satisfies the following conditional expression:

$$30° < θ < 50° \quad (7)$$

where θ represents the angle of incidence of the optical axis extending from the first optical group on the first optical path deflector. In this case, optical interference and an increase in size of the second optical group can be avoided, and in the case where the second optical group is formed of a concave mirror, the concave mirror does not have a deeply shaped reflection surface.

In still another aspect of the invention, the optical path deflection system satisfies the following conditional expression:

$$θt < 15° \quad (8)$$

where θt represents the angle between the reflection surface of the first optical path deflector and the reflection surface of the second optical path deflector. In this case, in further reduction in size of the entire apparatus, the light ray fluxes corresponding to the screen peripheries can be so maintained as not to interfere with each other in order to ensure the optical path.

In still another aspect of the invention, the optical axis deflected by the first optical path deflector inclines with respect to the horizontal axis or the vertical axis of the plane in the reduction-side conjugate position. In this case, the overall arrangement of the optical system can be simplified, and the thickness of the apparatus can be reduced.

In still another aspect of the invention, in the optical path deflection system, the first optical path deflector and the second optical path deflector are so positioned by a holder that is molded integrally therewith. In this case, the first and second optical path deflectors incline with respect to the optical axis by a specific angle and are fixed with the arrangement of the two optical path deflectors maintained.

The invention is not limited to the embodiments or Examples described above and can be implemented in a variety of aspects to the extent that the aspects do not depart from the substance of the invention.

For example, in each of Examples, at least one lens having substantially no power can be added in a position upstream or downstream of the lenses that form each of the lens groups or between any adjacent ones of the lenses that form each of the lens groups.

The target to be enlarged and projected by the projection system 40 is not limited to a liquid crystal panel, and an image formed by a digital micromirror device in which micromirrors serve as pixels or by any other light modulation device can be enlarged and projected by the projection system 40.

The entire disclosure of Japanese Patent Application No. 2018-050567, filed on Mar. 19, 2018 is expressly incorporated by reference herein.

What is claimed is:

1. A projection system comprising:
   a first optical group formed of a plurality of lenses and a second optical group formed of at least a single optical element with the first optical group and the second optical group sequentially arranged from a reduction side,
   wherein the first optical group forms an intermediate image of an image in a reduction-side conjugate position,
   the second optical group enlarges the intermediate image formed by the first optical group and projects the enlarged intermediate image with a half angle of view being greater than or equal to 50°,
   the projection system further comprises an optical path deflection system that is disposed between the first optical group and the second optical group and includes a first optical path deflector that deflects an optical axis of the first optical group and a second optical path deflector that further deflects the optical axis deflected by the first optical path deflector to cause the deflected optical axis to be oriented again in a direction in which the optical axis of the first optical group extends, and
   the projection system satisfies conditional expressions $0.1 < Fb1/Fb2 < 0.3$, and $0.8 < Fb2/TL < 2.0$ where Fb1 represents an air equivalent distance from the reduction-side conjugate position to a surface closest to the reduction side in the first optical group, Fb2 represents a distance from a surface closest to an enlargement side in the first optical group to an on-axis paraxial focal position where the intermediate image is formed, and TL represents an overall length of the first optical group.

2. The projection system according to claim 1, wherein the projection system satisfies a conditional expression $0.2 < (H1+H2)/D < 0.6$ where D represents a distance from the surface closest to the enlargement side in the first optical group to a surface closest to the reduction side in the second optical group, H1 represents an effective aperture radius of the surface closest to the enlargement side in the first optical group, and H2 represents an effective aperture radius of the surface closest to the reduction side in the second optical group.

3. A projection-type image display apparatus comprising:
   a light modulation device that modulates light from a light source to form the image; and
   the projection system according to claim 2 that projects the image from the light modulation device.

4. The projection system according to claim 1, wherein the second optical group includes at least one aspheric reflection surface having a concave shape, and
   the projection system satisfies a conditional expression $0.08 < F/F1 < 0.16$ where F represents a focal length of the entire projection system, and F1 represents a focal length of the first optical group.

5. A projection-type image display apparatus comprising:
   a light modulation device that modulates light from a light source to form the image; and
   the projection system according to claim 4 that projects the image from the light modulation device.

6. The projection system according to claim 1,
   wherein the second optical group includes a plurality of lenses including at least one aspheric lens having negative power, and
   the projection system satisfies a conditional expression $|F/F1| < 0.06$ where F represents a focal length of the entire projection system, and F1 represents a focal length of the first optical group.

7. A projection-type image display apparatus comprising:
   a light modulation device that modulates light from a light source to form the image; and
   the projection system according to claim 6 that projects the image from the light modulation device.

8. The projection system according to claim 1, wherein in the optical path deflection system, the first and second optical path deflectors are formed of two mirrors and so disposed that reflection surfaces of the two mirrors face each other.

9. A projection-type image display apparatus comprising:
   a light modulation device that modulates light from a light source to form the image; and
   the projection system according to claim 8 that projects the image from the light modulation device.

10. The projection system according to claim 1,
    wherein the projection system satisfies a conditional expression $0.3 < d/D < 0.6$ where D represents a distance from the surface closest to the enlargement side in the first optical group to a surface closest to the reduction side in the second optical group, and d represents an on-axis length of the optical path deflection system.

11. A projection-type image display apparatus comprising:
    a light modulation device that modulates light from a light source to form the image; and
    the projection system according to claim 10 that projects the image from the light modulation device.

12. The projection system according to claim 1, wherein the optical axis of the first optical group and an optical axis of the second optical group, which is the optical axis deflected by the optical path deflection system, are parallel to each other, and directions in which the two optical axes extend coincide with each other.

13. A projection-type image display apparatus comprising:
    a light modulation device that modulates light from a light source to form the image; and
    the projection system according to claim 12 that projects the image from the light modulation device.

14. The projection system according to claim 1,
    wherein the projection system satisfies a conditional expression:

$30° < \theta < 50°$ where θ represents an angle of incidence of the optical axis extending from the first optical group on the first optical path deflector.

15. A projection-type image display apparatus comprising:
- a light modulation device that modulates light from a light source to form the image; and
- the projection system according to claim 14 that projects the image from the light modulation device.

16. The projection system according to claim 1, wherein the optical path deflection system satisfies a conditional expression $$\theta t < 15°$$

where $\theta t$ represents an angle between a reflection surface of the first optical path deflector and a reflection surface of the second optical path deflector.

17. A projection-type image display apparatus comprising:
- a light modulation device that modulates light from a light source to form the image; and
- the projection system according to claim 16 that projects the image from the light modulation device.

18. The projection system according to claim 1, wherein the optical axis deflected by the first optical path deflector inclines with respect to a horizontal axis or a vertical axis of a plane in the reduction-side conjugate position.

19. The projection system according to claim 1, wherein in the optical path deflection system, the first optical path deflector and the second optical path deflector are so positioned by a holder that is molded integrally therewith.

20. A projection-type image display apparatus comprising:
- a light modulation device that modulates light from a light source to form the image; and
- the projection system according to claim 1 that projects the image from the light modulation device.

* * * * *